US012739058B2

(12) United States Patent
Guo et al.

(10) Patent No.: US 12,739,058 B2
(45) Date of Patent: Sep. 15, 2026

(54) BEAM MANAGEMENT FOR MULTIPLE TRANSPORT BLOCK TRANSMISSION WITH REPETITIONS

(71) Applicant: QUALCOMM Incorporated, San Diego, CA (US)

(72) Inventors: Shaozhen Guo, Beijing (CN); Mostafa Khoshnevisan, San Diego, CA (US); Jing Sun, San Diego, CA (US); Xiaoxia Zhang, San Diego, CA (US); Changlong Xu, Beijing (CN); Yitao Chen, San Marcos, CA (US)

(73) Assignee: QUALCOMM Incorproated, San Diego, CA (US)

( * ) Notice: Subject to any disclaimer, the term of this patent is extended or adjusted under 35 U.S.C. 154(b) by 277 days.

(21) Appl. No.: 18/571,374

(22) PCT Filed: Aug. 18, 2021

(86) PCT No.: PCT/CN2021/113189
§ 371 (c)(1),
(2) Date: Dec. 18, 2023

(87) PCT Pub. No.: WO2023/019458
PCT Pub. Date: Feb. 23, 2023

(65) Prior Publication Data
US 2024/0297737 A1 Sep. 5, 2024

(51) Int. Cl.
*H04L 5/00* (2006.01)
*H04B 7/06* (2006.01)
*H04L 1/08* (2006.01)

(52) U.S. Cl.
CPC ........... *H04L 1/08* (2013.01); *H04B 7/06952* (2023.05)

(58) Field of Classification Search
CPC ....... H04B 7/06952; H04B 7/088; H04L 1/08; H04L 1/0013
See application file for complete search history.

(56) References Cited

U.S. PATENT DOCUMENTS 11,272,576 B2 * 3/2022 Zhang .................. H04B 7/0617
2020/0163048 A1 * 5/2020 Kim ...................... H04W 72/12
(Continued)

OTHER PUBLICATIONS

Moderator (Nokia), et al., "Summary #1 of Multi-TRP PUCCB and PUSCB Enhancements", 3GPP TSG RAN WG1 #106-e, 3GPP Draft, R1-2108298, F-06921 Sophia-Antipolis Cedex, France, vol. RAN WG1, No. e-Meeting, Aug. 16, 2021 (Year: 2021).*
(Continued)

*Primary Examiner* — Lan-Huong Truong
(74) *Attorney, Agent, or Firm* — Harrity & Harrity, LLP

(57) ABSTRACT

A method of wireless communication performed by a user equipment (UE) includes: receiving, from a base station (BS), a multi-transport block (TB) repetition configuration indicating a first number of repetitions and a second number of repetitions; receiving, from the BS, downlink control information (DCI) indicating a beam pattern including a plurality of beam directions; communicating, with the BS based on the multi-TB repetition configuration and the beam pattern, a first TB and a second TB associated with a same scheduling grant, wherein the communicating the first TB and the second TB includes: communicating the first number of repetitions for the first TB; and communicating the second number of repetitions for the second TB.

27 Claims, 17 Drawing Sheets

(56) References Cited

U.S. PATENT DOCUMENTS

2020/0204312 A1* 6/2020 Xu .................... H04L 27/26025
2022/0303950 A1* 9/2022 Ye ......................... H04W 16/28

OTHER PUBLICATIONS

International Search Report and Written Opinion—PCT/CN2021/113189—ISA/EPO—Feb. 2, 2022.
Moderator (Nokia), et al., "Summary #1 of Multi-TRP PUCCB and PUSCB Enhancements", 3GPP TSG RAN WG1 #106-e, 3GPP Draft, R1-2108298, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16, 2021-Aug. 27, 2021, 51 Pages, Aug. 17, 2021 (Aug. 17, 2021), XP052042113, p. 43.
TCL: "Enhancements for Unlicensed Band URLLC/IIoT", 3GPP Draft, 3GPP TSG RAN WG1 #104-e, R1-2100543, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021 (Jan. 18, 2021), XP051970434, 7 Pages, Feb. 5, 2021 (Feb. 5, 2021).

* cited by examiner

1100

Transmit, to a user equipment (UE), a multi-transport block (TB) repetition configuration indicating a first number of repetitions and a second number of repetitions

1110

Transmit, to the UE, downlink control information (DCI) indicating a beam pattern including a plurality of beam directions

1120

Communicate, with the UE based on the multi-TB repetition configuration and the beam pattern, a first TB and a second TB associated with a same scheduling grant, wherein the communicating includes:

Communicating the first number of repetitions of the first TB; and

Communicating the second number of repetitions of the second TB; and

1130

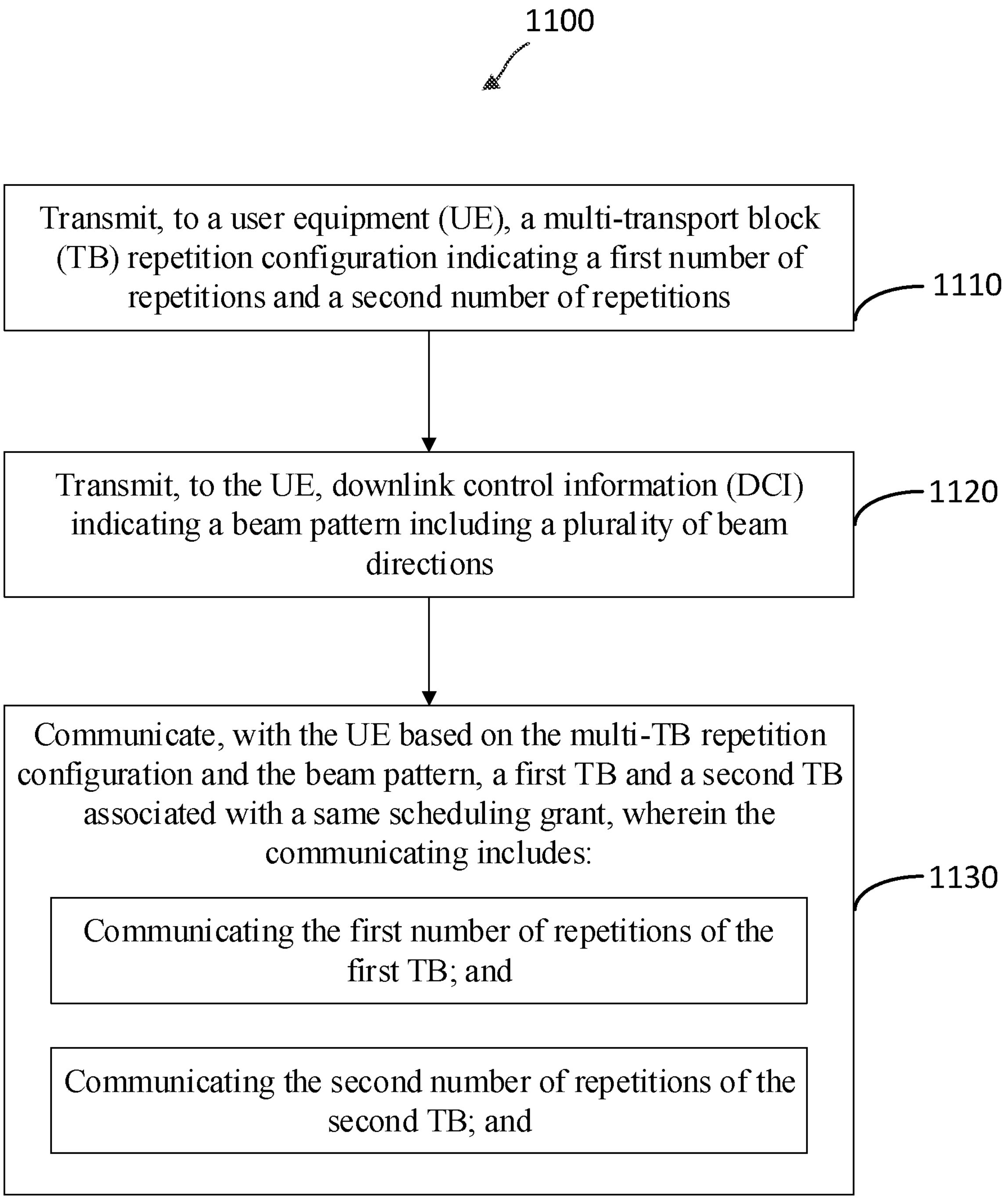

Receive, from a base station (BS), a multi-transport block (TB) repetition configuration indicating a first number of repetitions and a second number of repetitions

1210

Receive, from the BS, downlink control information (DCI) indicating a beam pattern including a plurality of beam directions

1220

Communicate, with the BS based on the multi-TB repetition configuration and the beam pattern, a first TB and a second TB associated with a same scheduling grant, wherein the communicating includes:

Communicating the first number of repetitions of the first TB; and

Communicating the second number of repetitions of the second TB; and

1230

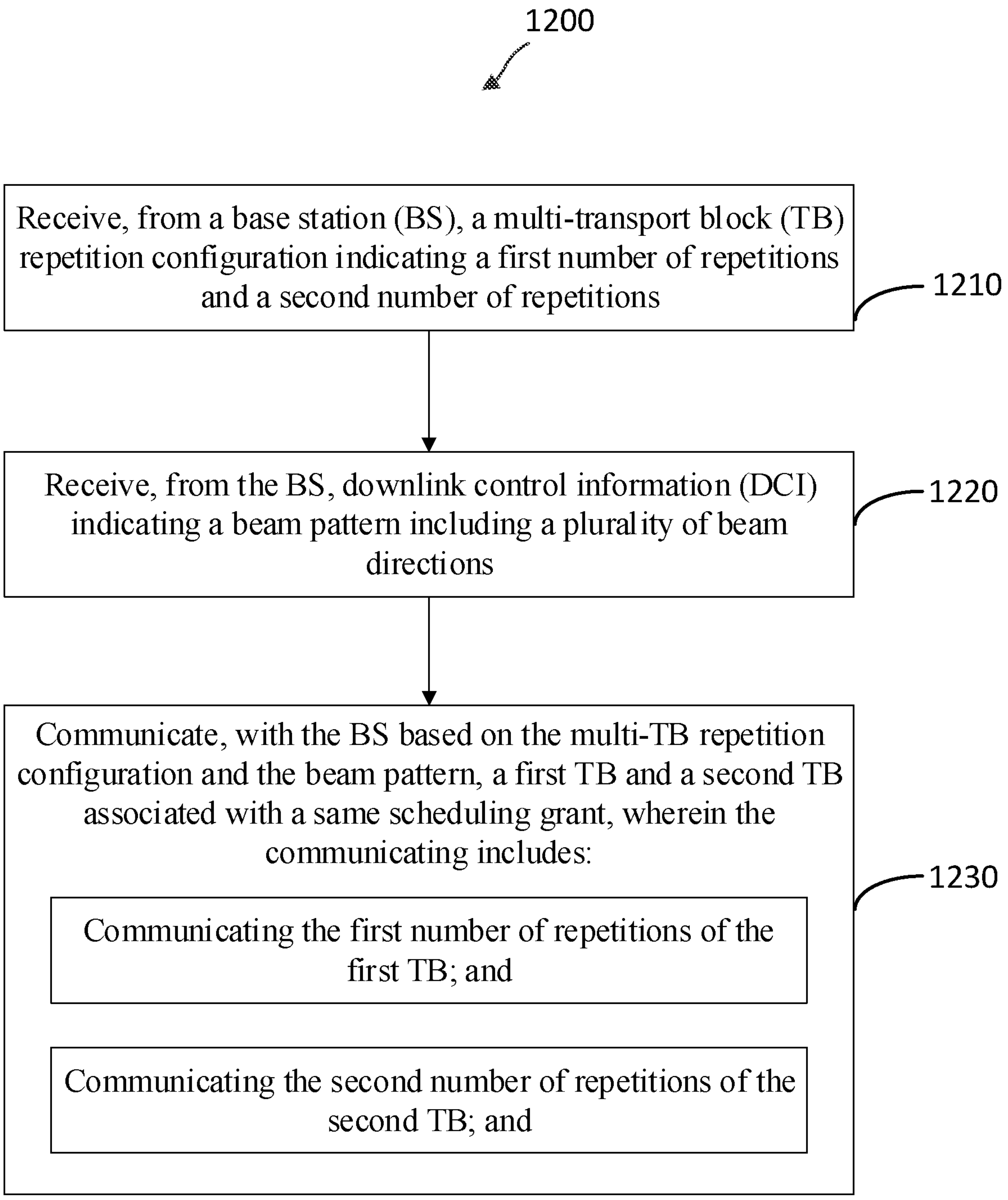

FIG. 12

BEAM MANAGEMENT FOR MULTIPLE TRANSPORT BLOCK TRANSMISSION WITH REPETITIONS

CROSS-REFERENCE TO RELATED APPLICATIONS

The present application is a 35 U.S.C. 371 National Phase entry of Patent Cooperation Treaty (PCT) Application No. PCT/CN2021/113189, filed Aug. 18, 2021, which is hereby expressly incorporated herein by reference in its entirety.

TECHNICAL FIELD

The present disclosure is directed to wireless communication systems and methods, and in particular to systems and methods for communicating repetitions of multiple transport blocks associated with a scheduling grant.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to providing a high-reliability communication is to use transport block (TB) repetition to transmit downlink (DL) and/or uplink (UL) payloads, which may also be referred to as TBs, multiple times. This may increase the chances that the BS or UE successfully receives and/or decodes the payload. To further improve communication reliability, hybrid automatic repeat request (HARQ) techniques can be applied to TB repetition transmission whereby the BS schedules the UE with a retransmission of one or more TBs.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method of wireless communication performed by a user equipment (UE) includes: receiving, from a base station (BS), a multi-transport block (TB) repetition configuration indicating a first number of repetitions and a second number of repetitions; receiving, from the BS, downlink control information (DCI) indicating a beam pattern including a plurality of beam directions; communicating, with the BS based on the multi-TB repetition configuration and the beam pattern, a first TB and a second TB associated with a same scheduling grant, wherein the communicating the first TB and the second TB includes: communicating the first number of repetitions for the first TB; and communicating the second number of repetitions for the second TB.

According to another aspect of the present disclosure, a method of wireless communication performed by a BS includes: transmitting, to a UE, a multi-TB repetition configuration indicating a first number of repetitions and a second number of repetitions; transmitting, to the UE, downlink control information (DCI) indicating a beam pattern including a plurality of beam directions; communicating, with the UE based on the multi-TB repetition configuration and the beam pattern, a first TB and a second TB associated with a same scheduling grant, wherein the communicating the first TB and the second TB includes: communicating the first number of repetitions for the first TB; and communicating the second number of repetitions for the second TB.

According to another aspect of the present disclosure, a user equipment (UE) includes: a transceiver; and a processor in communication with the transceiver and configured to cause the transceiver to: receive, from a base station (BS), a multi-transport block (TB) repetition configuration indicating a first number of repetitions and a second number of repetitions; receive, from the BS, downlink control information (DCI) indicating a beam pattern including a plurality of beam directions; communicate, with the BS based on the multi-TB repetition configuration and the beam pattern, a first TB and a second TB associated with a same scheduling grant, wherein the processor configured to cause the transceiver to communicate the first TB and the second TB includes the processor configured to cause the transceiver to: communicate the first number of repetitions for the first TB; and communicate the second number of repetitions for the second TB.

According to another aspect of the present disclosure, a base station (BS) includes: a transceiver; and a processor in communication with the transceiver and configured to cause the transceiver to: transmit, to a user equipment (UE), a multi-transport block (TB) repetition configuration indicating a first number of repetitions and a second number of repetitions; transmit, to the UE, downlink control information (DCI) indicating a beam pattern including a plurality of beam directions; communicate, with the UE based on the multi-TB repetition configuration and the beam pattern, a first TB and a second TB associated with a same scheduling grant, wherein the processor configured to cause the transceiver to communicate the first TB and the second TB includes the processor configured to cause the transceiver to:

communicate the first number of repetitions for the first TB; and communicate the second number of repetitions for the second TB.

According to another aspect of the present disclosure, a non-transitory, computer-readable medium having program code recorded thereon, the program code comprising code for causing a user equipment (UE) to: receive, from a base station (BS), a multi-transport block (TB) repetition configuration indicating a first number of repetitions and a second number of repetitions; receive, from the BS, downlink control information (DCI) indicating a beam pattern including a plurality of beam directions; communicate, with the BS based on the multi-TB repetition configuration and the beam pattern, a first TB and a second TB associated with a same scheduling grant, wherein the code for causing the UE to communicate the first TB and the second TB includes code for causing the UE to: communicate the first number of repetitions for the first TB; and communicate the second number of repetitions for the second TB.

According to another aspect of the present disclosure, a non-transitory, computer readable medium has program code recorded thereon, the program code comprising code for causing a base station (BS) to: transmit, to a user equipment (UE), a multi-transport block (TB) repetition configuration indicating a first number of repetitions and a second number of repetitions; transmit, to the UE, downlink control information (DCI) indicating a beam pattern including a plurality of beam directions; communicate, with the UE based on the multi-TB repetition configuration and the beam pattern, a first TB and a second TB associated with a same scheduling grant, wherein the code for causing the BS to communicate the first TB and the second TB includes code for causing the BS to: communicate the first number of repetitions for the first TB; and communicate the second number of repetitions for the second TB.

According to another aspect of the present disclosure, a user equipment (UE) includes: means for receiving, from a base station (BS), a multi-transport block (TB) repetition configuration indicating a first number of repetitions and a second number of repetitions; means for receiving, from the BS, downlink control information (DCI) indicating a beam pattern including a plurality of beam directions; means for communicating, with the BS based on the multi-TB repetition configuration and the beam pattern, a first TB and a second TB associated with a same scheduling grant, wherein the means for communicating the first TB and the second TB includes: means for communicating the first number of repetitions for the first TB; and means for communicating the second number of repetitions for the second TB.

According to another aspect of the present disclosure, a base station (BS) includes: means for transmitting, to a user equipment (UE), a multi-transport block (TB) repetition configuration indicating a first number of repetitions and a second number of repetitions; means for transmitting, to the UE, downlink control information (DCI) indicating a beam pattern including a plurality of beam directions; means for communicating, with the UE based on the multi-TB repetition configuration and the beam pattern, a first TB and a second TB associated with a same scheduling grant, wherein the means for communicating the first TB and the second TB includes: means for communicating the first number of repetitions for the first TB; and means for communicating the second number of repetitions for the second TB.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 11 is a flow diagram of a communication method according to some aspects of the present disclosure.

FIG. 12 is a flow diagram of a communication method according to some aspects of the present disclosure.

DETAILED DESCRIPTION

Figure 1:
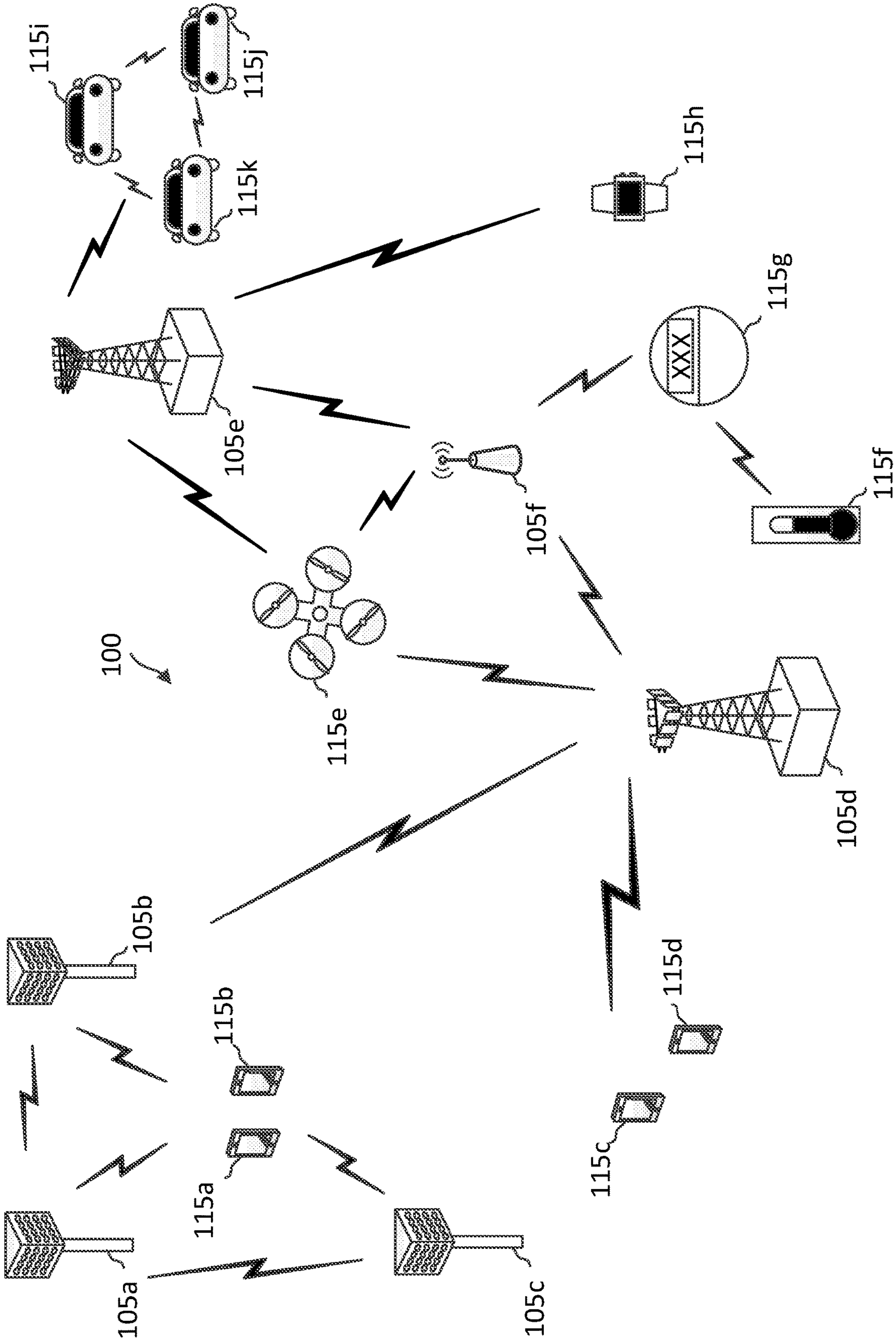
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., −1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a base station (BS) and a user equipment (UE) may use hybrid automatic repeat request (HARQ) and transport block (TB) repetition techniques to improve the reliability and quality of a wireless connection. The BS and/or the UE may communicate TB repetitions using different redundancy versions to improve decoding performance. For the purposes of the present disclosure, a TB repetition may refer to one of multiple retransmissions of a TB, or a single TB transmission. Accordingly, if a BS schedules a single transmission of a TB, the transmission may be referred to as a "repetition," even though it is the only transmission. In other words, both a transmission of a TB, and a retransmission of the TB may be referred to as repetitions for the purposes of the present disclosure. When operating over a licensed band, the BS may assign a HARQ process and/or a HARQ redundancy version for transmission in each transmission time occasion.

In some aspects, more than one TB are scheduled with a single scheduling grant, such as a dynamic grant indicated in DCI, a semi-static grant, a configured grant (CG), etc. One or more of the TBs scheduled may have a different quality of service (QoS) requirements or other parameters than the other TBs scheduled in the same scheduling grant. In some aspects of the present disclosure, multi-TB communications with repetitions are scheduled with a single scheduling grant, and a beam pattern may be mapped to a multi-TB communication with repetitions to achieve one or more objectives, such as providing beam diversity, decreasing latency, reducing beam switching, Further, in some instances multi-TB communications with repetitions are scheduled in a way that efficiently uses network resources, decreases latency, and/or provides interference diversity for repetitions of the same TB for improved decoding.

The present application describes mechanisms for performing multi-TB communications using TB repetitions. For example, a method for multi-TB repetition may include transmitting a multi-TB repetition configuration indicating one or more numbers of TB repetitions. The one or more numbers of TB repetitions may indicate how many repetitions of one or more TBs in the multi-TB communication may be transmitted or received. The multi-TB repetition configuration may include a beam mapping configuration for mapping one or more beam patterns onto one or more repetitions. For example, the multi-TB repetition configuration may indicate the UE to map a beam pattern to all repetitions of all TBs, to map one or more beam patterns to based on TB, and/or to map the beam pattern based on a number of repetitions of each TB. The multi-TB repetition configuration may include or indicate a plurality of time-domain configurations and/or one or more numbers of repetitions associated with the one or more TBs. The BS may transmit an indication of a beam pattern, which may include one or more TCI states associated with one or more beam directions. The one or more beam patterns may be arranged sequentially, cyclically, half/half, or any other suitable pattern. In some aspects, the BS may transmit the first number of repetitions of the first TB and the second number of repetitions of the second TB based on the multi-TB repetition configuration and the beam pattern. In some aspects, the BS may receive from a UE or other device the first number of repetitions of the first TB and the second number of repetitions of the second TB based on the multi-TB repetition configuration and the beam pattern.

The systems, devices, and methods described herein may allow for efficient and/or flexible mechanisms for scheduling and communicating multiple TBs with repetitions using a single scheduling grant. Further, the mechanisms described herein may allow the repetitions of different TBs to be communicated in a way that increases interference diversity or beam diversity, reduces beam switching, and/or otherwise improves latency and reliability, thereby improving user experience.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as channel occupancy time (COT). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. An LBT may include one, two, or more clear channel assessments (CCAs) performed during successive time periods. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random back-off period. For instance, a transmitting node may determine a channel measurement in a time interval and determine whether the channel is available or not based on a comparison of the channel measurement against a ED threshold. A CAT4 LBT refers to an LBT with a random back-off and a variable contention window (CW). For instance, a transmitting node may draw a random number and back-off for a duration based on the drawn random number in a certain time unit.

In some aspects, a BS 105 may transmit, or receive, multiple transport blocks (TBs) based on a single scheduling grant. For example, the BS 105 may transmit DCI scheduling a first TB and a second TB. Further, the BS 105 may perform multiple transmissions, or repetitions, of a TB to provide increased reliability and quality of service (QoS). The BS 105 may transmit or indicate a TB repetition configuration, which may include a repetition type for each TB and/or each physical shared channel (e.g., PUSCH, PDSCH). In repetition type-A, the BS 105 and/or UE 115 is configured to communicate a single TB repetition per slot. In repetition type-B, the BS 105 and/or UE 115 is configured to communicate multiple TB repetitions per slot. As such, type-B repetition may be suitable for ultra-reliable, low-latency communication (URLLC) applications. In repetition type-B, a time-domain resource assignment (TDRA) field may be provided in a DCI or in a CG configuration, which identifies the time/frequency resources for a first TB repetition. Further, the BS 105 may configure a UE 115 with one or more beam configurations. The BS 105 may indicate one or more beam directions and/or beam patterns based on the number of TBs, a mapping type associated with one or more of the TBs, a configured repetition type, and/or the number of repetitions of each TB.

Figure 2A:
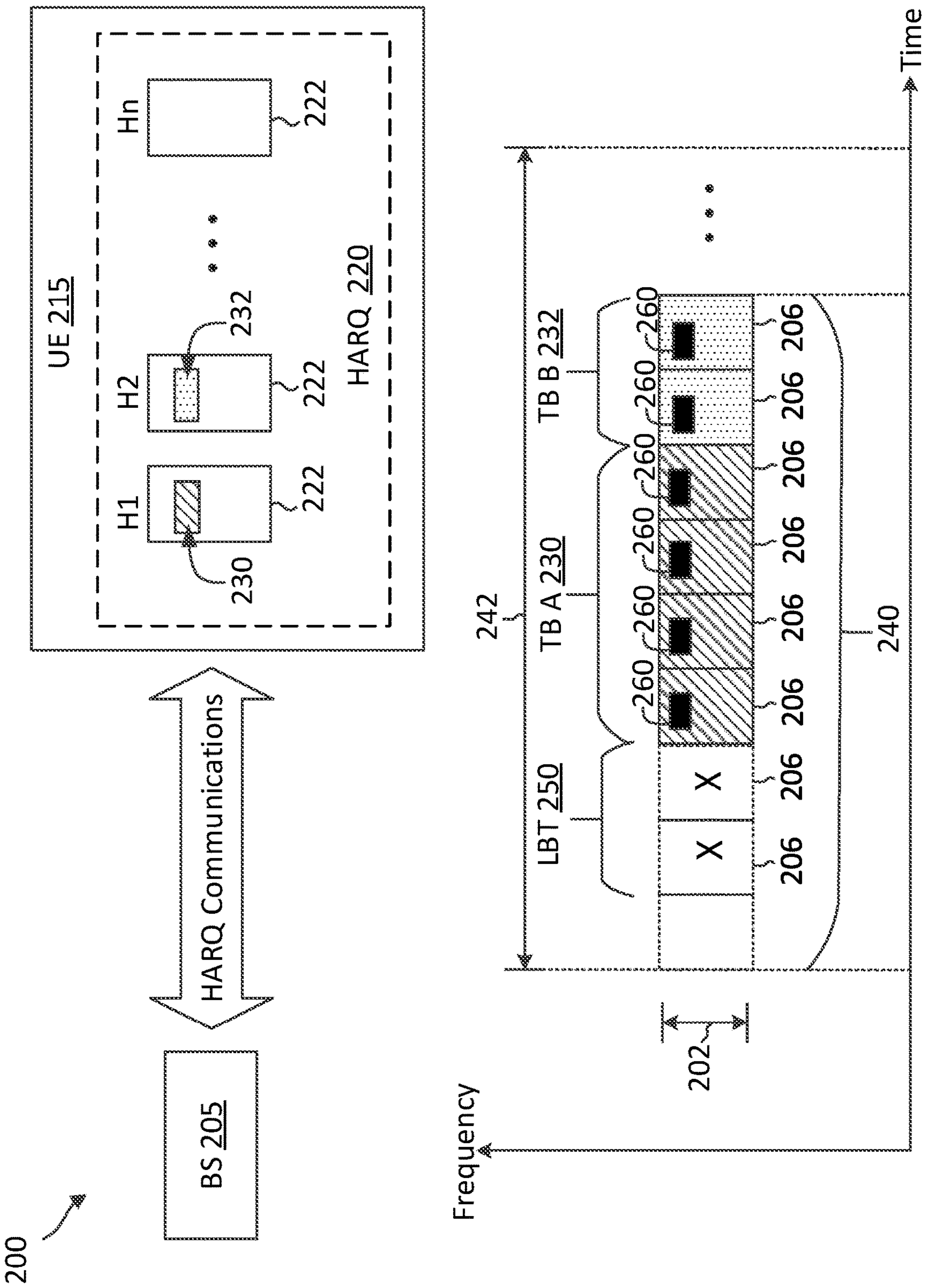
FIG. 2A illustrates a hybrid automatic repeat request (HARQ) communication scenario according to some aspects of the present disclosure.

FIG. 2A illustrates a hybrid automatic repeat request (HARQ) communication scenario according to some aspects of the present disclosure. The scenario 200 may correspond to a HARQ communication scenario in the network 100 when the network 100 operates over a shared frequency band or an unlicensed frequency band. In FIG. 2A, the x-axis represents time in some constant units. In the scenario 200, a BS 205 similar to the BSs 105 may communicate data with a UE 215 similar to the UEs 115 using HARQ over a frequency band 202, which may be a licensed frequency band or a shared radio frequency band in a shared spectrum or an unlicensed spectrum, shared by multiple network operating entities. The frequency band 202 may be located at any suitable frequencies. In some aspects, the frequency band 202 may be located at about 3.5 GHz, 6 GHz, 30 GHz or beyond 52.6 GHz, etc.

For HARQ communications, a transmitting node (e.g., the UE 215) may transmit data (e.g., in the form of a TB) to a receiving node (e.g., the BS 205). The receiving node may provide the transmitting node with a feedback on the reception status of the data. For example, the receiving node may transmit an ACK to the transmitting node to indicate a successful decoding of the data. Conversely, the receiving node may transmit a NACK to the transmitting node to indicate a decoding failure for the data. When the transmitting node receives an ACK from the receiving node, the transmitting node may transmit new data in a subsequent transmission. However, when the transmitting node receives a NACK from the receiving node, the transmitting node may retransmit the same data to the receiving node. In some instances, the transmitting node may use the same encoding version for the initial transmission and the retransmission. In some other instances, the transmitting node may use different encoding versions for the initial transmission and the retransmission. The encoding versions may be referred to as redundancy versions. Different redundancy versions may include different combinations of systematic data information bits and error correction bit. In some aspects, the receiving node may perform soft-combining to decode the data based on the initial transmission and the retransmission. For simplicity of discussion and illustration, FIG. 2A illustrates the HARQ communication in the context of UL data communications, though similar HARQ mechanisms may be applied to DL data communications.

As an example, the UE 215 includes a HARQ component 220. The HARQ component 220 is configured to perform multiple parallel HARQ processes 222 for UL data communications. The HARQ processes 222 may operate independent of each other. In other words, the ACKs, NACKs, and/or retransmissions are determined and processed separately for each HARQ process 222 at the BS 205 and at the UE 215. Each HARQ process 222 may be identified by a HARQ process identifier (ID). For example, the HARQ processes 222 may be identified by identifiers H1, H2, . . . Hn. Each HARQ process 222 may have one or more TBs ready for transmission. In the illustrated example of FIG. 2A, the HARQ process H1 222 has one TB 230 ready for transmission and the HARQ process H2 222 has one TB 232 ready for transmission. The BS 205 may configure the UE 215 with configured resources for autonomous or unscheduled transmission. The UE 215 may transmit the TB 230 and the TB 232 to the BS 205 using a configured resource.

In some aspects, the BS 205 may configure the UE 215 with a configured resource 240. The configured resource 240 may be periodic. For instance, the configured resource 240 may be repeated at a time interval 242. The configured resource 240 may be partitioned into a plurality transmission time periods or slots 206. Each slot 206 may include any suitable number of OFDM symbols depending on the transmission configurations or numerology (e.g., the subcarrier spacing (SCS) and/or the cyclic prefix (CP) mode) in use.

The UE 215 may perform an LBT 250 in the frequency band 202 prior to a transmission. As an example, a first LBT 250 attempt for a transmission in a second slot 206 within the configured resource 240 failed (shown by the cross symbol). A second LBT 250 attempt for a transmission in a third slot 206 within the configured resource 240 also failed (shown by the cross symbol). A third LBT attempt for a transmission in a fourth slot 206 within the configured resource 240 is a pass. Thus, the UE 215 may initiate a transmission beginning at the fourth slot 206. Once the UE 215 won a contention (e.g., passing the LBT 250), the UE 215 may use the configured resource for a number of consecutive HARQ transmissions.

In the illustrated example of FIG. 2A, after passing the LBT 250, the UE 215 transmits four repetitions of the TB 230, denoted as TB A, followed by two repetitions of the TB 232, denoted as TB B, in consecutive slots 206. In some aspects, the UE 215 may transmit the repetitions for the TB 230 using different redundancy versions and/or the same redundancy versions. In some instances, each repetition may use a different RVN. In some instances, all repetitions may use the same RVN. In some instances, at least two repetitions may use the same RVN. Similarly, the UE 215 may transmit the repetitions for the TB 232 using different redundancy versions and/or the same redundancy versions. In some aspects, the UE 215 may include a RVN and/or a HARQ ID for each transmission, for example, in uplink control information (UCI) 260. For instance, the RVN may indicate a RV0, a RV1, a RV2, a RV3, a RV4, and so on. Each transmission for the TB A 230 may include UCI 260 indicating a HARQ ID H1. Similarly, each transmission for the TB B 232 may include UCI 260 indicating a HARQ ID H2. The UE 215 may further indicate whether a transmission is an initial transmission or a retransmission by including a new data indicator (NDI) in the UCI 260. For example, the NDI may be set to a value of 1 to indicate that a corresponding transmission is an initial transmission and may be set to a value of 0 to indicate that a corresponding transmission is a retransmission. For instance, the UCI 260 for each transmission of the TB A 230 may include a NDI with a value of 1 to indicate that the repetitions of the TB A 230 are associated with an in initial transmissions of the TB A 230. The UCI 260 for each transmission of the TB B 232 may include a NDI with a value of 0 to indicate that the repetitions of the TB B 232 are associated with a retransmission of the TB B 232. In some aspects, the UE 215 may determine a RV sequence (e.g., a sequence of RVNs) for transmitting one or more redundancy versions of a TB in a configured resource and/or how to prioritize transmission of one TB of a certain HARQ process 222 over another TB of another HARQ process 222 without assistance from the BS 205. In some other instances, the BS 205 may provide the UE with some assistance in the RV sequence determination and/or HARQ ID selection.

Figure 2B:
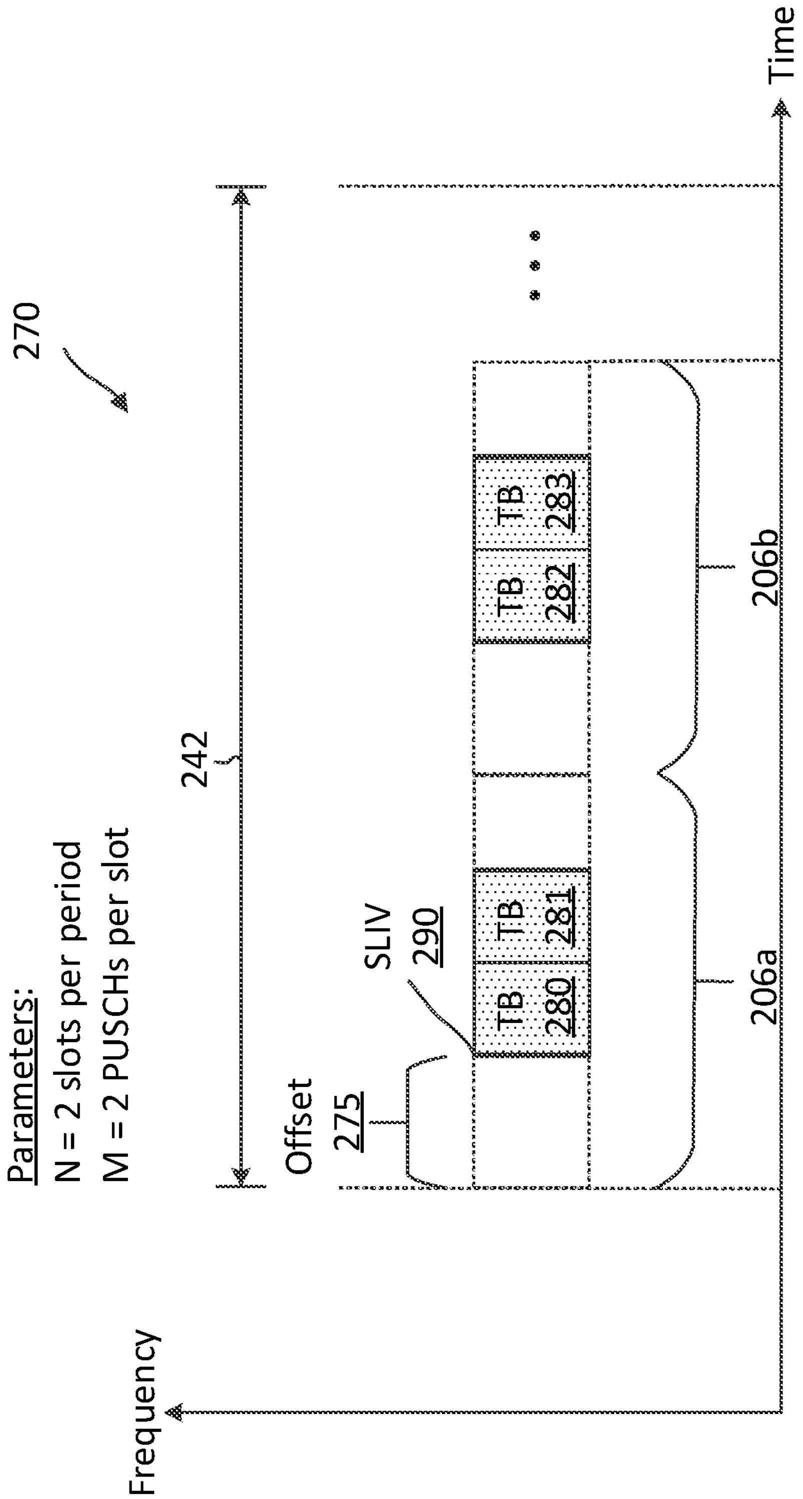
FIG. 2B illustrates a HARQ communication scenario according to some aspects of the present disclosure.

FIG. 2B illustrates a hybrid automatic repeat request (HARQ) communication scenario according to some aspects of the present disclosure. The functionality of scheme 270 can be executed by a computing device (e.g., a processor, processing circuit, and/or other suitable component) of a wireless communication device or other suitable means. In some aspects, a wireless communication device such as the UE 115 or UE 900 of FIG. 9 may utilize one or more components, such as the processor 902, the memory 904, the Multi-TB Repetition Module 908, the transceiver 910, the modem 912, and the one or more antennas 916, to execute the steps of scheme 270. Further, a wireless communication device such as the base station (BS) 105 or BS 1000 of FIG. 10 may utilize one or more components, such as the processor 1002, the memory 1004, the Multi-TB Repetition Module 1008, the transceiver 1010, the modem 1012, and the one or more antennas 1016, to execute the steps of scheme 270. The scheme 270 may employ similar mechanisms as described in FIGS. 1-2A. In FIG. 2B, the x-axis represents time in some arbitrary units, and the y-axis represents frequency in some arbitrary units.

As illustrated in FIG. 2B, TBs 280, 281, 282, and 283 may be transmitted in more than one slot 206*a* and 206*b* of a configured grant resource 242. For instance, TBs may be transmitted in a number N slots per period. More than one TB may be transmitted in each of the multiple slots of the configured grant resource. For instance, TBs may be transmitted in a number M PUSCHs per slot. The BS may configure a number of HARQ processes Y (or nrofHARQ-Processes) associated with the PUSCHs of the configured grant resource 242. The configured grant resource 242 may be in a licensed or unlicensed frequency band or spectrum.

A BS may provide a UE with an information element or parameter(s) including a start and length indicator value (SLIV) 290 for a first PUSCH (time-domain allocation) in a slot, where a SLIV indicates the starting position in terms of the current symbol or a symbol index and the length of the PUSCH. The PUSCH starting position and length may repeat over each of the plurality of slots associated with the configured grant resources. For instance, SLIV 290 indicates the position of the first PUSCH of the first slot 206*a* of the configured grant resource 242. The position of the first PUSCH of the first slot may be offset 275 from the beginning of the configured grant resource 242. The SLIV 290 may also indicate a length or number of symbols for each PUSCH.

Although the examples described in FIGS. 2A and 2B are described with respect to UL communications transmitted in PUSCH, it will be understood that the schemes and mechanisms described herein also apply to DL communications transmitted in PDSCH. In some aspects, communicating the TBs 280, 281, 282, and 283 comprises transmitting, by a first wireless communication device (e.g., BS 105, UE 115), a TB on a PDSCH/PUSCH associated with the starting HARQ process ID. In some instances, communicating a TB comprises receiving, by a first wireless communication device (e.g., UE 115, BS 105), a TB on a PUSCH/PDSCH associated with a starting HARQ process ID.

In some aspects, a UE may transmit more than one TB and with repetitions. Further, it may be advantageous to allow a UE to communicate TB repetitions with one or more beam configurations to provide interference diversity, for example. It may Accordingly, FIGS. 3A-7B describe various mechanisms for beam-based multi-TB repetitions and indication. It will be understood that various aspects of the schemes and mechanisms described in FIGS. 3A-7B may be performed by one or more wireless communication devices, such as a BS and/or a UE. Accordingly, a BS and/or a UE may perform the various aspects related to beam mapping and TB repetition mapping and communication described below.

According to aspects of the present disclosure, multiple TBs associated with different PDSCHs or PUSCHs can be communicated in a single scheduling grant (e.g., dynamic grant, semi-static grant). Multi-TB communications may also be referred to as multi-PDSCH or multi-PUSCH communications. Further, because the mechanisms may apply to TB communication in the UL, DL, or SL, the multi-TB communications and configurations described herein may be referred to as multi-PXSCH communications and configurations, where PXSCH refers to either PDSCH, PUSCH, or PSSCH. Further, although the methods and schemes described below may be discussed in the context of DL TB communication and/or UL TB communications, it will be understood that the mechanisms described herein may be used for DL, UL and/or SL communications of TBs. For example, a BS may transmit a multi-TB communication repetition based on a multi-TB repetition configuration, and the UE may receive and decode the multi-TB communication based on a multi-TB time-domain configuration indicated by the BS. Alternatively, or additionally, the UE may transmit one or more TBs to the BS based on the multi-TB time-domain configuration indicated by the BS.

Figure 3A:
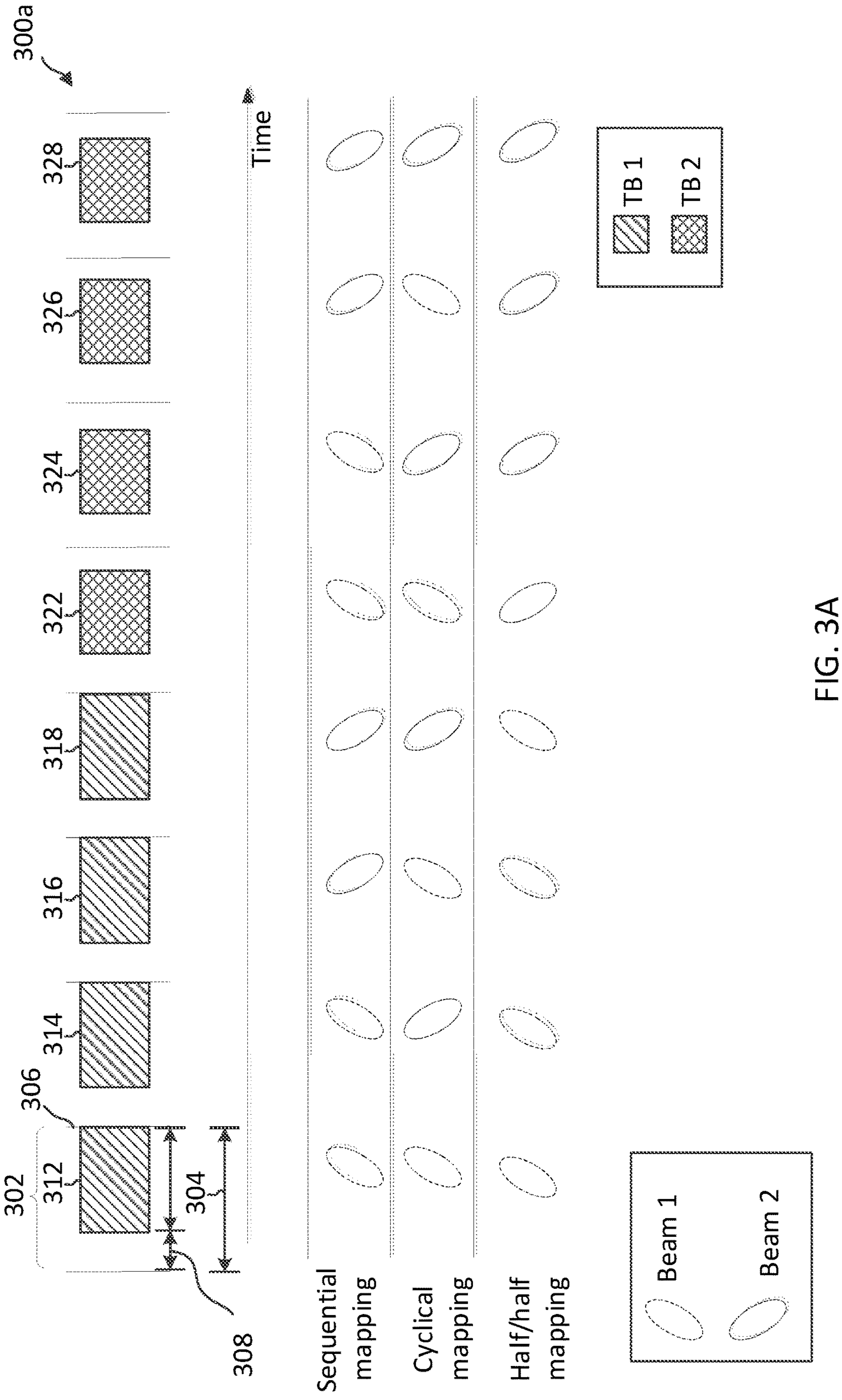
FIG. 3A illustrates a beam mapping scheme for a multi-transport block (TB) repetition communication scenario according to some aspects of the present disclosure.
Figure 3B:
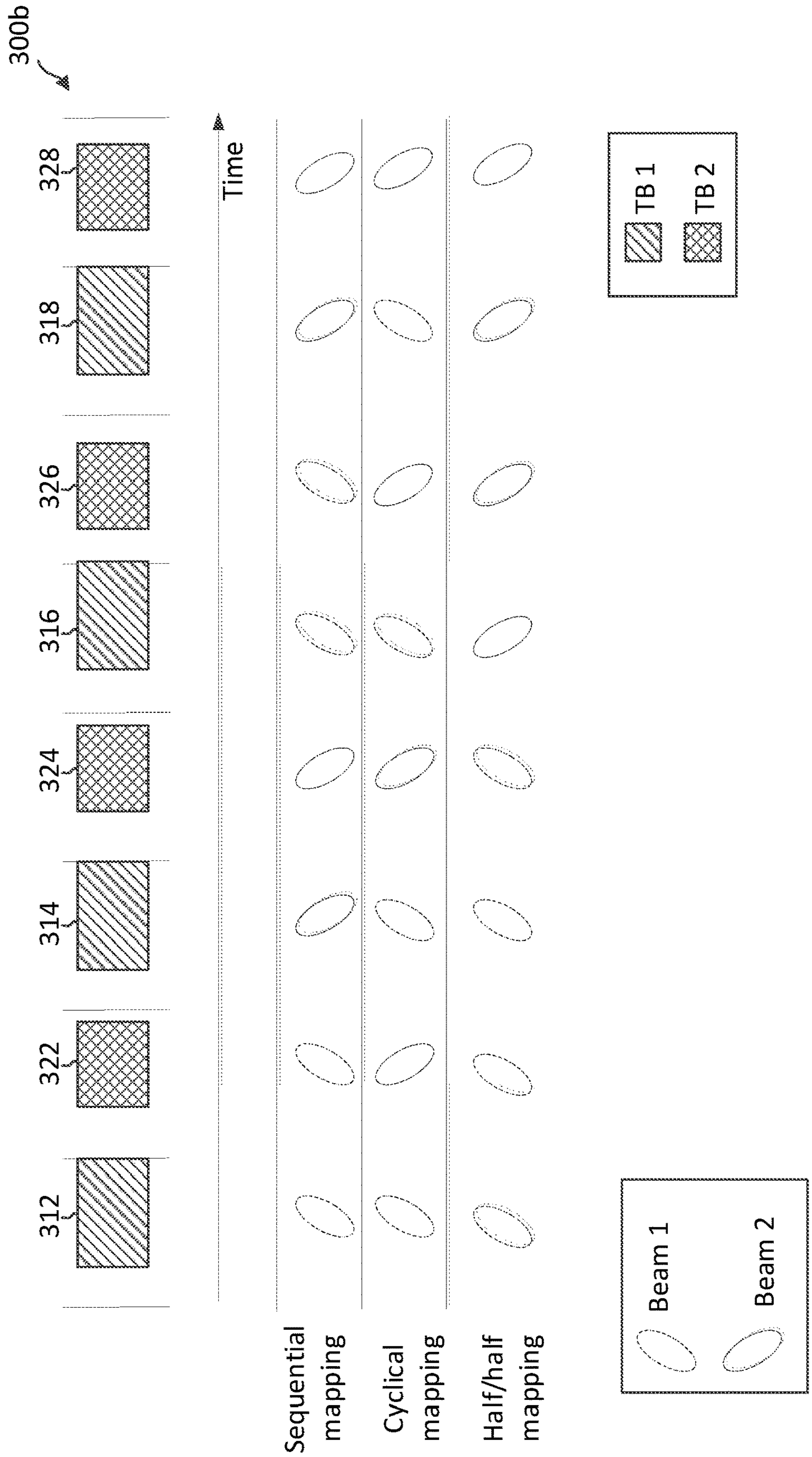
FIG. 3B illustrates a beam mapping scheme for a multi-TB repetition communication scenario according to some aspects of the present disclosure.

FIGS. 3A and 3B illustrate beam mapping and indication schemes 300*a*, 300*b* for multi-TB communication, according to some aspects of the present disclosure. In FIGS. 3A and 3B, the x-axis represents time in some constant units. In the schemes 300*a*, 300*b*, a BS similar to the BSs 105 may communicate one or more repetitions of a plurality of TBs. The BS and UE may communicate at any suitable frequencies. In some aspects, the BS and the UE may communicate at frequencies of about 3.5 GHz, 6 GHz, 30 GHz or beyond 52.6 GHz. In the schemes 300*a*, 300*b*, the BS 105 maps beam sequences onto a multi-TB repetition sequence including a first plurality of TB repetitions of a first TB and a second plurality of repetitions of a second TB. The mapping of the beams or beam directions (e.g., TCI states) to the repetitions is based on the order of the repetitions, whether mapped sequentially or cyclically. Repetitions may be described as sequential if the repetitions of a first TB are transmitted together, followed by the repetitions of a second TB. A sequential multi-TB repetition sequence is shown in FIG. 3A. Repetitions may be described as cyclical if the repetitions of a first TB are transmitted interlaced with the repetitions of a second TB and/or other TBs. A cyclical multi-TB repetition sequence is shown in FIG. 3B. The UE 115 may utilize one or more components of the UE 900 illustrated in FIG. 9, for example, such as the processor 902, the memory 904, the Multi-TB Repetition Module 908, the transceiver 910, the modem 912, and the one or more antennas 916, to execute the steps of schemes 300*a*, 300*b*. Further, the BS may utilize one or more of the components of the BS 1000 shown in FIG. 10, such as the processor 1002, the memory 1004, the Multi-TB Repetition Module 1008, the transceiver 1010, the modem 1012, and the one or more antennas 1016, to execute the steps of schemes 300*a* and 300*b*.

Referring to FIG. 3A, the scheme 300*a* includes the BS and/or the UE communicating a plurality of TB repetitions 312, 314, 316, 318, 322, 324, 326, 328 corresponding to a first TB (TB 1) and a second TB (TB 2). The TB repetitions 312, 314, 316, 318, 322, 324, 326, 328 may be configured and transmitted according to a repetition type and/or mapping type, such as type A repetition or type B repetition, and type A mapping or type B mapping. In the illustrated example, the repetitions of the first TB and second TB are mapped to the time domain in a sequential fashion, where the repetitions of the first TB (312, 314, 316, 318) are transmitted in a first group followed by the repetitions of the second TB (322, 324, 326, 328). Each TB repetition is transmitted within a slot, such as the first slot 302. For example, the UE transmits the TB repetition 312 in the first slot 302, the TB repetition 314 in a second slot, the TB repetition 316 in a third slot, and so on. Each repetition may be transmitted based on a starting symbol or position (e.g., 308), and a length 306. The time mapping of the TB repetitions may be based on a multi-TB repetition configuration, and one or more time-domain configurations or indications. For example, the time mapping of the TB repetitions may be based on a number of repetitions configured via RRC, or configured via RRC and indicated by DCI. The parameters of the time-domain configuration may include start and length indicator values (SLIVs), mapping type, repetition type, number of repetitions, and/or any other suitable parameter.

FIG. 3A illustrates a plurality of beam mapping schemes, including sequential mapping, cyclical mapping, and half/half mapping. The beam mapping schemes may be applied by the BS and/or the UE to the complete multi-TB repetition sequence. In particular, the beam mapping schemes are applied to the multi-TB repetition sequence independently of the associated TB. Thus, the beam mapping may not be based on the TB corresponding to each repetition. In other aspects, such as the aspects shown in FIGS. 4A-5, one or more beam mapping schemes or beam patterns may be applied to the repetitions of a first TB and the repetitions of a second TB separately.

In the first example of FIG. 3A, a sequential beam mapping configuration is applied to the multi-TB repetition sequence in a {1, 1, 2, 2, 1, 1, 2, 2} pattern. With this beam mapping configuration and repetition mapping in the time domain, the repetitions of the first TB and the second TB are transmitted with beam diversity or interference diversity, where at least one repetition of each TB is transmitted in the first beam direction (Beam 1) and at least one repetition of the first TB and the second TB is transmitted in the second beam direction (Beam 2).

In the second example of FIG. 3A, a cyclical beam mapping configuration is applied to the multi-TB repetition sequence in a {1, 2, 1, 2, 1, 2, 1, 2} pattern. With this beam mapping configuration and repetition mapping in the time domain, the repetitions of the first TB and the second TB are again transmitted with beam diversity or interference diversity, where at least one repetition of each TB is transmitted in the first beam direction (Beam 1) and at least one repetition of the first TB and the second TB is transmitted in the second beam direction (Beam 2).

In the third example of FIG. 3A, a half/half beam mapping configuration is applied to the multi-TB repetition sequence in a {1, 1, 1, 1, 2, 2, 2, 2} pattern. With this beam mapping configuration and repetition mapping in the time domain, the repetitions of the first TB and the second TB are transmitted without beam diversity or interference diversity. In this regard, because the beam mapping pattern aligns with the repetition mapping pattern (sequential repetition mapping), the repetitions 312, 314, 316, 318 of the first TB are all transmitted in the first beam direction (Beam 1), and the repetitions 322, 324, 326, 328 of the second TB are all transmitted in the second beam direction (Beam 2).

FIG. 3B illustrates a scheme 300*b* similar in some aspects to the scheme 300*a*. For example, in the scheme 300*b*, a multi-TB communication includes two TBs, each communicated with four repetitions. However, in the scheme 300*b*, the repetitions are communicated with a cyclic TB mapping such that the repetitions (312, 314, 316, 318) of the first TB are interlaced with the repetitions (322, 324, 326, 328) of the second TB. Accordingly, although the beam mapping configurations shown in FIG. 3B are the same as those shown in FIG. 3A, the correspondence between the beam directions and the repetitions of the first TB and the second TB are different than that shown in FIG. 3A. In this regard, because the cyclical beam mapping pattern aligns with or matches the cyclic repetition pattern (TB 1, TB 2, TB 1, TB 2, . . . ), the repetitions 312, 314, 316, 318 of the first TB are only transmitted using the first beam direction, and the repetitions 322, 324, 326, 328 of the second TB are only transmitted using the second beam direction. Further, the half/half beam mapping allows for beam diversity or interference diversity in the scheme 300*b*, but not in the scheme 300*a*.

In some aspects, to provide beam diversity, the BS and/or the UE may be configured with a rule or parameter to override an indicated beam pattern or configuration based on a number of TBs and repetitions of each TB in the multi-TB communication. For example, in some aspects, if the BS and/or the UE are configured or indicated with a sequential beam mapping pattern, and there are two TBs and two repetitions of each TB indicated for the multi-TB communication, the BS and/or the UE may be configured to override the sequential beam pattern and apply a cyclic beam pattern. In another aspect, the TB repetition mapping may be determined or selected based on the beam mapping pattern and number of indicated beams. For example, in one aspect, if sequential beam mapping or half/half beam mapping is configured and the number of indicated beams (e.g., TCI states) is two, the BS and/or the UE may be configured to apply cyclic TB mapping (e.g., as shown in FIG. 3B). In another aspect, if cyclic beam mapping is configured and the number of indicated beams (e.g., TCI states) is 2, the BS and/or the UE may be configured to apply sequential TB mapping (e.g., as shown in FIG. 3A).

Figure 4A:
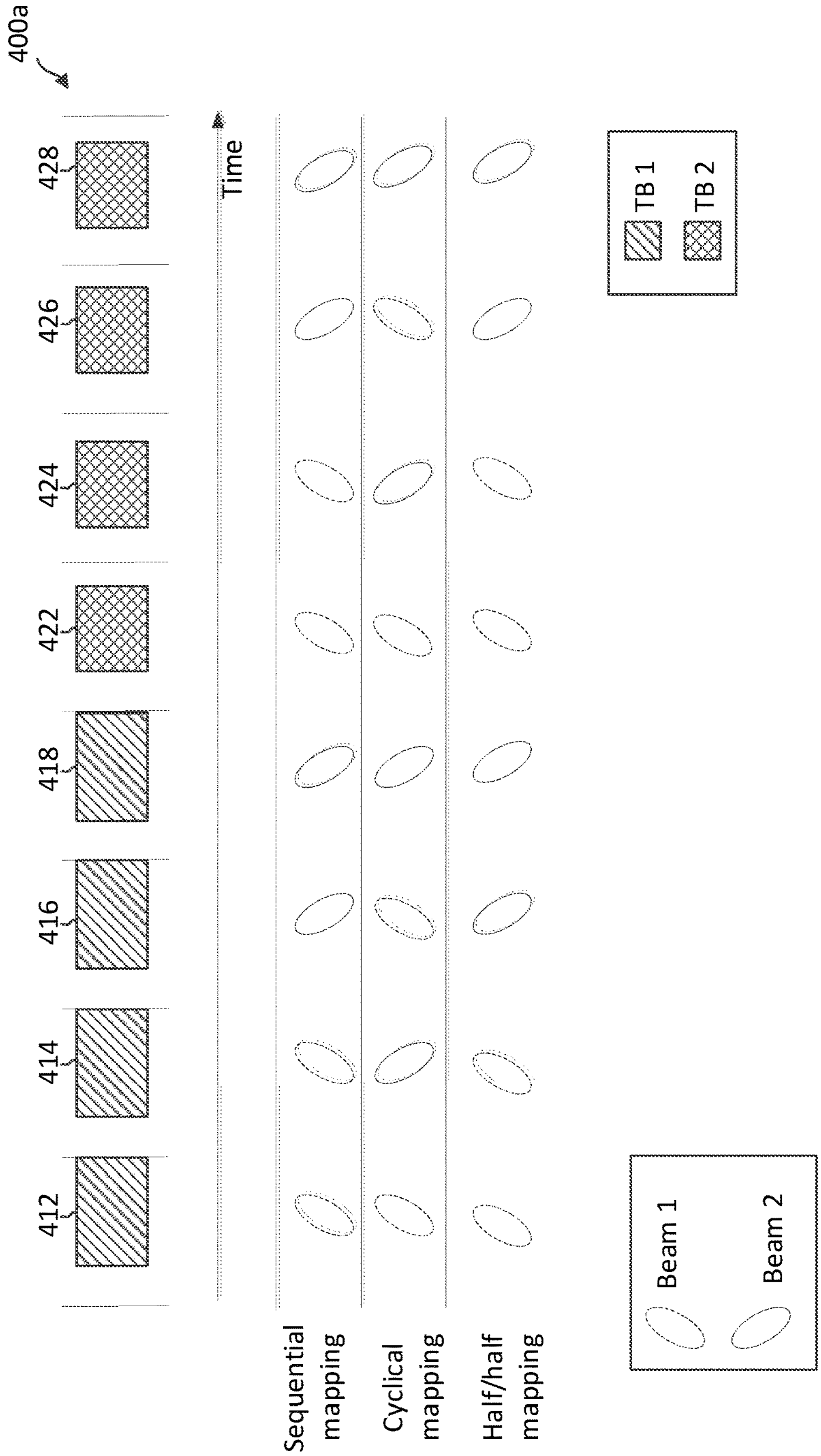
FIG. 4A illustrates a beam mapping scheme for a multi-TB repetition communication scenario according to some aspects of the present disclosure.
Figure 4B:
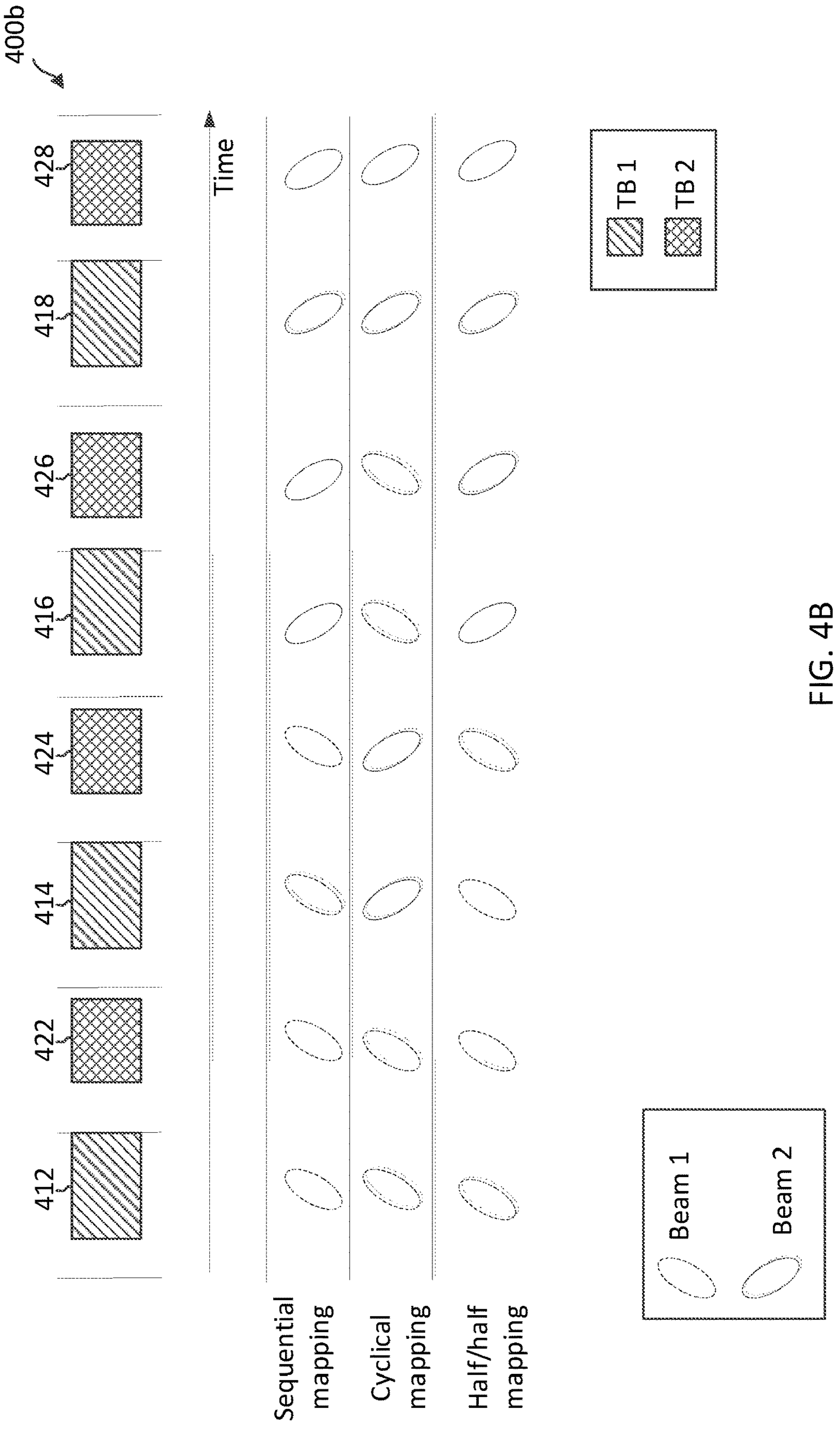
FIG. 4B illustrates a beam mapping scheme for a multi-TB repetition communication scenario according to some aspects of the present disclosure.

FIGS. 4A and 4B illustrate beam mapping and indication schemes 400*a*, 400*b* for multi-TB communication, according to some aspects of the present disclosure. In FIGS. 4A and 4B, the x-axis represents time in some constant units. In the schemes 400*a*, 400*b*, a BS similar to the BSs 105 may communicate one or more repetitions of a plurality of TBs. The BS and UE may communicate at any suitable frequencies. In some aspects, the BS and the UE may communicate at frequencies of about 3.5 GHz, 6 GHz, 30 GHz or beyond 52.6 GHz. In the schemes 400*a*, 400*b*, the BS 105 maps beam sequences onto a multi-TB repetition sequence including a first plurality of TB repetitions of a first TB and a second plurality of repetitions of a second TB. The BS maps the beams or beam directions (e.g., TCI states) to the repetitions based on the corresponding TB, and the order of the repetitions of each TB, whether mapped sequentially or cyclically. Accordingly, whereas the beam patterns illustrated in FIGS. 3A and 3B may be mapped to the repetitions without regard to the TB index in the schemes 300, the beam patterns illustrated in FIGS. 4A and 4B may be mapped to the repetitions of the first TB and the second TB separately, as explained further below. A sequential multi-TB repetition sequence is shown in FIG. 4A. A cyclical multi-TB repetition sequence is shown in FIG. 4B. The UE 115 may utilize one or more components of the UE 900 illustrated in FIG. 9, for example, such as the processor 902, the memory 904, the Multi-TB Repetition Module 908, the transceiver 910, the modem 912, and the one or more antennas 916, to execute the steps of schemes 400*a*, 400*b*. Further, the BS may utilize one or more of the components of the BS 1000 shown in FIG. 10, such as the processor 1002, the memory 1004, the Multi-TB Repetition Module 1008, the transceiver 1010, the modem 1012, and the one or more antennas 1016, to execute the steps of schemes 400*a* and 400*b*.

Referring to FIG. 4A, the scheme 400*a* includes communicating a plurality of TB repetitions 412, 414, 416, 418, 422, 424, 426, 428 corresponding to a first TB (TB 1) and a second TB (TB 2). The TB repetitions 412, 414, 416, 418, 422, 424, 426, 428 may be configured and transmitted according to a repetition type and/or mapping type, such as type A repetition or type B repetition, and type A mapping or type B mapping. In the illustrated example, the repetitions of the first TB and second TB are mapped to the time domain in a sequential fashion, where the repetitions of the first TB (412, 414, 416, 418) are transmitted in a first group followed by the repetitions of the second TB (422, 424, 426, 428). The time mapping of the TB repetitions may be based on a multi-TB repetition configuration, and one or more time-domain configurations or indications. For example, the time mapping of the TB repetitions may be based on a number of repetitions configured via RRC, or configured via RRC and indicated by DCI. The parameters of the time-domain configuration may include start and length indicator values (SLIVs), mapping type, repetition type, number of repetitions, and/or any other suitable parameter.

FIG. 4A illustrates a plurality of beam mapping schemes, including sequential mapping, cyclical mapping, and half/half mapping. The beam mapping patterns shown in FIG. 4A may be similar to the beam mapping patterns shown in FIGS. 3A and 3B, in some aspects. In the scheme 400*a*, the beam mapping schemes are applied to the repetitions of each TB separately. Thus, the beam mapping is based on the TB corresponding to each repetition.

In the first example of FIG. 4A, a sequential beam mapping configuration is applied to the repetitions of each TB in a {1, 1, 2, 2} pattern. With this beam mapping configuration and repetition mapping in the time domain, the repetitions of the first TB and the second TB are transmitted with beam diversity or interference diversity, where at least one repetition of each TB is transmitted in the first beam direction (Beam 1) and at least one repetition of the first TB and the second TB is transmitted in the second beam direction (Beam 2).

In the second example of FIG. 4A, a cyclical beam mapping configuration is applied to the repetitions of each TB in a {1, 2, 1, 2} pattern. With this beam mapping configuration and repetition mapping in the time domain, the repetitions of the first TB and the second TB are again transmitted with beam diversity or interference diversity, where at least one repetition of each TB is transmitted in the first beam direction (Beam 1) and at least one repetition of the first TB and the second TB is transmitted in the second beam direction (Beam 2).

In the third example of FIG. 4A, a half/half beam mapping configuration is applied to the multi-TB repetition sequence in a {1, 1, 2, 2} pattern. With this beam mapping configuration and repetition mapping in the time domain, the repetitions of the first TB and the second TB are transmitted with beam diversity or interference diversity.

FIG. 4B illustrates a scheme 400*b* similar in some aspects to the scheme 400*a*. For example, in the scheme 400*b*, a multi-TB communication includes two TBs, each communicated with four repetitions. However, in the scheme 400*b*, the repetitions are communicated with a cyclic TB mapping such that the repetitions (412, 414, 416, 418) of the first TB are interlaced with the repetitions (422, 424, 426, 428) of the second TB. Accordingly, although the TB mapping configurations shown in FIG. 4B are different from those shown in FIG. 4A, the correspondence between the beam directions and the repetitions of the first TB and the second TB are the same as that shown in FIG. 4A since the beam mapping is TB-based.

In some aspects, to provide beam diversity, the BS and/or the UE may be configured with a rule or parameter to override an indicated beam pattern or configuration based on a number of TBs and repetitions of each TB in the multi-TB communication. For example, in some aspects, if the BS and/or the UE are configured or indicated with a sequential beam mapping pattern, and there are two repetitions for a given TB indicated for the multi-TB communication, the BS and/or the UE may be configured to override the sequential beam pattern and apply a cyclic beam pattern for the TB.

Figure 5:
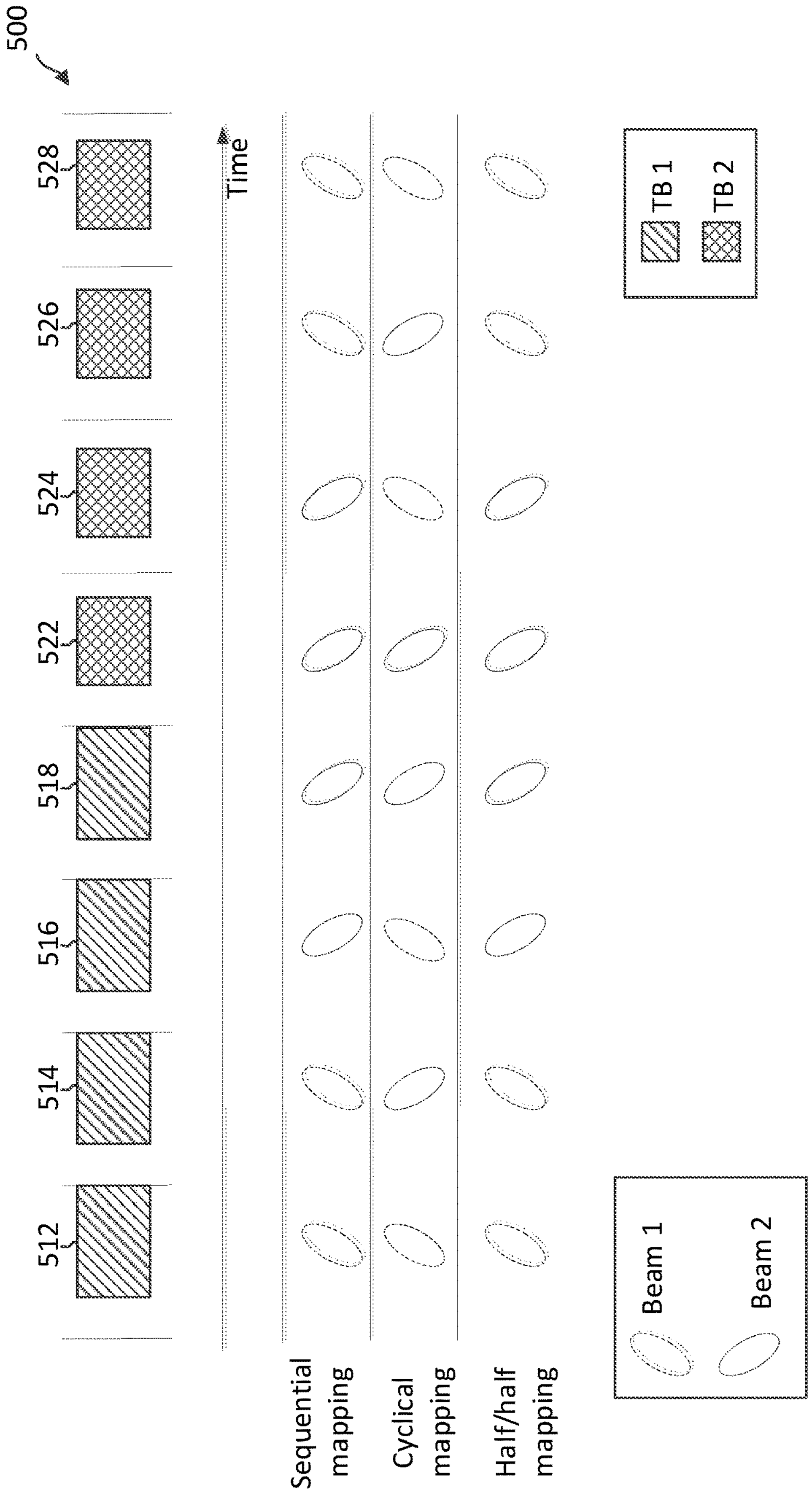
FIG. 5 illustrates a beam mapping scheme for a multi-TB repetition communication scenario according to some aspects of the present disclosure.

FIG. 5 illustrates a beam mapping and indication scheme 500 for multi-TB communication, according to some aspects of the present disclosure. In FIG. 5, the x-axis represents time in some constant units. In the scheme 500, a BS similar to the BSs 105 may communicate one or more repetitions of a plurality of TBs. The BS and UE may communicate at any suitable frequencies. In some aspects, the BS and the UE may communicate at frequencies of about 3.5 GHz, 6 GHz, 30 GHz or beyond 52.6 GHz. In the scheme 500, the BS 105 maps different beam sequences onto a multi-TB repetition sequence including a first plurality of TB repetitions of a first TB and a second plurality of repetitions of a second TB. The BS maps a first pattern of beams or beam directions (e.g., TCI states) to the repetitions of the first TB, and a second pattern of beams or beam directions to the repetitions of the second TB. Accordingly, whereas a same beam pattern or sequence is used for all TBs in the schemes 300, 400 in FIGS. 3A-4B, different beam patterns are applied or mapped to the repetitions of the first TB and the second TB in the scheme 500. The UE 115 may utilize one or more components of the UE 900 illustrated in FIG. 9, for example, such as the processor 902, the memory 904, the Multi-TB Repetition Module 908, the transceiver 910, the modem 912, and the one or more antennas 916, to execute the steps of scheme 500. Further, the BS may utilize one or more of the components of the BS 1000 shown in FIG. 10, such as the processor 1002, the memory 1004, the Multi-TB Repetition Module 1008, the transceiver 1010, the modem 1012, and the one or more antennas 1016, to execute the steps of scheme 500.

Referring to FIG. 5, the scheme 500 includes communicating a plurality of TB repetitions 512, 514, 516, 518, 522, 524, 526, 528 corresponding to a first TB (TB 1) and a second TB (TB 2). The TB repetitions 512, 514, 516, 518, 522, 524, 526, 528 may be configured and transmitted according to a repetition type and/or mapping type, such as type A repetition or type B repetition, and type A mapping or type B mapping. In the illustrated example, the repetitions of the first TB and second TB are mapped to the time domain in a sequential fashion, where the repetitions of the first TB (512, 514, 516, 518) are transmitted in a first group followed by the repetitions of the second TB (522, 524, 526, 528). The time mapping of the TB repetitions may be based on a multi-TB repetition configuration, and one or more time-domain configurations or indications. For example, the time mapping of the TB repetitions may be based on a number of repetitions configured via RRC, or configured via RRC and indicated by DCI. The parameters of the time-domain configuration may include start and length indicator values (SLIVs), mapping type, repetition type, number of repetitions, and/or any other suitable parameter.

FIG. 5 illustrates a plurality of beam mapping sequences, including sequential mapping, cyclical mapping, and half/half mapping. Although the same type of mapping sequence is applied for the repetitions of both the first TB and the second TB, the order or arrangement of the sequences is different for the repetitions of the first TB and the second TB, as explained further below. However, the present disclosure also contemplates beam mapping and indication schemes in which different types of beam sequences (e.g., sequential and cyclical, cyclical and half/half, etc.) are applied or mapped to the repetitions of the first TB and the second TB.

In the first example of FIG. 5, a first sequential beam mapping sequence is applied to the repetitions of the first TB in a {1, 1, 2, 2} pattern, and a second sequential beam mapping sequence is applied to the repetitions of the second TB in a {2, 2, 1, 1} pattern. With this beam mapping configuration and repetition mapping in the time domain, the repetitions of the first TB and the second TB are transmitted with beam diversity or interference diversity, where at least one repetition of each TB is transmitted in the first beam direction (Beam 1) and at least one repetition of the first TB and the second TB is transmitted in the second beam direction (Beam 2). Further, as compared with the scheme 400*a* in FIG. 4A, the scheme 500 involves fewer beam switches, which may reduce the amount and/or number of time gaps between the repetitions. Accordingly, the scheme 500 may use network time resources more efficiently, in some aspects.

In the second example of FIG. 5, a first cyclical beam mapping sequence is applied to the repetitions of the first TB in a {1, 2, 1, 2} pattern, and a second cyclical beam mapping sequence is applied to the repetitions of the second TB in a {2, 1, 2, 1} pattern. With this beam mapping configuration and repetition mapping in the time domain, the repetitions of the first TB and the second TB are again transmitted with beam diversity or interference diversity, where at least one repetition of each TB is transmitted in the first beam direction (Beam 1) and at least one repetition of the first TB and the second TB is transmitted in the second beam direction (Beam 2). Further, as explained above, using different cyclical beam sequences for the repetitions of the first TB and the repetitions of the second TB deceases the number of beam switches involved with the multi-TB communication compared to the scheme 400*a* shown in FIG. 4A.

In the third example of FIG. 5, a first half/half beam mapping sequence is applied to the multi-TB repetition sequence in a {1, 1, 2, 2} pattern, and a second half/half beam mapping sequence is applied to the multi-TB repetition sequence in a {2, 2, 1, 1} pattern. With this beam mapping configuration and repetition mapping in the time domain, the repetitions of the first TB and the second TB are transmitted with beam diversity or interference diversity. Further, as explained above, using different half/half beam sequences for the repetitions of the first TB and the repetitions of the second TB deceases the number of beam switches involved with the multi-TB communication compared to the scheme 400*a* shown in FIG. 4A.

Figure 6A:
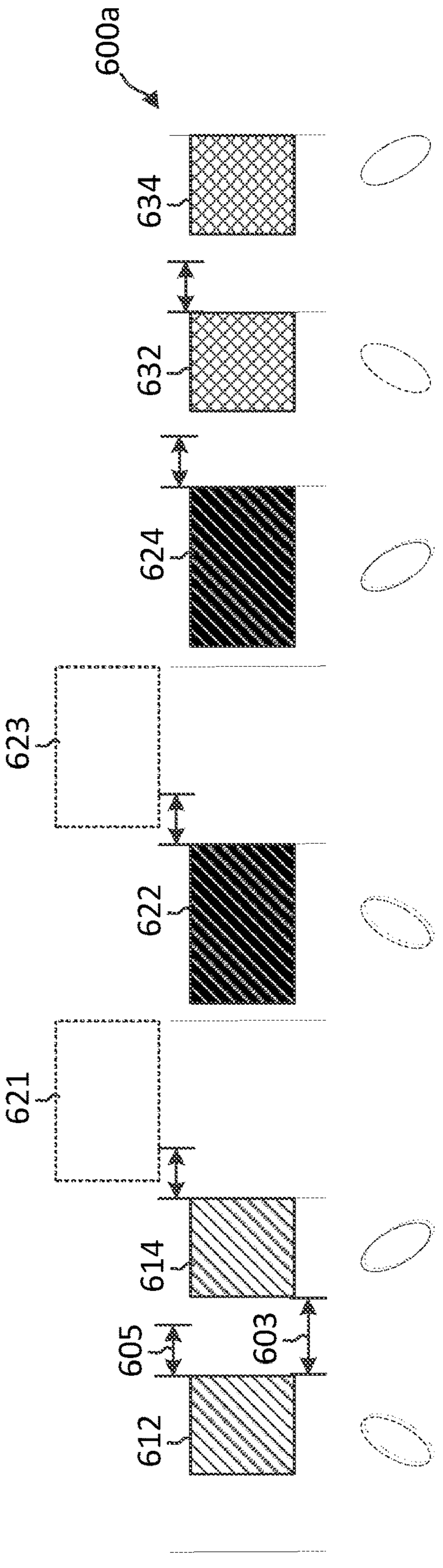
FIG. 6A illustrates a beam mapping scheme for a multi-TB repetition communication scenario according to some aspects of the present disclosure.
Figure 6B:
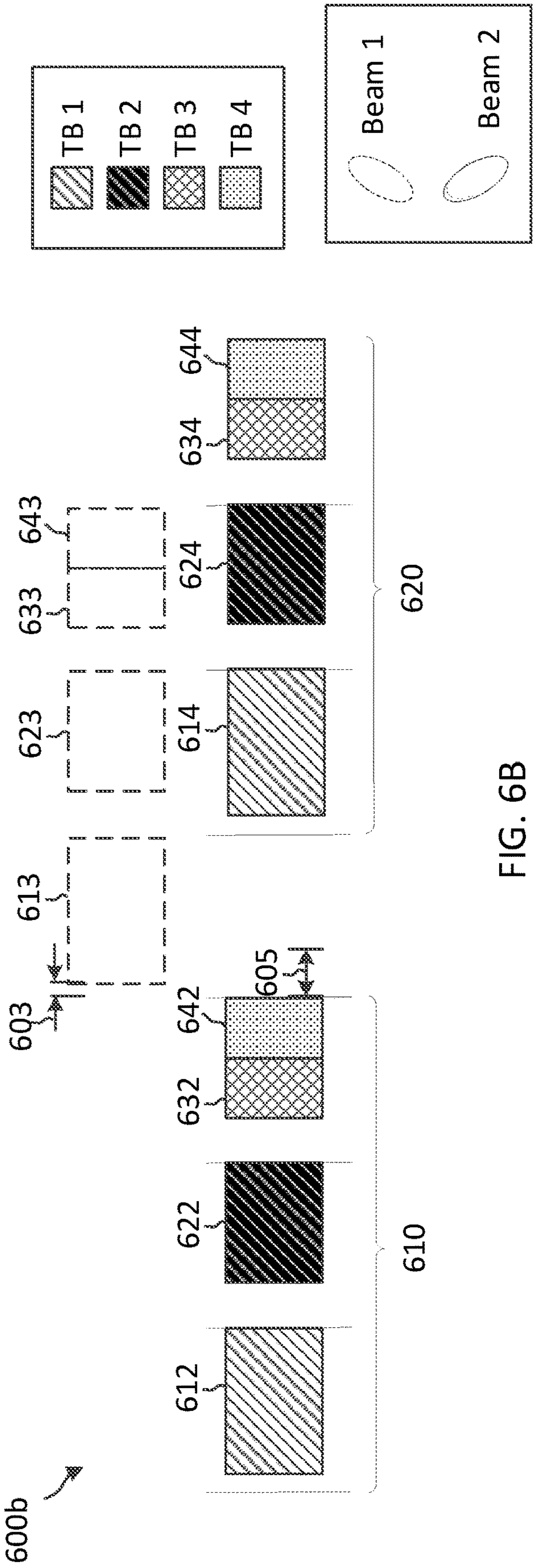
FIG. 6B illustrates a beam mapping scheme for a multi-TB repetition communication scenario according to some aspects of the present disclosure.

FIGS. 6A and 6B illustrate beam mapping and indication schemes 600*a*, 600*b* for multi-TB communication, according to some aspects of the present disclosure. In FIGS. 6A and 6B, the x-axis represents time in some constant units. In the schemes 600*a*, 600*b*, a BS similar to the BSs 105 may communicate one or more repetitions of a plurality of TBs. The BS and UE may communicate at any suitable frequencies. In some aspects, the BS and the UE may communicate at frequencies of about 3.5 GHz, 6 GHz, 30 GHz or beyond 52.6 GHz, etc. The BS 105 maps beam sequences onto a multi-TB repetition sequence. The BS maps the repetitions to the time domain based on a gap period parameter associated with a beam switch. For example, if the beam sequence indicates a switch in beam direction between a first repetition and a second repetition, the BS and/or UE may determine whether a gap between the first repetition and the second satisfies a threshold or gap period parameter, and may delay one or more repetitions if the gap period does not satisfy the threshold. The UE 115 may utilize one or more components of the UE 900 illustrated in FIG. 9, for example, such as the processor 902, the memory 904, the Multi-TB Repetition Module 908, the transceiver 910, the modem 912, and the one or more antennas 916, to execute the steps of schemes 600*a*, 600*b*. Further, the BS may utilize one or more of the components of the BS 1000 shown in FIG. 10, such as the processor 1002, the memory 1004, the Multi-TB Repetition Module 1008, the transceiver 1010, the modem 1012, and the one or more antennas 1016, to execute the steps of schemes 600*a*, 600*b*.

Referring to the scheme 600*a* shown in FIG. 6A, the repetitions 612, 614, 622, 624, 632, 634 of a first TB, second TB, and a third TB are mapped to the time domain sequentially. Further, a cyclic beam mapping configuration (1, 2, 1, 2, . . . ) is applied to the multi-TB repetition sequence. Accordingly, in the scheme 600*a*, there is a beam switch between each repetition. Thus, in some aspects, the BS and/or the UE may compare a gap period (e.g., 603) between each repetition to a configured gap period threshold 605. As shown in the scheme 600*a*, the gap 603 between the first repetition 612 and the second repetition 614 satisfies the threshold 605, but the gap between the second repetition 614 and an initially-mapped third repetition 621 does not satisfy the threshold. Based on failing to satisfy the threshold, the BS and/or the UE delays the transmission of the third repetition 622 by one slot. Similarly, the gap between the third repetition 622 and an initially-mapped fourth repetition 623 does not satisfy the threshold. Based on failing to satisfy the threshold, the BS and/or the UE also delays the transmission of the fourth repetition 624 by one slot. In some aspects, the threshold may be configured by the network. For example, the BS may configure the UE using RRC signaling, or by transmitting a MAC-CE with the configured threshold.

Referring to the scheme 600*b* shown in FIG. 6B, the repetitions 612, 614, 622, 624, 632, 634, 642, 644 of a first TB, a second TB, a third TB, and a fourth TB are mapped to the time domain cyclically, or interlaced with one another. Further, a sequential beam mapping configuration (1, 1, 1, 1, 2, 2, 2, 2) is applied to the multi-TB repetition sequence. Accordingly, in the scheme 600*b*, there is only one beam switch between the first group of interlaced repetitions 610 and the second group of interlaced repetitions 620. Thus, in some aspects, the BS and/or the UE may compare a gap period 603 between the first group of repetitions 610 and the second group of repetitions 620 to a configured gap period threshold 605. As shown in the scheme 600*b*, the gap 603 between the first group 610 and the second group 620 does not satisfy the threshold. Based on failing to satisfy the threshold, the BS and/or the UE delays the transmission of the second group 620 by one slot.

Figure 7A:
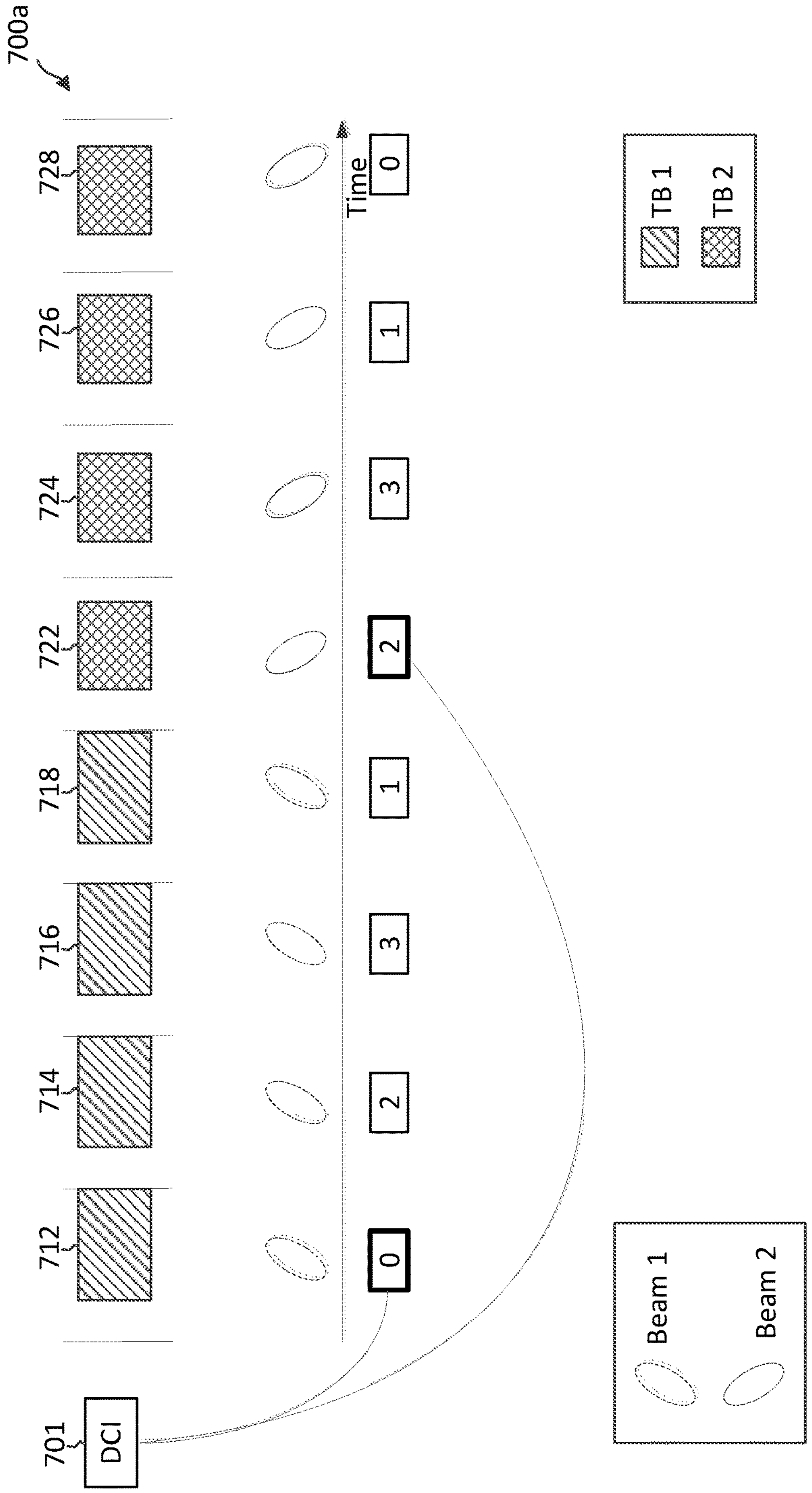
FIG. 7A illustrates a beam mapping scheme for a multi-TB repetition communication scenario according to some aspects of the present disclosure.
Figure 7B:
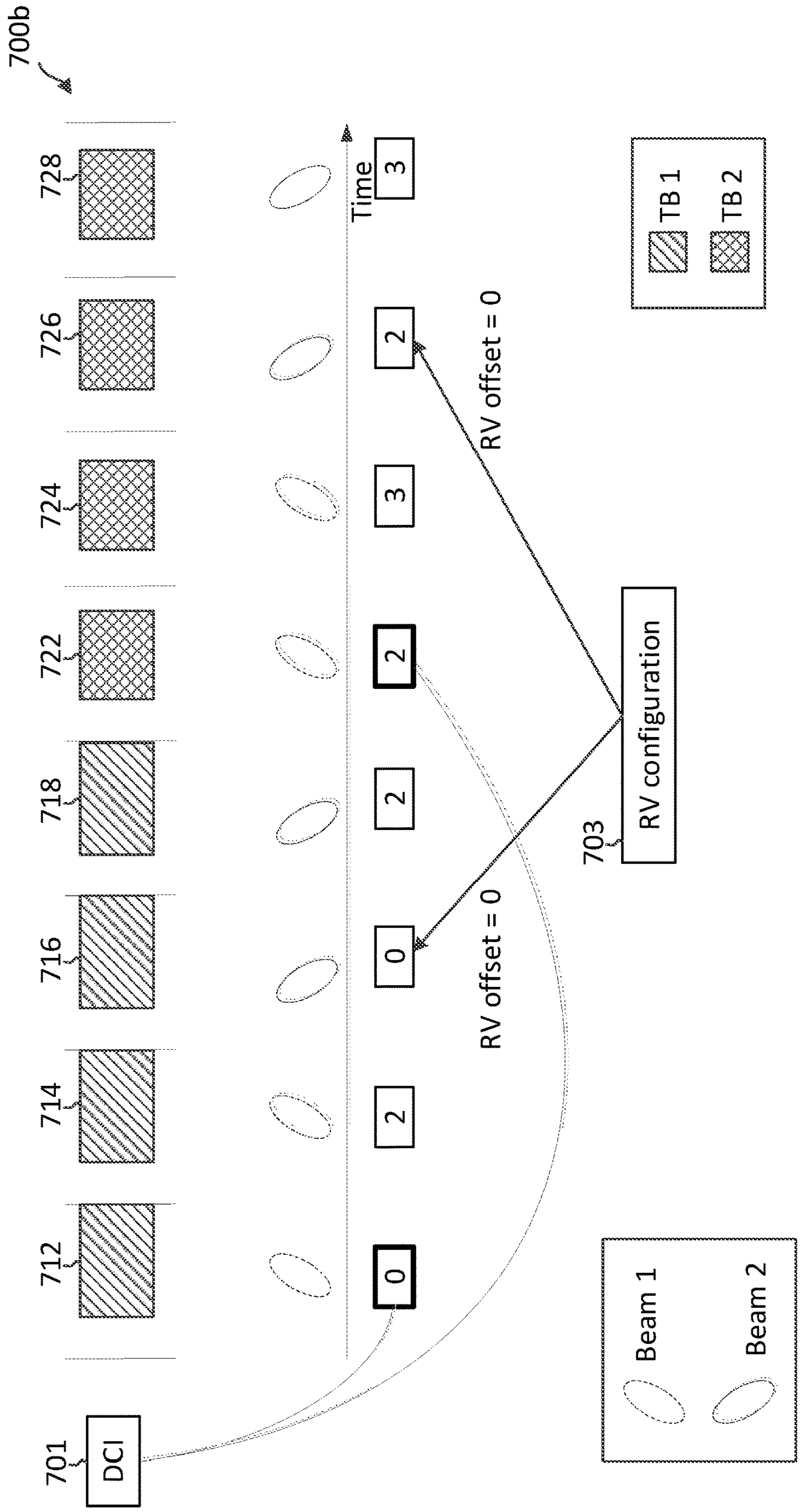
FIG. 7B illustrates a beam mapping scheme for a multi-TB repetition communication scenario according to some aspects of the present disclosure.
Figure 7C:
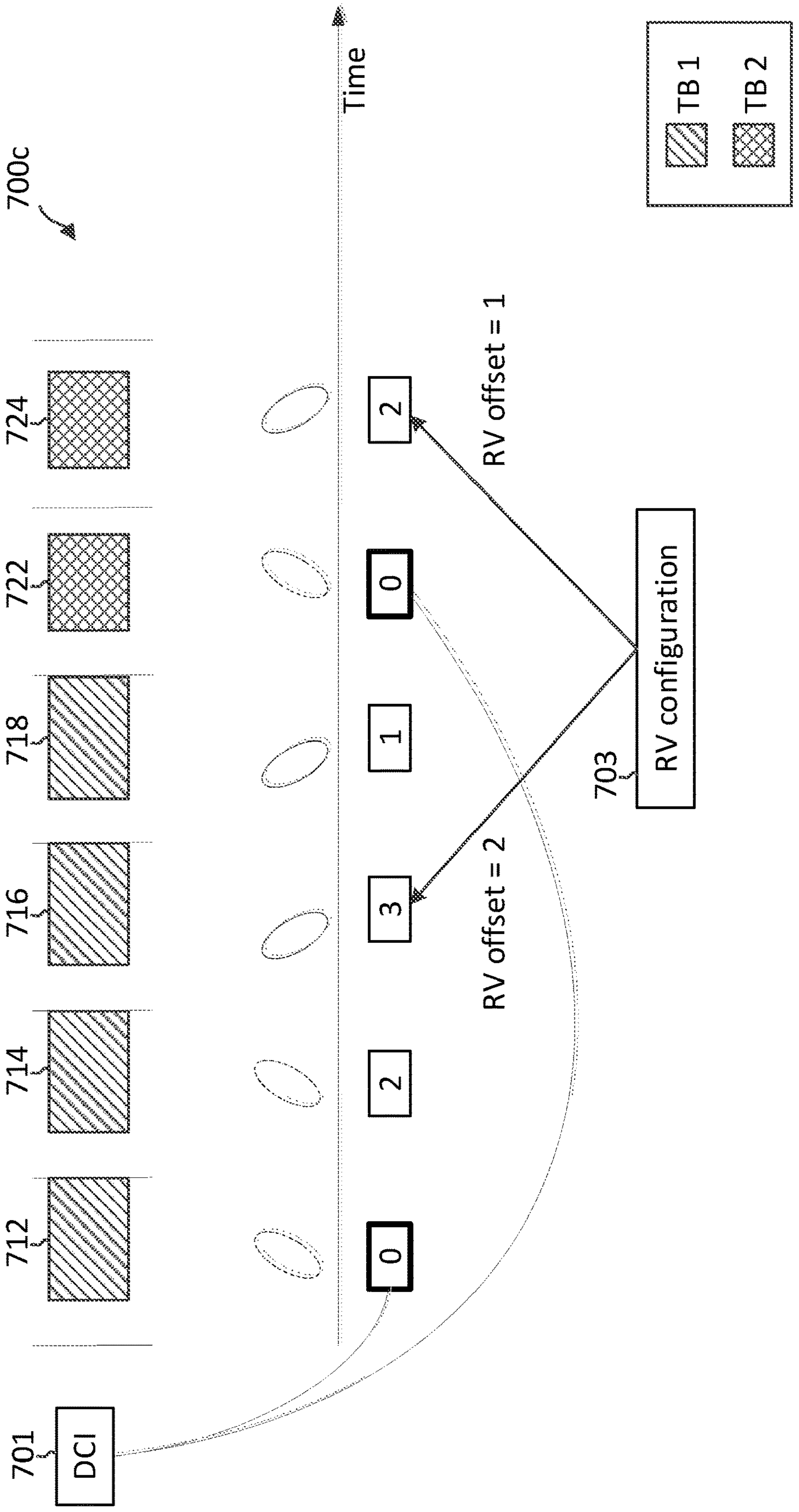
FIG. 7C illustrates a beam mapping scheme for a multi-TB repetition communication scenario according to some aspects of the present disclosure.

FIGS. 7A-7C illustrate beam mapping and indication schemes 700*a*, 700*b*, 700*c*, 600*c* for multi-TB communication, according to some aspects of the present disclosure. In FIGS. 7A-7C, the x-axis represents time in some constant units. In the schemes 700*a*, 700*b*, 700*c*, a BS similar to the BSs 105 may communicate one or more repetitions of a plurality of TBs. The BS and UE may communicate at any suitable frequencies. In some aspects, the BS and the UE may communicate at frequencies of about 3.5 GHz, 6 GHz, 30 GHz or beyond 52.6 GHz, etc. The BS 105 maps beam sequences onto a multi-TB repetition sequence, and assigns redundancy version (RV) values to the repetitions based on a RV configuration indicated in a DCI 701. The DCI 701 may indicate, for example, an initial RV value corresponding to a first repetition of each of the first TB and the second TB. In another aspect, a UE and/or a BS may be configured with a RV sequence and/or a RV offset value. The RV sequence may be {0, 2, 3, 1}, which may correspond to a HARQ RV configuration. The RV offset value may be RRC-configured, and may be different for each TB. The UE 115 may utilize one or more components of the UE 900 illustrated in FIG. 9, for example, such as the processor 902, the memory 904, the Multi-TB Repetition Module 908, the transceiver 910, the modem 912, and the one or more antennas 916, to execute the steps of schemes 700*a*, 700*b*, 700*c*. Further, the BS may utilize one or more of the components of the BS 1000 shown in FIG. 10, such as the processor 1002, the memory 1004, the Multi-TB Repetition Module 1008, the transceiver 1010, the modem 1012, and the one or more antennas 1016, to execute the steps of schemes 700*a*, 700*b*, 700*c*.

In the scheme 700*a* shown in FIG. 7A, the repetitions 712, 714, 716, 718, 722, 724, 726, 728 of a first TB and a second TB are mapped to the time domain sequentially. Further, a half/half beam mapping configuration (1, 1, 1, 1, 2, 2, 2, 2) is applied to the multi-TB repetition sequence such that the repetitions of the first TB are all transmitted with the first beam direction (Beam 1), and the repetitions of the second TB are all transmitted with the second beam direction (Beam 2). The DCI 701 indicates a first or initial RV for the repetitions of each TB. In the illustrated example, the DCI 701 indicates a RV of 0 for the first repetition 712 of the first TB, and a RV of 2 for the first repetition 722 of the second TB. The remaining repetitions of each TB are mapped according to the configured sequence of {0, 2, 3, 1}.

In the scheme 700*b* shown in FIG. 7B, the repetitions 712, 714, 716, 718, 722, 724, 726, 728 of a first TB and a second TB are mapped to the time domain sequentially. Further, a sequential beam mapping configuration (1, 1, 2, 2, 1, 1, 2, 2) is applied to the multi-TB repetition sequence. The DCI 701 indicates a first or initial RV for the repetitions of each TB. In the illustrated example, the DCI 701 indicates a RV of 0 for the first repetition 712 of the first TB, and a RV of 2 for the first repetition 722 of the second TB. Further, the RVs are mapped to the repetitions based on beam direction. In this regard, the repetitions of each TB that have the same beam direction as the first repetition (e.g., 712, 722) are mapped based on the configured sequence of {0, 2, 3, 1}, and the repetitions of each TB that are associated with different beam directions are mapped based on the configured RV offset value. The RV offset value is indicated in a RV configuration 703, which may be a RRC configuration. In the scheme 700*b*, a same RV offset value is configured for both the first TB and the second TB. In particular, the RV offset value is 0, such that the configured RV sequence starts over for the repetitions of each TB when there is a beam switch.

In the scheme 700*c* shown in FIG. 7C, the repetitions 712, 714, 716, 718, 722, 724 of a first TB and a second TB are mapped to the time domain sequentially. Further, a sequential beam mapping configuration (1, 1, 2, 2, 1, 2) is applied to the multi-TB repetition sequence. The DCI 701 indicates a first or initial RV for the repetitions of each TB. In the illustrated example, the DCI 701 indicates a RV of 0 for the first repetition 712 of the first TB, and a RV of 0 for the first repetition 722 of the second TB. Further, the RVs are mapped to the repetitions based on beam direction. In this regard, the repetitions of each TB that have the same beam direction as the first repetition (e.g., 712, 722) are mapped based on the configured sequence of {0, 2, 3, 1}, and the repetitions of each TB that are associated with different beam directions are mapped based on the configured RV offset value. In the scheme 700*c*, different RV offset values are configured for the first TB and the second TB. The RV offset values are indicated in a RV configuration 703, which may be a RRC configuration. In particular, the RV offset value for the first TB is 2, and the RV offset value for the second TB is 1. The BS and/or the UE are configured to apply the RV offset values with respect to the RV sequence, such that the RV offset value indicates an advancement of RV within the configured sequence {0, 2, 3, 1}. Accordingly, if the initial RV value is 0 and the configured RV offset is 2, the BS and/or the UE will apply a RV of 3 to the repetitions of a TB following a beam switch. If the initial RV value is 0 and the configured RV offset is 3, the BS and/or the UE will apply a RV of 1 to the repetitions of a TB following a beam switch. However, in another example, the BS and/or the UE may be configured to apply the RV offset values with respect to the indicated RV, such that the configured RV offset value is added to the integer value of the indicated RV.

In another aspect, the UE may be configured to segment a repetition overlapping a slot boundary into two actual repetitions. For example, if the BS and/or the UE maps repetitions to the time domain based on type B repetition or type B mapping, the BS and/or the UE may be configured to segment the overlapping repetition into two actual repetitions. Further, the beam mapping may be applied based on the overlapping repetition (also referred to as a nominal repetition), or on the actual repetition. For example, the BS and/or the UE may be configured to apply a single beam direction to the overlapping repetition, or to apply different beam directions for the two actual repetitions. Further, the BS and/or the UE may be configured to apply a single RV to the overlapping repetition, or to apply different RVs for the two actual repetitions. In that regard, the schemes 300-700 described above may be performed based on the nominal repetition, or on the actual repetition. Whether the beam mapping and/or RV mapping is applied based on the nominal repetition or the actual repetition may be configured via RRC, MAC-CE, or hard-coded by the network.

Figure 8:
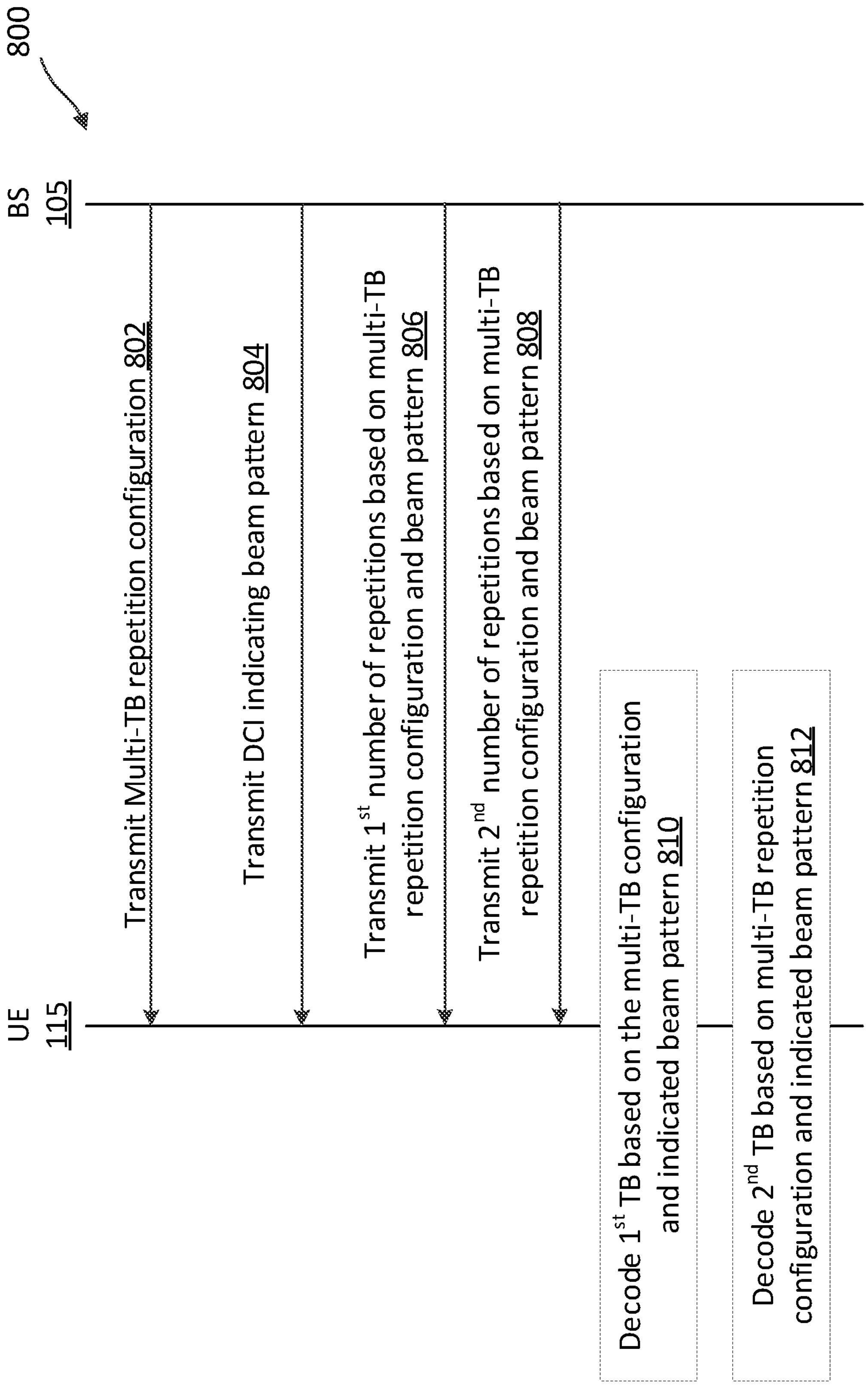
FIG. 8 is a signaling diagram illustrating a method for multi-TB repetition communication according to some aspects of the present disclosure.

FIG. 8 is a signaling diagram illustrating a method 800 for multi-TB communication with repetitions, according to aspects of the present disclosure. The method 800 is performed by a UE 115, which may be one of the UEs 115 of the network 11, and a BS 105, which may be one of the BSs 105 of the network 100. The UE 115 and/or the BS 105 may be configured to multi-TB repetition communications. The UE 115 may utilize one or more components of the UE 900 illustrated in FIG. 9, for example, such as the processor 902, the memory 904, the Multi-TB Repetition Module 908, the transceiver 910, the modem 912, and the one or more antennas 916, to execute the steps of the method 800. Further, the BS 105 may utilize one or more of the components of the BS 1000 shown in FIG. 10, such as the processor 1002, the memory 1004, the Multi-TB Repetition Module 1008, the transceiver 1010, the modem 1012, and the one or more antennas 1016, to execute the steps of the method 800.

At action 802, the BS 105 transmits, and the UE 115 receives, a multi-transport block (TB) repetition configuration indicating a first number of repetitions and a second number of repetitions. In some aspects, action 802 may include transmitting a radio resource control (RRC) message including a RRC configuration. For example, the BS 105 may transmit a RRC message indicating a pdsch-AggregationFactor or pusch-AggregationFactor, or any other suitable parameter, which indicates the first number of repetitions and the second number of repetitions. In another aspect, action 802 may include the BS 105 transmitting a time-domain resource allocation (TDRA) table including a plurality of rows, or entries. In some aspects, one or more rows or entries may include or indicate the first number of repetitions and/or the second number of repetitions. The TDRA entries may also include an index number associated with the entry, and one or more time-domain parameters (e.g., start and length indicator value (SLIV), starting symbol, length, etc.) associated with at least one repetition of the first TB, and at least one repetition of the second TB. In some aspects, the first number of repetitions may be associated with a first TB and the second number of repetitions may be associated with a second TB. The first TB and the second TB may be associated with a same scheduling grant, in some aspects. In other aspects, the first number of repetitions may be used for each of the first TB and the second TB.

In some aspects, action 802 further includes transmitting a beam configuration including one or more beam directions and/or beam parameters. For example, receiving the beam configuration may include receiving a RRC configuration or message that includes a table of transmission configuration indication (TCI) states. Each entry of the TCI table state may be associated with a TCI codepoint, and may include or indicate one or more TCI states. The TCI states in the table may be indicated based on their TCI state IDs.

At action 804, the BS 105 transmits, and the UE 115 receives, DCI indicating a beam pattern or beam configuration. The beam pattern may include or indicate one or more beam directions. For example, the BS 105 may transmit an indication of one or more beam patterns transmitted in the multi-TB repetition configuration transmitted at action 802. The indication may be, for example, an entry of a TCI state table. In some aspects, the DCI may include or indicate a TCI codepoint associated with one or more TCI states. The TCI state table may be arranged and configured as explained above.

In some aspects, action 804 further includes transmitting a time-configuration associated with a first TB and a second TB, where the first TB and the second TB are associated with a same scheduling grant. In some aspects, action 804 includes the BS 105 indicating, via the DCI, an entry or row of a TDRA table. The TDRA table may be configured by the BS 105 at action 802, for example. The entry or row of the TDRA table may indicate various time-domain parameters associated with the multi-TB repetition communication. In some aspects, the time-domain indication may also indicate the first number of repetitions for the first TB, and the second number of repetitions for the second TB. In some aspects, the first number of repetitions may be a same value as the second number of repetitions, or a different value as the second number of repetitions. For example, in some aspects, both the first number of repetitions and the second number of repetitions may be 2. In another example, the first number of repetitions may be 3, and the second number of repetitions may be 1.

At action 806 and action 808, the BS 105 communicates, with the UE 115 based on the multi-TB repetition configuration and the beam pattern, the first TB and the second TB. In some aspects, actions 806 and 808 include the BS 105 transmitting the first number of repetitions of the first TB and the second number of repetitions of the second TB in one of more scheduled PDSCHs. In other aspects, actions 806 and 808 include the BS 105 receiving the first number of repetitions of the first TB and the second number of repetitions of the second TB in one or more scheduled PUSCHs. In some aspects, actions 806 and 808 include the BS 105 communicating the first number of repetitions of the first TB and the second number of repetitions of the second TB in a CG resource, a semi-static resource, or a static resource.

In some aspects, communicating the first TB and the second TB includes mapping the beam pattern onto one or more repetitions of the first TB and/or the second TB. In some aspects, the beam pattern may be mapped to all repetitions of the first TB and second TB in the time domain, sequentially. For example, the beam pattern may be mapped to the repetitions in the time domain sequentially and without regard to the associated TB. For example, if two beam directions (1 and 2) are indicated, the beam pattern may include a [1, 1, 2, 2, 1, 1, 2, 2] sequence as shown in FIG. 3A ("Sequential mapping") and mapped onto all repetitions of the first TB and the second TB based on their temporal order. In another example, the beam pattern may be mapped to all repetitions of the first TB and second TB in the time domain, cyclically. For example, the beam pattern may include a [1, 2, 1, 2, 1, 2, 1, 2] sequence as shown in FIG. 3A ("Cyclical mapping") and mapped onto all repetitions of the first TB and the second TB based on their temporal order. In another example, the beam pattern may be mapped to all repetitions of the first TB and the second TB in the time domain, half/half. For example, the beam pattern may include a [1, 1, 1, 1, 2, 2, 2, 2] sequence as shown in FIG. 3A ("Half/half mapping") and mapped to all repetitions of the first TB and the second TB based on their temporal order. The BS 105 may communicate the repetitions of the first TB and the second TB in a sequential fashion (e.g., as shown in FIG. 3A), or in an interlaced or cyclical fashion (e.g., as shown in FIG. 3B).

In another aspect, communicating the first TB and the second TB includes mapping one or more beam patterns to the first TB and the second TB based on the associated TB. For example, the BS 105 may map a beam pattern to the repetitions of the first TB based on their temporal order, and may map the beam pattern to the repetitions of the second TB based on their temporal order. Thus, the mapping may be TB-dependent. The mapping of the beam pattern may be sequential, cyclical, or half/half, as explained above, but with respect to the TBs associated with each repetition. For example, the beam pattern may be mapped to the repetitions as illustrated in FIGS. 4A and 4B. The BS 105 may communicate the repetitions of the first TB and the second TB in a sequential fashion (e.g., as shown in FIG. 4A), or in an interlaced or cyclical fashion (e.g., as shown in FIG. 4B).

In some aspects, a same beam sequence or pattern may be mapped onto all repetitions (e.g., FIGS. 3A, 3B), or onto the repetitions of each TB (e.g., FIGS. 4A, 4B). In another aspect, different beam sequences may be mapped onto the repetitions of each TB. For example, the BS 105 may map a first beam pattern or sequence onto the repetitions of the first TB, and a different beam pattern or sequence onto the repetitions of the second TB. For example, the BS 105 may map a first sequential pattern of [1, 1, 2, 2] to the repetitions of a first TB, and a second sequential pattern of [2, 2, 1, 1] to the repetitions of a second TB (see, e.g., FIG. 5 "Sequential mapping"). In another example, the BS 105 may map a first cyclical pattern of [1, 2, 1, 2] to the repetitions of a first TB, and a second cyclical pattern of [2, 1, 2, 1] to the repetitions of a second TB (see, e.g., FIG. 5 "Cyclical mapping"). In another example, the BS 105 may map a first half/half pattern of [1, 1, 2, 2] to the repetitions of a first TB, and a second half/half pattern of [2, 2, 1, 1] to the repetitions of a second TB (see, e.g., FIG. 5 "Half/half mapping"). In some aspects, the BS 105 may be configured to apply a first type of pattern to the repetitions of the first TB (e.g., sequential), and a second type of pattern to the repetitions of the second TB (e.g., cyclical).

In another aspect, the BS 105 may map the TB repetitions to the time domain based on a beam switch configuration. For example, the BS 105 may switch beam directions between repetitions of a same TB, or between repetitions of different TBs. Switching beams or beam directions may involve a gap period between a first beam or beam direction and a second beam or beam direction. In some aspects, the BS 105 may determine whether a gap period between a first TB repetition of the first number of repetitions associated with a first beam direction and a second TB repetition of the second number of repetitions is below a threshold. The BS 105 may refrain, in response to determining that the gap period is below the threshold, from communicating the second TB repetition in a slot immediately following the first TB repetition. If the BS 105 maps a cyclical beam pattern (e.g., [1, 2, 1, 2, . . . ]), the BS 105 may determine whether a gap between each repetition and the preceding repetition is below the threshold, and may delay the transmission of any repetition that does not satisfy the gap threshold for one or more slots as shown in FIG. 6A, for example. In another aspect, if the BS 105 maps a sequential or half/half beam pattern (e.g., [1, 1, 1, 1, 2, 2, 2, 2]) such that the repetitions are arranged in groups by beam direction, the BS 105 may determine whether a gap between the first group of repetitions and the second group of repetitions is below the threshold, and may delay the transmission of the second group of repetitions for one or more slots if the gap threshold is not satisfied as shown in FIG. 6B, for example.

In another aspect, the method 800 may include mapping one or more redundancy versions (RVs) to the one or more repetitions according to a HARQ communication scheme. In some aspects, the mapping of the RVs may be based on a RV configuration, which may include a RV sequence. In an exemplary aspect, the RV sequence may be {0, 2, 3, 1}. The RV configuration may indicate other parameters, such as a RV offset to apply to one or more of the repetitions. For example, the RV configuration may indicate a first RV offset to apply to the repetitions of the first TB, and a second RV offset to apply to the repetitions of the second TB. In another aspect, the RV configuration may indicate a first RV offset to apply to repetitions associated with a first beam, and a second RV offset to apply to repetitions associated with a second beam, as shown in FIG. 7A, for example. In some aspects, the RV configuration may indicate a single RV offset to apply to repetitions of the first TB and/or the second TB. In some aspects, the RV configuration indicates a RV value for a first repetition of each TB. In another aspect, the BS 105 may indicate a RV value for a first repetition of each TB, and a RV offset for each TB. For example, the BS 105 may map a first RV value to a first repetition of the first TB, and may adjust the RV sequence by the RV offset based on a change in beam direction for one or more remaining repetitions of the first TB, as shown in FIG. 7B, for example. The BS 105 may indicate a same RV offset for each TB (e.g., as shown in FIG. 7B), or different RV offsets for different TBs (e.g., as shown in FIG. 7C). The BS 105 may indicate the initial RV values and the RV offset or offsets to increase RV diversity and/or interference diversity for the repetitions, thereby increasing the chances of a successful decoding by the UE 115.

In another aspect, the BS 105 may transmit the repetitions of the first TB and the second TB based on a predefined rule, which may override a configured beam pattern or beam sequence. For example, the BS 105 may map, to a multi-TB repetition sequence including the first number of repetitions and the second number of repetitions, a pre-configured beam pattern different from the beam pattern or configuration indicated at action 804. For example, the BS 105 may apply the pre-configured beam pattern based on a number of TBs and/or a number of repetitions of each TB in the multi-TB communication. For example, the BS 105 may apply the pre-configured to apply a cyclical beam pattern {1, 2, 1, 2, . . . } if the number of TBs is 2 and the number of repetitions for each TB is also 2, and the repetitions are arranged sequentially (e.g., TB 1, TB 1, TB 2, TB2). Thus, the BS 105 may override a RRC-configured sequential beam pattern (e.g., {1, 1, 2, 2, . . . }) and apply the cyclical pre-configured beam pattern or sequence to provide interference/beam diversity, for example. In another example, the BS 105 may apply a pre-configured sequential beam pattern {1, 1, 2, 2, . . . } if the number of TBs is 2 and the number of repetitions for each TB is also 2, and the repetitions are arranged cyclically/interlaced (e.g., TB 1, TB 2, TB 1, TB2). Thus, the BS 105 may override a RRC-configured cyclical beam pattern (e.g., {1, 2, 1, 2, . . . }) and apply the sequential pre-configured beam pattern or sequence to provide interference/beam diversity, for example. In another aspect, the BS 105 may override a RRC-configured half/half beam pattern and apply a cyclic beam pattern if 2 beam directions are indicated in the beam pattern and the repetitions in the multi-TB communication are arranged cyclically/interlaced.

At action 810, the UE 115 decodes the first TB based on the multi-TB repetition configuration and the indicated beam pattern. For example, the UE 115 may be configured to receive and decode the first TB based on an entry in a TDRA table, where the entry is provided by the BS 105 in the DCI transmitted at action 804. In some aspects, the UE 115 may be configured to decode the first TB based on a single TB TDRA indication, where the indicated entry of the TDRA indicates a time-domain configuration (e.g., SLIV, starting symbol, length, mapping type) for the first repetition of the first TB. The UE 115 may decode the first TB based on the assumption that the remaining repetitions of the first TB will be transmitted based on the same mapping type, SLIV, and/or length as the first repetition of the first TB. In another aspect, the entry of the TDRA table may indicate a time-domain configuration for each TB, but not for each repetition of each TB. Accordingly, the UE 115 may decode the first TB based on the assumption that the remaining repetitions of the first TB will be based on the mapping type, length, and/or SLIV of the first repetition of the first TB. In another aspect, the entry of the TDRA table may indicate a time-domain configuration for a plurality of repetitions, but for a single TB. Accordingly, the UE 115 may be configured to decode the first TB based on the number of repetitions indicated in the TDRA entry, and further based on the mapping type, SLIV, and/or length of the first repetition of the first TB.

Further, the UE 115 decodes the first TB based on the multi-TB configuration. In some aspects, the number of repetitions for one or more of the TBs may be statically or semi-statically configured. For example, in some aspects, a single number of repetitions may be configured by RRC signaling and used by the BS 105 and the UE 115 to communicate all TBs in the multi-TB communication. Accordingly, the UE 115 may decode the first TB based on the number of repetitions configured by RRC. In another aspect, the number of repetitions may be configured in the TDRA table, where each entry indicates a same number of repetitions for each TB. In other aspects, the number of repetitions may be different for each TB. For example, each entry of the TDRA table may indicate a different number of repetitions for each TB.

At action 812, the UE 115 decodes the second TB based on the multi-TB configuration and the indication of the beam pattern. For example, the UE 115 may be configured to receive and decode the second TB based on an entry in a TDRA table, where the entry is provided by the BS 105 in the DCI transmitted at action 804. In some aspects, the UE 115 may be configured to decode the second TB based on a single TB TDRA indication, where the indicated entry of the TDRA indicates a time-domain configuration (e.g., SLIV, starting symbol, length, mapping type) for the first repetition of the second TB. The UE 115 may decode the second TB based on the assumption that the remaining repetitions of the second TB will be transmitted based on the same mapping type, SLIV, and/or length as the first repetition of the second TB. In another aspect, the entry of the TDRA table may indicate a time-domain configuration for each TB, but not for each repetition of each TB. Accordingly, the UE 115 may decode the second TB based on the assumption that the remaining repetitions of the second TB will be based on the mapping type, length, and/or SLIV of the first repetition of the second TB. In another aspect, the entry of the TDRA table may indicate a time-domain configuration for a plurality of repetitions, but for a single TB. Accordingly, the UE 115 may be configured to decode the second TB based on the number of repetitions indicated in the TDRA entry, and further based on the mapping type, SLIV, and/or length of the first repetition of the second TB.

Figure 9:
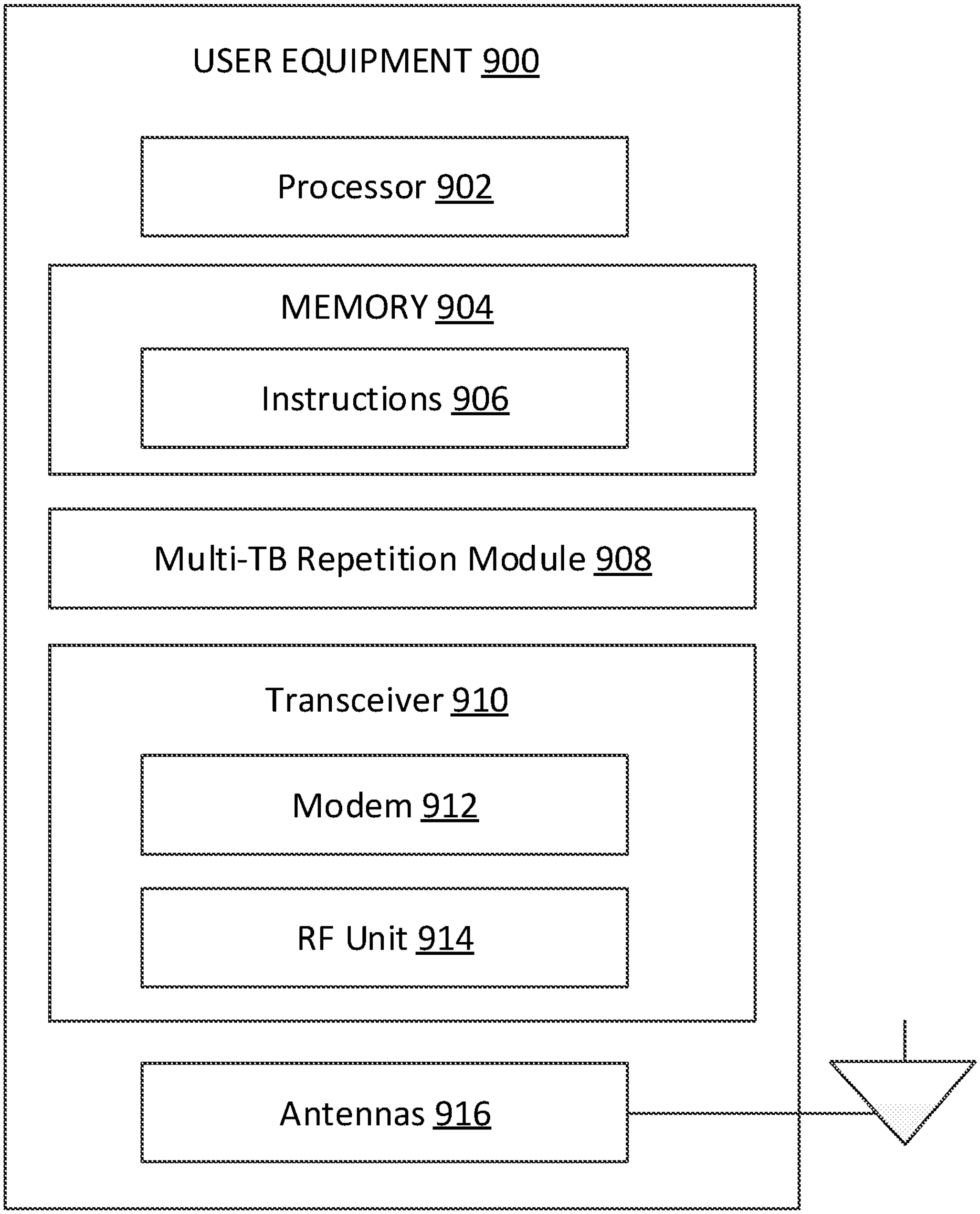
FIG. 9 is a block diagram of a user equipment (UE) according to some aspects of the present disclosure.

FIG. 9 is a block diagram of an exemplary UE 900 according to some aspects of the present disclosure. The UE 900 may be a UE 115 discussed above in FIG. 1. As shown, the UE 900 may include a processor 902, a memory 904, a Multi-TB Repetition Module 908, a transceiver 910 including a modem subsystem 912 and a radio frequency (RF) unit 914, and one or more antennas 916. These elements may be in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to the UEs 115 in connection with aspects of the present disclosure, for example, aspects of FIGS. 2-7B. Instructions 906 may also be referred to as program code. The program code may be for causing a wireless communication device to perform these operations, for example by causing one or more processors (such as processor 902) to control or command the wireless communication device to do so. The terms “instructions” and “code” should be interpreted broadly to include any type of computer-readable statement(s). For example, the terms “instructions” and “code” may refer to one or more programs, routines, sub-routines, functions, procedures, etc. “Instructions” and “code” may include a single computer-readable statement or many computer-readable statements.

The Multi-TB Repetition Module 908 may be implemented via hardware, software, or combinations thereof. For example, Multi-TB Repetition Module 908 may be implemented as a processor, circuit, and/or instructions 906 stored in the memory 904 and executed by the processor 902. In some examples, the Multi-TB Repetition Module 908 can be integrated within the modem subsystem 912. For example, the Multi-TB Repetition Module 908 can be implemented by a combination of software components (e.g., executed by a DSP or a general processor) and hardware components (e.g., logic gates and circuitry) within the modem subsystem 912. In some examples, a UE may include one or more Multi-TB Repetition Module 908.

The Multi-TB Repetition Module 908 may be used for various aspects of the present disclosure, for example, aspects of FIGS. 1-7B. In some aspects, the Multi-TB Repetition Module 908 can be configured to receive, from a BS, a multi-transport block (TB) repetition configuration indicating a first number of repetitions and a second number of repetitions. In some aspects, receiving the multi-TB repetition configuration may include receiving a radio resource control (RRC) message including a RRC configuration. For example, the Multi-TB Repetition Module 908 may receive a RRC message indicating a pdsch-AggregationFactor or pusch-AggregationFactor, or any other suitable parameter, which indicates the first number of repetitions and the second number of repetitions. In another aspect, the Multi-TB Repetition Module 908 may be configured to receive a time-domain resource allocation (TDRA) table including a plurality of rows, or entries. In some aspects, one or more rows or entries may include or indicate the first number of repetitions and/or the second number of repetitions. The TDRA entries may also include an index number associated with the entry, and one or more time-domain parameters (e.g., start and length indicator value (SLIV), starting symbol, length, etc.) associated with at least one repetition of the first TB, and at least one repetition of the second TB. In some aspects, the first number of repetitions may be associated with a first TB and the second number of repetitions may be associated with a second TB. The first TB and the second TB may be associated with a same scheduling grant, in some aspects. In other aspects, the first number of repetitions may be used for each of the first TB and the second TB. In some aspects, the Multi-TB Repetition Module 908 determines the number of TBs by applying a floor operation to a ratio of the first parameter to the second parameter. In some aspects, the Multi-TB Repetition Module 908 determines the number of TBs by applying a ceiling operation to a ratio of the first parameter to the second parameter.

In some aspects, the Multi-TB Repetition Module 908 is configured to receive a beam configuration including or one or more beam directions and/or beam parameters. For example, receiving the beam configuration may include transmitting a RRC configuration or message that includes a table of transmission configuration indication (TCI) states. Each entry of the TCI table state may be associated with a TCI codepoint, and may include or indicate one or more TCI states. The TCI states in the table may be indicated based on their TCI state IDs.

In another aspect, the Multi-TB Repetition Module 908 may be configured to receive, from the BS, DCI indicating a beam pattern or beam configuration. The beam pattern may include or indicate one or more beam directions. For example, the Multi-TB Repetition Module 908 may receive an indication of one or more beam patterns transmitted in the multi-TB repetition configuration. The indication may be, for example, an entry of a TCI state table. In some aspects, the DCI may include or indicate a TCI codepoint associated with one or more TCI states. The TCI state table may be arranged and configured as explained above.

In some aspects, the Multi-TB Repetition Module 908 is configured to receive a time-domain configuration associated with a first TB and a second TB, where the first TB and the second TB are associated with a same scheduling grant. In some aspects, the Multi-TB Repetition Module 908 receives, via the DCI, an entry or row of a TDRA table. The entry or row of the TDRA table may indicate various time-domain parameters associated with the multi-TB repetition communication. In some aspects, the time-domain indication may also indicate the first number of repetitions for the first TB, and the second number of repetitions for the second TB. In some aspects, the first number of repetitions may be a same value as the second number of repetitions, or a different value as the second number of repetitions. For example, in some aspects, both the first number of repetitions and the second number of repetitions may be 2. In another example, the first number of repetitions may be 3, and the second number of repetitions may be 1.

In another aspect, the Multi-TB Repetition Module 908 may be configured to communicate, with the BS based on the multi-TB repetition configuration and the beam pattern, the first TB and the second TB. In some aspects, the Multi-TB Repetition Module 908 is configured to receive the first number of repetitions of the first TB and the second number of repetitions of the second TB in one of more scheduled PDSCHs. In other aspects, the Multi-TB Repetition Module 908 is configured to transmit the first number of repetitions of the first TB and the second number of repetitions of the second TB in one or more scheduled PUSCHs. In some aspects, the Multi-TB Repetition Module 908 is configured to communicate the first number of repetitions of the first TB and the second number of repetitions of the second TB in a CG resource, a semi-static resource, or a static resource.

In some aspects, communicating the first TB and the second TB includes mapping the beam pattern onto one or more repetitions of the first TB and/or the second TB. In some aspects, the beam pattern may be mapped to all repetitions of the first TB and second TB in the time domain, sequentially. For example, the beam pattern may be mapped to the repetitions in the time domain sequentially and without regard to the associated TB. For example, if two beam directions (1 and 2) are indicated, the beam pattern may include a [1, 1, 2, 2, 1, 1, 2, 2] sequence as shown in FIG. 3A ("Sequential mapping") and mapped onto all repetitions of the first TB and the second TB based on their temporal order. In another example, the beam pattern may be mapped to all repetitions of the first TB and second TB in the time domain, cyclically. For example, the beam pattern may include a [1, 2, 1, 2, 1, 2, 1, 2] sequence as shown in FIG. 3A ("Cyclical mapping") and mapped onto all repetitions of the first TB and the second TB based on their temporal order. In another example, the beam pattern may be mapped to all repetitions of the first TB and the second TB in the time domain, half/half. For example, the beam pattern may include a [1, 1, 1, 1, 2, 2, 2, 2] sequence as shown in FIG. 3A ("Half/half mapping") and mapped to all repetitions of the first TB and the second TB based on their temporal order. The Multi-TB Repetition Module 908 may communicate the repetitions of the first TB and the second TB in a sequential fashion (e.g., as shown in FIG. 3A), or in an interlaced or cyclical fashion (e.g., as shown in FIG. 3B).

In another aspect, communicating the first TB and the second TB includes mapping one or more beam patterns to the first TB and the second TB based on the associated TB. For example, the Multi-TB Repetition Module 908 may map a beam pattern to the repetitions of the first TB based on their temporal order, and may map the beam pattern to the repetitions of the second TB based on their temporal order. Thus, the mapping may be TB-dependent. The mapping of the beam pattern may be sequential, cyclical, or half/half, as explained above, but with respect to the TBs associated with each repetition. For example, the beam pattern may be mapped to the repetitions as illustrated in FIGS. 4A and 4B. The Multi-TB Repetition Module 908 may communicate the repetitions of the first TB and the second TB in a sequential fashion (e.g., as shown in FIG. 4A), or in an interlaced or cyclical fashion (e.g., as shown in FIG. 4B).

In some aspects, a same beam sequence or pattern may be mapped onto all repetitions (e.g., FIGS. 3A, 3B), or onto the repetitions of each TB (e.g., FIGS. 4A, 4B). In another aspect, different beam sequences may be mapped onto the repetitions of each TB. For example, the Multi-TB Repetition Module 908 may map a first beam pattern or sequence onto the repetitions of the first TB, and a different beam pattern or sequence onto the repetitions of the second TB. For example, the Multi-TB Repetition Module 908 may map a first sequential pattern of [1, 1, 2, 2] to the repetitions of a first TB, and a second sequential pattern of [2, 2, 1, 1] to the repetitions of a second TB (see, e.g., FIG. 5 "Sequential mapping"). In another example, the Multi-TB Repetition Module 908 may map a first cyclical pattern of [1, 2, 1, 2] to the repetitions of a first TB, and a second cyclical pattern of [2, 1, 2, 1] to the repetitions of a second TB (see, e.g., FIG. 5 "Cyclical mapping"). In another example, the Multi-TB Repetition Module 908 may map a first half/half pattern of [1, 1, 2, 2] to the repetitions of a first TB, and a second half/half pattern of [2, 2, 1, 1] to the repetitions of a second TB (see, e.g., FIG. 5 "Half/half mapping"). In some aspects, the Multi-TB Repetition Module 908 may be configured to apply a first type of pattern to the repetitions of the first TB (e.g., sequential), and a second type of pattern to the repetitions of the second TB (e.g., cyclical).

In another aspect, the Multi-TB Repetition Module 908 may map the TB repetitions to the time domain based on a beam switch configuration. For example, the Multi-TB Repetition Module 908 may switch beam directions between repetitions of a same TB, or between repetitions of different TBs. Switching beams or beam directions may involve a gap period between a first beam or beam direction and a second beam or beam direction. In some aspects, the Multi-TB Repetition Module 908 may determine whether a gap period between a first TB repetition of the first number of repetitions associated with a first beam direction and a second TB repetition of the second number of repetitions is below a threshold. The Multi-TB Repetition Module 908 may refrain, in response to determining that the gap period is below the threshold, from communicating the second TB repetition in a slot immediately following the first TB repetition. If the Multi-TB Repetition Module 908 maps a cyclical beam pattern (e.g., [1, 2, 1, 2, . . . ]), the Multi-TB Repetition Module 908 may determine whether a gap between each repetition and the preceding repetition is below the threshold, and may delay the transmission of any repetition that does not satisfy the gap threshold for one or more slots as shown in FIG. 6A, for example. In another aspect, if the Multi-TB Repetition Module 908 maps a sequential or half/half beam pattern (e.g., [1, 1, 1, 1, 2, 2, 2, 2]) such that the repetitions are arranged in groups by beam direction, the Multi-TB Repetition Module 908 may determine whether a gap between the first group of repetitions and the second group of repetitions is below the threshold, and may delay the transmission of the second group of repetitions for one or more slots if the gap threshold is not satisfied as shown in FIG. 6B, for example.

In another aspect, the Multi-TB Repetition Module 908 may be configured to map one or more redundancy versions (RVs) to the one or more repetitions according to a HARQ communication scheme. In some aspects, the Multi-TB Repetition Module 908 may map the RVs based on a RV configuration, which may include a RV sequence. In an exemplary aspect, the RV sequence may be {0, 2, 3, 1}. The RV configuration may indicate other parameters, such as a RV offset to apply to one or more of the repetitions. For example, the RV configuration may indicate a first RV offset to apply to the repetitions of the first TB, and a second RV offset to apply to the repetitions of the second TB. In another aspect, the RV configuration may indicate a first RV offset to apply to repetitions associated with a first beam, and a second RV offset to apply to repetitions associated with a second beam, as shown in FIG. 7A, for example. In some aspects, the RV configuration may indicate a single RV offset to apply to repetitions of the first TB and/or the second TB. In some aspects, the RV configuration indicates a RV value for a first repetition of each TB. In another aspect, the Multi-TB Repetition Module 908 may indicate a RV value for a first repetition of each TB, and a RV offset for each TB. For example, the Multi-TB Repetition Module 908 may map a first RV value to a first repetition of the first TB, and may adjust the RV sequence by the RV offset based on a change in beam direction for one or more remaining repetitions of the first TB, as shown in FIG. 7B, for example. The Multi-TB Repetition Module 908 may indicate a same RV offset for each TB (e.g., as shown in FIG. 7B), or different RV offsets for different TBs (e.g., as shown in FIG. 7C). The Multi-TB Repetition Module 908 may indicate the initial RV values and the RV offset or offsets to increase RV diversity and/or interference diversity for the repetitions, thereby increasing the chances of a successful decoding by the BS.

In another aspect, the Multi-TB Repetition Module 908 may transmit the repetitions of the first TB and the second TB based on a predefined rule, which may override a configured beam pattern or beam sequence. For example, the Multi-TB Repetition Module 908 may map, to a multi-TB repetition sequence including the first number of repetitions and the second number of repetitions, a pre-configured beam pattern different from the beam pattern or configuration. For example, the Multi-TB Repetition Module 908 may apply the pre-configured beam pattern based on a number of TBs and/or a number of repetitions of each TB in the multi-TB communication. For example, the Multi-TB Repetition Module 908 may apply the pre-configured to apply a cyclical beam pattern {1, 2, 1, 2, . . . } if the number of TBs is 2 and the number of repetitions for each TB is also 2, and the repetitions are arranged sequentially (e.g., TB 1, TB 1, TB 2, TB2). Thus, the Multi-TB Repetition Module 908 may override a RRC-configured sequential beam pattern (e.g., {1, 1, 2, 2, . . . }) and apply the cyclical pre-configured beam pattern or sequence to provide interference/beam diversity, for example. In another example, the Multi-TB Repetition Module 908 may apply a pre-configured sequential beam pattern {1, 1, 2, 2, . . . } if the number of TBs is 2 and the number of repetitions for each TB is also 2, and the repetitions are arranged cyclically/interlaced (e.g., TB 1, TB 2, TB 1, TB2). Thus, the Multi-TB Repetition Module 908 may override a RRC-configured cyclical beam pattern (e.g., {1, 2, 1, 2, . . . }) and apply the sequential pre-configured beam pattern or sequence to provide interference/beam diversity, for example. In another aspect, the Multi-TB Repetition Module 908 may override a RRC-configured half/half beam pattern and apply a cyclic beam pattern if 2 beam directions are indicated in the beam pattern and the repetitions in the multi-TB communication are arranged cyclically/interlaced.

In another aspect, the Multi-TB Repetition Module 908 may be configured to segment a repetition overlapping a slot boundary into two actual repetitions. For example, if the Multi-TB Repetition Module 908 maps repetitions to the time domain based on type B repetition or type B mapping, the Multi-TB Repetition Module 908 may be configured to segment the overlapping repetition into two actual repetitions. Further, the beam mapping may be applied based on the overlapping repetition (also referred to as a nominal repetition), or on the actual repetition. For example, the Multi-TB Repetition Module 908 may be configured to apply a single beam direction to the overlapping repetition, or to apply different beam directions for the two actual repetitions. Further, the Multi-TB Repetition Module 908 may be configured to apply a single RV to the overlapping repetition, or to apply different RVs for the two actual repetitions. In that regard, the schemes 300-700 described above may be performed based on the nominal repetition, or on the actual repetition. Whether the beam mapping and/or RV mapping is applied based on the nominal repetition or the actual repetition may be configured via RRC, MAC-CE, or hard-coded by the network.

As shown, the transceiver 910 may include the modem subsystem 912 and the RF unit 914. The transceiver 910 can be configured to communicate bi-directionally with other devices, such as the BSs 105. The modem subsystem 912 may be configured to modulate and/or encode the data from the memory 904 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., configured grant UL transmissions, PUSCH) from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together at the UE 115 to enable the UE 115 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., configured grant information, parameters, bitmaps, other system and channel parameters, HARQ-ACK messages) to the Multi-TB Repetition Module 908 for processing. The antennas 916 may include multiple antennas of similar or different designs in order to sustain multiple transmission links. The RF unit 914 may configure the antennas 916. In an example, the transceiver 910 is configured to receive, from a base station (BS), information or parameters regarding a configured grant resource, and communicate, with the BS, PUSCHs and HARQ-ACKs associated with HARQ processes and HARQ process IDs, for example, by coordinating with the Multi-TB Repetition Module 908.

In an aspect, the UE 900 can include multiple transceivers 910 implementing different RATs (e.g., NR and LTE). In an aspect, the UE 900 can include a single transceiver 910 implementing multiple RATs (e.g., NR and LTE). In an aspect, the transceiver 910 can include various components, where different combinations of components can implement different RATs.

Figure 10:
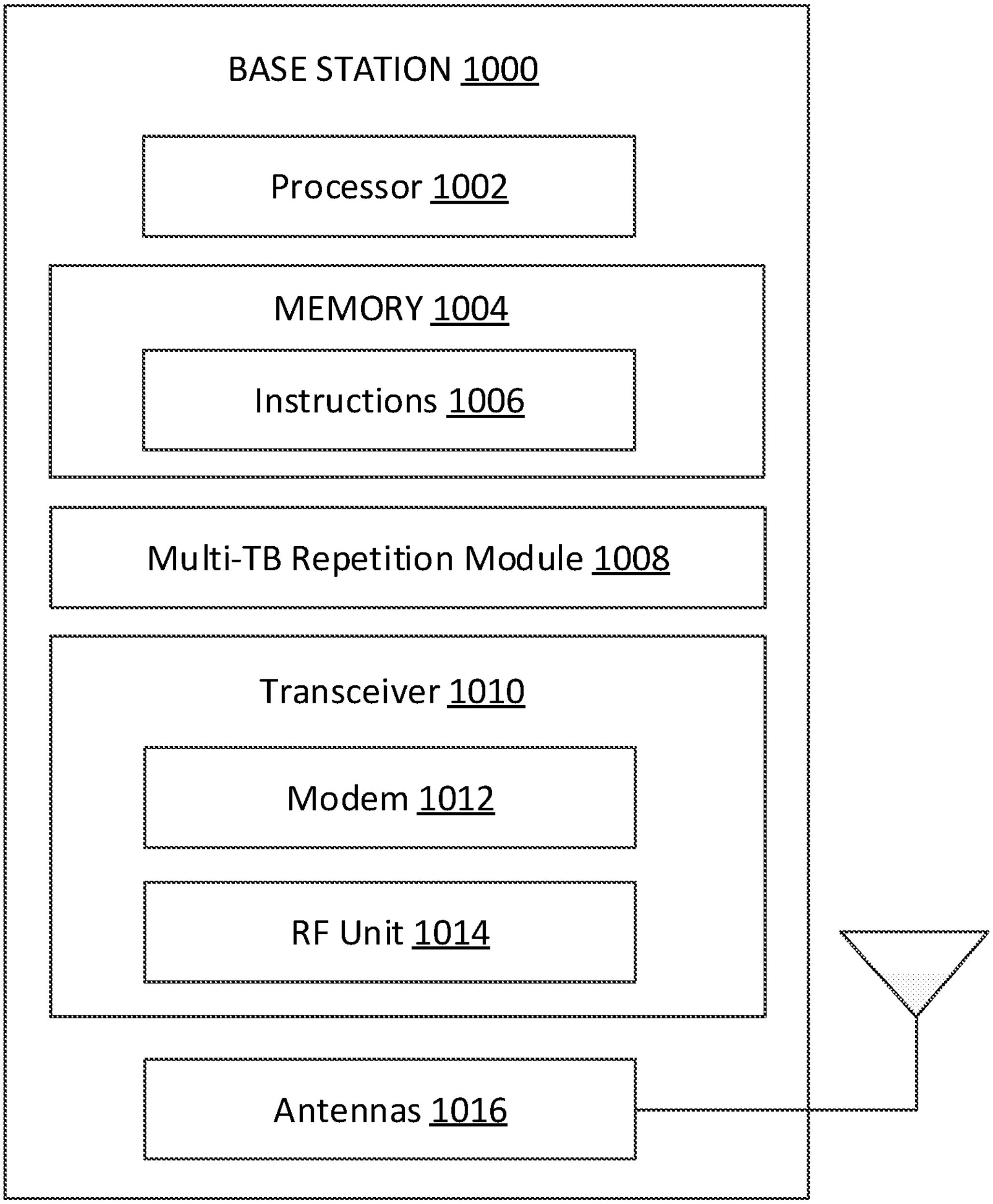
FIG. 10 is a block diagram of an exemplary base station (BS) according to some aspects of the present disclosure.

FIG. 10 is a block diagram of an exemplary BS 1000 according to some aspects of the present disclosure. The BS 1000 may be a BS 105 in the network 100 as discussed above in FIG. 1. A shown, the BS 1000 may include a processor 1002, a memory 1004, Multi-TB Repetition Module 1008, a transceiver 1010 including a modem subsystem 1012 and a RF unit 1014, and one or more antennas 1016. These elements may be in direct or indirect communication with each other, for example via one or more buses.

The processor 1002 may have various features as a specific-type processor. For example, these may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1004 may include a non-transitory computer-readable medium. The memory 1004 may store instructions 1006. The instructions 1006 may include instructions that, when executed by the processor 1002, cause the processor 1002 to perform operations described herein, for example, aspects of FIGS. 2-7B. Instructions 1006 may also be referred to as code, which may be interpreted broadly to include any type of computer-readable statement(s).

The Multi-TB Repetition Module 1008 may be implemented via hardware, software, or combinations thereof. For example, the Multi-TB Repetition Module 1008 may be implemented as a processor, circuit, and/or instructions 1006 stored in the memory 1004 and executed by the processor 1002. In some examples, the Multi-TB Repetition Module 1008 can be integrated within the modem subsystem 1012. For example, the Multi-TB Repetition Module 1008 can be implemented by a combination of software components (e.g., executed by a DSP or a general processor) and hardware components (e.g., logic gates and circuitry) within the modem subsystem 1012. In some examples, a UE may include one or more Multi-TB Repetition Module 1008.

The Multi-TB Repetition Module 1008 may be used for various aspects of the present disclosure, for example, aspects of FIGS. 1-7B. In some aspects, the Multi-TB Repetition Module 1008 can be configured to transmit, to a user equipment (UE), a multi-transport block (TB) repetition configuration indicating a first number of repetitions and a second number of repetitions. In some aspects, transmitting the multi-TB repetition configuration may include transmitting a radio resource control (RRC) message including a RRC configuration. For example, the Multi-TB Repetition Module 1008 may transmit a RRC message indicating a pdsch-AggregationFactor or pusch-AggregationFactor, or any other suitable parameter, which indicates the first number of repetitions and the second number of repetitions. In another aspect, the Multi-TB Repetition Module 1008 may be configured to transmit a time-domain resource allocation (TDRA) table including a plurality of rows, or entries. In some aspects, one or more rows or entries may include or indicate the first number of repetitions and/or the second number of repetitions. The TDRA entries may also include an index number associated with the entry, and one or more time-domain parameters (e.g., start and length indicator value (SLIV), starting symbol, length, etc.) associated with at least one repetition of the first TB, and at least one repetition of the second TB. In some aspects, the first number of repetitions may be associated with a first TB and the second number of repetitions may be associated with a second TB. The first TB and the second TB may be associated with a same scheduling grant, in some aspects. In other aspects, the first number of repetitions may be used for each of the first TB and the second TB. In some aspects, the Multi-TB Repetition Module 1008 determines the number of TBs by applying a floor operation to a ratio of the first parameter to the second parameter. In some aspects, the Multi-TB Repetition Module 1008 determines the number of TBs by applying a ceiling operation to a ratio of the first parameter to the second parameter.

In some aspects, the Multi-TB Repetition Module 1008 is configured to transmit a beam configuration including or one or more beam directions and/or beam parameters. For example, transmitting the beam configuration may include transmitting a RRC configuration or message that includes a table of transmission configuration indication (TCI) states. Each entry of the TCI table state may be associated with a TCI codepoint, and may include or indicate one or more TCI states. The TCI states in the table may be indicated based on their TCI state IDs.

In another aspect, the Multi-TB Repetition Module 1008 may be configured to transmit, to the UE, DCI indicating a beam pattern or beam configuration. The beam pattern may include or indicate one or more beam directions. For example, the Multi-TB Repetition Module 1008 may transmit an indication of one or more beam patterns transmitted in the multi-TB repetition configuration. The indication may be, for example, an entry of a TCI state table. In some aspects, the DCI may include or indicate a TCI codepoint associated with one or more TCI states. The TCI state table may be arranged and configured as explained above.

In some aspects, the Multi-TB Repetition Module 1008 is configured to transmit a time-domain configuration associated with a first TB and a second TB, where the first TB and the second TB are associated with a same scheduling grant. In some aspects, the Multi-TB Repetition Module 1008 indicates, via the DCI, an entry or row of a TDRA table. The entry or row of the TDRA table may indicate various time-domain parameters associated with the multi-TB repetition communication. In some aspects, the time-domain indication may also indicate the first number of repetitions for the first TB, and the second number of repetitions for the second TB. In some aspects, the first number of repetitions may be a same value as the second number of repetitions, or a different value as the second number of repetitions. For example, in some aspects, both the first number of repetitions and the second number of repetitions may be 2. In another example, the first number of repetitions may be 3, and the second number of repetitions may be 1.

In another aspect, the Multi-TB Repetition Module 1008 may be configured to communicate, with the UE based on the multi-TB repetition configuration and the beam pattern, the first TB and the second TB. In some aspects, the Multi-TB Repetition Module 1008 is configured to transmit the first number of repetitions of the first TB and the second number of repetitions of the second TB in one of more scheduled PDSCHs. In other aspects, the Multi-TB Repetition Module 1008 is configured to receive the first number of repetitions of the first TB and the second number of repetitions of the second TB in one or more scheduled PUSCHs. In some aspects, the Multi-TB Repetition Module 1008 is configured to communicate the first number of repetitions of the first TB and the second number of repetitions of the second TB in a CG resource, a semi-static resource, or a static resource.

In some aspects, communicating the first TB and the second TB includes mapping the beam pattern onto one or more repetitions of the first TB and/or the second TB. In some aspects, the beam pattern may be mapped to all repetitions of the first TB and second TB in the time domain, sequentially. For example, the beam pattern may be mapped to the repetitions in the time domain sequentially and without regard to the associated TB. For example, if two beam directions (1 and 2) are indicated, the beam pattern may include a [1, 1, 2, 2, 1, 1, 2, 2] sequence as shown in FIG. 3A ("Sequential mapping") and mapped onto all repetitions of the first TB and the second TB based on their temporal order. In another example, the beam pattern may be mapped to all repetitions of the first TB and second TB in the time domain, cyclically. For example, the beam pattern may include a [1, 2, 1, 2, 1, 2, 1, 2] sequence as shown in FIG. 3A ("Cyclical mapping") and mapped onto all repetitions of the first TB and the second TB based on their temporal order. In another example, the beam pattern may be mapped to all repetitions of the first TB and the second TB in the time domain, half/half. For example, the beam pattern may include a [1, 1, 1, 1, 2, 2, 2, 2] sequence as shown in FIG. 3A ("Half/half mapping") and mapped to all repetitions of the first TB and the second TB based on their temporal order. The Multi-TB Repetition Module 1008 may communicate the repetitions of the first TB and the second TB in a sequential fashion (e.g., as shown in FIG. 3A), or in an interlaced or cyclical fashion (e.g., as shown in FIG. 3B).

In another aspect, communicating the first TB and the second TB includes mapping one or more beam patterns to the first TB and the second TB based on the associated TB. For example, the Multi-TB Repetition Module 1008 may map a beam pattern to the repetitions of the first TB based on their temporal order, and may map the beam pattern to the repetitions of the second TB based on their temporal order. Thus, the mapping may be TB-dependent. The mapping of the beam pattern may be sequential, cyclical, or half/half, as explained above, but with respect to the TBs associated with each repetition. For example, the beam pattern may be mapped to the repetitions as illustrated in FIGS. 4A and 4B. The Multi-TB Repetition Module 1008 may communicate the repetitions of the first TB and the second TB in a sequential fashion (e.g., as shown in FIG. 4A), or in an interlaced or cyclical fashion (e.g., as shown in FIG. 4B).

In some aspects, a same beam sequence or pattern may be mapped onto all repetitions (e.g., FIGS. 3A, 3B), or onto the repetitions of each TB (e.g., FIGS. 4A, 4B). In another aspect, different beam sequences may be mapped onto the repetitions of each TB. For example, the Multi-TB Repetition Module 1008 may map a first beam pattern or sequence onto the repetitions of the first TB, and a different beam pattern or sequence onto the repetitions of the second TB. For example, the Multi-TB Repetition Module 1008 may map a first sequential pattern of [1, 1, 2, 2] to the repetitions of a first TB, and a second sequential pattern of [2, 2, 1, 1] to the repetitions of a second TB (see, e.g., FIG. 5 "Sequential mapping"). In another example, the Multi-TB Repetition Module 1008 may map a first cyclical pattern of [1, 2, 1, 2] to the repetitions of a first TB, and a second cyclical pattern of [2, 1, 2, 1] to the repetitions of a second TB (see, e.g., FIG. 5 "Cyclical mapping"). In another example, the Multi-TB Repetition Module 1008 may map a first half/half pattern of [1, 1, 2, 2] to the repetitions of a first TB, and a second half/half pattern of [2, 2, 1, 1] to the repetitions of a second TB (see, e.g., FIG. 5 "Half/half mapping"). In some aspects, the Multi-TB Repetition Module 1008 may be configured to apply a first type of pattern to the repetitions of the first TB (e.g., sequential), and a second type of pattern to the repetitions of the second TB (e.g., cyclical).

In another aspect, the Multi-TB Repetition Module 1008 may map the TB repetitions to the time domain based on a beam switch configuration. For example, the Multi-TB Repetition Module 1008 may switch beam directions between repetitions of a same TB, or between repetitions of different TBs. Switching beams or beam directions may involve a gap period between a first beam or beam direction and a second beam or beam direction. In some aspects, the Multi-TB Repetition Module 1008 may determine whether a gap period between a first TB repetition of the first number of repetitions associated with a first beam direction and a second TB repetition of the second number of repetitions is below a threshold. The Multi-TB Repetition Module 1008 may refrain, in response to determining that the gap period is below the threshold, from communicating the second TB repetition in a slot immediately following the first TB repetition. If the Multi-TB Repetition Module 1008 maps a cyclical beam pattern (e.g., [1, 2, 1, 2, . . . ]), the Multi-TB Repetition Module 1008 may determine whether a gap between each repetition and the preceding repetition is below the threshold, and may delay the transmission of any repetition that does not satisfy the gap threshold for one or more slots as shown in FIG. 6A, for example. In another aspect, if the Multi-TB Repetition Module 1008 maps a sequential or half/half beam pattern (e.g., [1, 1, 1, 1, 2, 2, 2, 2]) such that the repetitions are arranged in groups by beam direction, the Multi-TB Repetition Module 1008 may determine whether a gap between the first group of repetitions and the second group of repetitions is below the threshold, and may delay the transmission of the second group of repetitions for one or more slots if the gap threshold is not satisfied as shown in FIG. 6B, for example.

In another aspect, the Multi-TB Repetition Module 1008 may be configured to map one or more redundancy versions (RVs) to the one or more repetitions according to a HARQ communication scheme. In some aspects, the Multi-TB Repetition Module 1008 may map the RVs based on a RV configuration, which may include a RV sequence. In an exemplary aspect, the RV sequence may be {0, 2, 3, 1}. The RV configuration may indicate other parameters, such as a RV offset to apply to one or more of the repetitions. For example, the RV configuration may indicate a first RV offset to apply to the repetitions of the first TB, and a second RV offset to apply to the repetitions of the second TB. In another aspect, the RV configuration may indicate a first RV offset to apply to repetitions associated with a first beam, and a second RV offset to apply to repetitions associated with a second beam, as shown in FIG. 7A, for example. In some aspects, the RV configuration may indicate a single RV offset to apply to repetitions of the first TB and/or the second TB. In some aspects, the RV configuration indicates a RV value for a first repetition of each TB. In another aspect, the Multi-TB Repetition Module 1008 may indicate a RV value for a first repetition of each TB, and a RV offset for each TB. For example, the Multi-TB Repetition Module 1008 may map a first RV value to a first repetition of the first TB, and may adjust the RV sequence by the RV offset based on a change in beam direction for one or more remaining repetitions of the first TB, as shown in FIG. 7B, for example. The Multi-TB Repetition Module 1008 may indicate a same RV offset for each TB (e.g., as shown in FIG. 7B), or different RV offsets for different TBs (e.g., as shown in FIG. 7C). The Multi-TB Repetition Module 1008 may indicate the initial RV values and the RV offset or offsets to increase RV diversity and/or interference diversity for the repetitions, thereby increasing the chances of a successful decoding by the UE.

In another aspect, the Multi-TB Repetition Module 1008 may transmit the repetitions of the first TB and the second TB based on a predefined rule, which may override a configured beam pattern or beam sequence. For example, the Multi-TB Repetition Module 1008 may map, to a multi-TB repetition sequence including the first number of repetitions and the second number of repetitions, a pre-configured beam pattern different from the beam pattern or configuration. For example, the Multi-TB Repetition Module 1008 may apply the pre-configured beam pattern based on a number of TBs and/or a number of repetitions of each TB in the multi-TB communication. For example, the Multi-TB Repetition Module 1008 may apply the pre-configured to apply a cyclical beam pattern {1, 2, 1, 2, . . . } if the number of TBs is 2 and the number of repetitions for each TB is also 2, and the repetitions are arranged sequentially (e.g., TB 1, TB 1, TB 2, TB2). Thus, the Multi-TB Repetition Module 1008 may override a RRC-configured sequential beam pattern (e.g., {1, 1, 2, 2, . . . }) and apply the cyclical pre-configured beam pattern or sequence to provide interference/beam diversity, for example. In another example, the Multi-TB Repetition Module 1008 may apply a pre-configured sequential beam pattern {1, 1, 2, 2, . . . } if the number of TBs is 2 and the number of repetitions for each TB is also 2, and the repetitions are arranged cyclically/interlaced (e.g., TB 1, TB 2, TB 1, TB2). Thus, the Multi-TB Repetition Module 1008 may override a RRC-configured cyclical beam pattern (e.g., {1, 2, 1, 2, . . . }) and apply the sequential pre-configured beam pattern or sequence to provide interference/beam diversity, for example. In another aspect, the Multi-TB Repetition Module 1008 may override a RRC-configured half/half beam pattern and apply a cyclic beam pattern if 2 beam directions are indicated in the beam pattern and the repetitions in the multi-TB communication are arranged cyclically/interlaced.

In another aspect, the Multi-TB Repetition Module 1008 may be configured to segment a repetition overlapping a slot boundary into two actual repetitions. For example, if the Multi-TB Repetition Module 1008 maps repetitions to the time domain based on type B repetition or type B mapping, the Multi-TB Repetition Module 1008 may be configured to segment the overlapping repetition into two actual repetitions. Further, the beam mapping may be applied based on the overlapping repetition (also referred to as a nominal repetition), or on the actual repetition. For example, the Multi-TB Repetition Module 1008 may be configured to apply a single beam direction to the overlapping repetition, or to apply different beam directions for the two actual repetitions. Further, the Multi-TB Repetition Module 1008 may be configured to apply a single RV to the overlapping repetition, or to apply different RVs for the two actual repetitions. In that regard, the schemes 300-700 described above may be performed based on the nominal repetition, or on the actual repetition. Whether the beam mapping and/or RV mapping is applied based on the nominal repetition or the actual repetition may be configured via RRC, MAC-CE, or hard-coded by the network.

As shown, the transceiver 1010 may include the modem subsystem 1012 and the RF unit 1014. The transceiver 1010 can be configured to communicate bi-directionally with other devices, such as the UEs 115 and/or 300 and/or another core network element. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., configured grant information, parameters, bitmaps, other system and channel parameters, HARQ-ACK messages) from the modem subsystem 1012 (on outbound transmissions) or of transmissions originating from another source such as a UE 115. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at the BS 1000 to enable the BS 1000 to communicate with other devices.

The RF unit 1014 may provide the modulated and/or processed data, e.g. data packets (or, more generally, data messages that may contain one or more data packets and other information), to the antennas 1016 for transmission to one or more other devices. This may include, for example, transmission of information to complete attachment to a network and communication with a camped UE 115 or 1000 according to some aspects of the present disclosure. The antennas 1016 may further receive data messages transmitted from other devices and provide the received data messages for processing and/or demodulation at the transceiver 1010. The transceiver 1010 may provide the demodulated and decoded data (e.g., configured grant UL transmissions, PUSCH) to the communication module 1008 and configured transmission module 1008 for processing. The antennas 1016 may include multiple antennas of similar or different designs in order to sustain multiple transmission links. In an example, the transceiver 1010 is configured to transmit, to a UE, information or parameters regarding a configured grant resource, and communicate, with the UE, PUSCHs and HARQ-ACKs associated with HARQ processes and HARQ process IDs, for example, by coordinating with the Multi-TB Repetition Module 1008.

In an aspect, the BS 1000 can include multiple transceivers 1010 implementing different RATs (e.g., NR and LTE). In an aspect, the BS 1000 can include a single transceiver 1010 implementing multiple RATs (e.g., NR and LTE). In an aspect, the transceiver 1010 can include various components, where different combinations of components can implement different RATs.

FIG. 11 is a flow diagram of a communication method 1100 according to some aspects of the present disclosure. Steps of the method 1100 can be executed by a computing device (e.g., a processor, processing circuit, and/or other suitable component) of an apparatus or other suitable means for performing the steps. For example, a BS, such as BSs 105 and/or 1000, may utilize one or more components, such as the processor 1002, the memory 1004, the Multi-TB Repetition Module 1008, the transceiver 1010, and the one or more antennas 1016, to execute the steps of method 1100. The method 1100 may employ similar mechanisms as described above with respect to FIGS. 2-7B. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, the BS transmits, to a user equipment (UE), a multi-transport block (TB) repetition configuration indicating a first number of repetitions and a second number of repetitions. In some aspects, block 1110 may include transmitting a radio resource control (RRC) message including a RRC configuration. For example, the BS may transmit a RRC message indicating a pdsch-AggregationFactor or pusch-AggregationFactor, or any other suitable parameter, which indicates the first number of repetitions and the second number of repetitions. In another aspect, block 1110 may include the BS transmitting a time-domain resource allocation (TDRA) table including a plurality of rows, or entries. In some aspects, one or more rows or entries may include or indicate the first number of repetitions and/or the second number of repetitions. The TDRA entries may also include an index number associated with the entry, and one or more time-domain parameters (e.g., start and length indicator value (SLIV), starting symbol, length, etc.) associated with at least one repetition of the first TB, and at least one repetition of the second TB. In some aspects, the first number of repetitions may be associated with a first TB and the second number of repetitions may be associated with a second TB. The first TB and the second TB may be associated with a same scheduling grant, in some aspects. In other aspects, the first number of repetitions may be used for each of the first TB and the second TB. In some aspects, the BS determines the number of TBs by applying a floor operation to a ratio of the first parameter to the second parameter. In some aspects, the BS determines the number of TBs by applying a ceiling operation to a ratio of the first parameter to the second parameter.

In some aspects, block 1110 further includes transmitting a beam configuration including or one or more beam directions and/or beam parameters. For example, transmitting the beam configuration may include transmitting a RRC configuration or message that includes a table of transmission configuration indication (TCI) states. Each entry of the TCI table state may be associated with a TCI codepoint, and may include or indicate one or more TCI states. The TCI states in the table may be indicated based on their TCI state IDs. The BS may utilize one or more components, such as the processor 1002, the memory 1004, the Multi-TB Repetition Module 1008, the transceiver 1010, and the one or more antennas 1016, to execute the actions of block 1110.

At block 1120, the BS transmits, to the UE, DCI indicating a beam pattern or beam configuration. The beam pattern may include or indicate one or more beam directions. For example, the BS may transmit an indication of one or more beam patterns transmitted in the multi-TB repetition configuration transmitted at block 1110. The indication may be, for example, an entry of a TCI state table. In some aspects, the DCI may include or indicate a TCI codepoint associated with one or more TCI states. The TCI state table may be arranged and configured as explained above.

In some aspects, block 1120 further includes transmitting a time-configuration associated with a first TB and a second TB, where the first TB and the second TB are associated with a same scheduling grant. In some aspects, block 1120 includes the BS indicating, via the DCI, an entry or row of a TDRA table. The TDRA table may be configured by the BS at block 1110, for example. The entry or row of the TDRA table may indicate various time-domain parameters associated with the multi-TB repetition communication. In some aspects, the time-domain indication may also indicate the first number of repetitions for the first TB, and the second number of repetitions for the second TB. In some aspects, the first number of repetitions may be a same value as the second number of repetitions, or a different value as the second number of repetitions. For example, in some aspects, both the first number of repetitions and the second number of repetitions may be 2. In another example, the first number of repetitions may be 3, and the second number of repetitions may be 1. The BS may utilize one or more components, such as the processor 1002, the memory 1004, the Multi-TB Repetition Module 1008, the transceiver 1010, and the one or more antennas 1016, to execute the actions of block 1120.

At block 1130, the BS communicates, with the UE based on the multi-TB repetition configuration and the beam pattern, the first TB and the second TB. In some aspects, block 1130 includes the BS transmitting the first number of repetitions of the first TB and the second number of repetitions of the second TB in one of more scheduled PDSCHs. In other aspects, block 1130 includes the BS receiving the first number of repetitions of the first TB and the second number of repetitions of the second TB in one or more scheduled PUSCHs. In some aspects, block 1130 may include the BS communicating the first number of repetitions of the first TB and the second number of repetitions of the second TB in a CG resource, a semi-static resource, or a static resource.

In some aspects, communicating the first TB and the second TB includes mapping the beam pattern onto one or more repetitions of the first TB and/or the second TB. In some aspects, the beam pattern may be mapped to all repetitions of the first TB and second TB in the time domain, sequentially. For example, the beam pattern may be mapped to the repetitions in the time domain sequentially and without regard to the associated TB. For example, if two beam directions (1 and 2) are indicated, the beam pattern may include a [1, 1, 2, 2, 1, 1, 2, 2] sequence as shown in FIG. 3A ("Sequential mapping") and mapped onto all repetitions of the first TB and the second TB based on their temporal order. In another example, the beam pattern may be mapped to all repetitions of the first TB and second TB in the time domain, cyclically. For example, the beam pattern may include a [1, 2, 1, 2, 1, 2, 1, 2] sequence as shown in FIG. 3A ("Cyclical mapping") and mapped onto all repetitions of the first TB and the second TB based on their temporal order. In another example, the beam pattern may be mapped to all repetitions of the first TB and the second TB in the time domain, half/half. For example, the beam pattern may include a [1, 1, 1, 1, 2, 2, 2, 2] sequence as shown in FIG. 3A ("Half/half mapping") and mapped to all repetitions of the first TB and the second TB based on their temporal order. The BS may communicate the repetitions of the first TB and the second TB in a sequential fashion (e.g., as shown in FIG. 3A), or in an interlaced or cyclical fashion (e.g., as shown in FIG. 3B).

In another aspect, communicating the first TB and the second TB includes mapping one or more beam patterns to the first TB and the second TB based on the associated TB. For example, the BS may map a beam pattern to the repetitions of the first TB based on their temporal order, and may map the beam pattern to the repetitions of the second TB based on their temporal order. Thus, the mapping may be TB-dependent. The mapping of the beam pattern may be sequential, cyclical, or half/half, as explained above, but with respect to the TBs associated with each repetition. For example, the beam pattern may be mapped to the repetitions as illustrated in FIGS. 4A and 4B. The BS may communicate the repetitions of the first TB and the second TB in a sequential fashion (e.g., as shown in FIG. 4A), or in an interlaced or cyclical fashion (e.g., as shown in FIG. 4B).

In some aspects, a same beam sequence or pattern may be mapped onto all repetitions (e.g., FIGS. 3A, 3B), or onto the repetitions of each TB (e.g., FIGS. 4A, 4B). In another aspect, different beam sequences may be mapped onto the repetitions of each TB. For example, the BS may map a first beam pattern or sequence onto the repetitions of the first TB, and a different beam pattern or sequence onto the repetitions of the second TB. For example, the BS may map a first sequential pattern of [1, 1, 2, 2] to the repetitions of a first TB, and a second sequential pattern of [2, 2, 1, 1] to the repetitions of a second TB (see, e.g., FIG. 5 "Sequential mapping"). In another example, the BS may map a first cyclical pattern of [1, 2, 1, 2] to the repetitions of a first TB, and a second cyclical pattern of [2, 1, 2, 1] to the repetitions of a second TB (see, e.g., FIG. 5 "Cyclical mapping"). In another example, the BS may map a first half/half pattern of [1, 1, 2, 2] to the repetitions of a first TB, and a second half/half pattern of [2, 2, 1, 1] to the repetitions of a second TB (see, e.g., FIG. 5 "Half/half mapping"). In some aspects, the BS may be configured to apply a first type of pattern to the repetitions of the first TB (e.g., sequential), and a second type of pattern to the repetitions of the second TB (e.g., cyclical).

In another aspect, the BS may map the TB repetitions to the time domain based on a beam switch configuration. For example, the BS may switch beam directions between repetitions of a same TB, or between repetitions of different TBs. Switching beams or beam directions may involve a gap period between a first beam or beam direction and a second beam or beam direction. In some aspects, the BS may determine whether a gap period between a first TB repetition of the first number of repetitions associated with a first beam direction and a second TB repetition of the second number of repetitions is below a threshold. The BS may refrain, in response to determining that the gap period is below the threshold, from communicating the second TB repetition in a slot immediately following the first TB repetition. If the BS maps a cyclical beam pattern (e.g., [1, 2, 1, 2, . . . ]), the BS may determine whether a gap between each repetition and the preceding repetition is below the threshold, and may delay the transmission of any repetition that does not satisfy the gap threshold for one or more slots as shown in FIG. 6A, for example. In another aspect, if the BS maps a sequential or half/half beam pattern (e.g., [1, 1, 1, 1, 2, 2, 2, 2]) such that the repetitions are arranged in groups by beam direction, the BS may determine whether a gap between the first group of repetitions and the second group of repetitions is below the threshold, and may delay the transmission of the second group of repetitions for one or more slots if the gap threshold is not satisfied as shown in FIG. 6B, for example. The BS may utilize one or more components, such as the processor 1002, the memory 1004, the Multi-TB Repetition Module 1008, the transceiver 1010, and the one or more antennas 1016, to execute the actions of block 1130.

In another aspect, the method 1100 may include mapping one or more redundancy versions (RVs) to the one or more repetitions according to a HARQ communication scheme. In some aspects, the mapping of the RVs may be based on a RV configuration, which may include a RV sequence. In an exemplary aspect, the RV sequence may be {0, 2, 3, 1}. The RV configuration may indicate other parameters, such as a RV offset to apply to one or more of the repetitions. For example, the RV configuration may indicate a first RV offset to apply to the repetitions of the first TB, and a second RV offset to apply to the repetitions of the second TB. In another aspect, the RV configuration may indicate a first RV offset to apply to repetitions associated with a first beam, and a second RV offset to apply to repetitions associated with a second beam, as shown in FIG. 7A, for example. In some aspects, the RV configuration may indicate a single RV offset to apply to repetitions of the first TB and/or the second TB. In some aspects, the RV configuration indicates a RV value for a first repetition of each TB. In another aspect, the BS may indicate a RV value for a first repetition of each TB, and a RV offset for each TB. For example, the BS may map a first RV value to a first repetition of the first TB, and may adjust the RV sequence by the RV offset based on a change in beam direction for one or more remaining repetitions of the first TB, as shown in FIG. 7B, for example. The BS may indicate a same RV offset for each TB (e.g., as shown in FIG. 7B), or different RV offsets for different TBs (e.g., as shown in FIG. 7C). The BS may indicate the initial RV values and the RV offset or offsets to increase RV diversity and/or interference diversity for the repetitions, thereby increasing the chances of a successful decoding by the UE.

In another aspect, the BS may transmit the repetitions of the first TB and the second TB based on a predefined rule, which may override a configured beam pattern or beam sequence. For example, the BS may map, to a multi-TB repetition sequence including the first number of repetitions and the second number of repetitions, a pre-configured beam pattern different from the beam pattern or configuration indicated at block 1120. For example, the BS may apply the pre-configured beam pattern based on a number of TBs and/or a number of repetitions of each TB in the multi-TB communication. For example, the BS may apply the pre-configured to apply a cyclical beam pattern {1, 2, 1, 2, . . . } if the number of TBs is 2 and the number of repetitions for each TB is also 2, and the repetitions are arranged sequentially (e.g., TB 1, TB 1, TB 2, TB2). Thus, the BS may override a RRC-configured sequential beam pattern (e.g., {1, 1, 2, 2, . . . }) and apply the cyclical pre-configured beam pattern or sequence to provide interference/beam diversity, for example. In another example, the BS may apply a pre-configured sequential beam pattern {1, 1, 2, 2, . . . } if the number of TBs is 2 and the number of repetitions for each TB is also 2, and the repetitions are arranged cyclically/interlaced (e.g., TB 1, TB 2, TB 1, TB2). Thus, the BS may override a RRC-configured cyclical beam pattern (e.g., {1, 2, 1, 2, . . . }) and apply the sequential pre-configured beam pattern or sequence to provide interference/beam diversity, for example. In another aspect, the BS may override a RRC-configured half/half beam pattern and apply a cyclic beam pattern if 2 beam directions are indicated in the beam pattern and the repetitions in the multi-TB communication are arranged cyclically/interlaced.

In another aspect, the BS may be configured to segment a repetition overlapping a slot boundary into two actual repetitions. For example, if the BS and/or the UE maps repetitions to the time domain based on type B repetition or type B mapping, the BS may be configured to segment the overlapping repetition into two actual repetitions. Further, the beam mapping may be applied based on the overlapping repetition (also referred to as a nominal repetition), or on the actual repetition. For example, the BS may be configured to apply a single beam direction to the overlapping repetition, or to apply different beam directions for the two actual repetitions. Further, the BS may be configured to apply a single RV to the overlapping repetition, or to apply different RVs for the two actual repetitions. In that regard, the schemes 300-700 described above may be performed based on the nominal repetition, or on the actual repetition. Whether the beam mapping and/or RV mapping is applied based on the nominal repetition or the actual repetition may be configured via RRC, MAC-CE, or hard-coded by the network.

FIG. 12 is a flow diagram of a communication method 1200 according to some aspects of the present disclosure. Steps of the method 1200 can be executed by a computing device (e.g., a processor, processing circuit, and/or other suitable component) of an apparatus or other suitable means for performing the steps. For example, a UE, such as the UEs 125 and/or 900, may utilize one or more components, such as the processor 902, the memory 904, the Multi-TB Repetition Module 908, the transceiver 910, and the one or more antennas 916, to execute the steps of method 1200. The method 1200 may employ similar mechanisms as described above with respect to FIGS. 6-7B. As illustrated, the method 1200 includes a number of enumerated steps, but aspects of the method 1200 may include additional steps before, after, and in between the enumerated steps. In some aspects, one or more of the enumerated steps may be omitted or performed in a different order.

At block 1210, the UE receives, from a BS, a multi-transport block (TB) repetition configuration indicating a first number of repetitions and a second number of repetitions. In some aspects, block 1210 may include receiving a radio resource control (RRC) message including a RRC configuration. For example, the BS may transmit a RRC message indicating a pdsch-AggregationFactor or pusch-AggregationFactor, or any other suitable parameter, which indicates the first number of repetitions and the second number of repetitions. In another aspect, block 1210 may include the UE receiving a time-domain resource allocation (TDRA) table including a plurality of rows, or entries. In some aspects, one or more rows or entries may include or indicate the first number of repetitions and/or the second number of repetitions. The TDRA entries may also include an index number associated with the entry, and one or more time-domain parameters (e.g., start and length indicator value (SLIV), starting symbol, length, etc.) associated with at least one repetition of the first TB, and at least one repetition of the second TB. In some aspects, the first number of repetitions may be associated with a first TB and the second number of repetitions may be associated with a second TB. The first TB and the second TB may be associated with a same scheduling grant, in some aspects. In other aspects, the first number of repetitions may be used for each of the first TB and the second TB.

In some aspects, block 1210 further includes receiving a beam configuration including or one or more beam directions and/or beam parameters. For example, receiving the beam configuration may include receiving a RRC configuration or message that includes a table of transmission configuration indication (TCI) states. Each entry of the TCI table state may be associated with a TCI codepoint, and may include or indicate one or more TCI states. The TCI states in the table may be indicated based on their TCI state IDs. The UE may utilize one or more components, such as the processor 902, the memory 904, the Multi-TB Repetition Module 908, the transceiver 912, and the one or more antennas 916, to execute the actions of block 1210.

At block 1220, the UE receives, from the BS, DCI indicating a beam pattern or beam configuration. The beam pattern may include or indicate one or more beam directions. For example, the UE may receive an indication of one or more beam patterns received in the multi-TB repetition configuration transmitted at block 1210. The indication may be, for example, an entry of a TCI state table. In some aspects, the DCI may include or indicate a TCI codepoint associated with one or more TCI states. The TCI state table may be arranged and configured as explained above.

In some aspects, block 1220 further includes receiving a time-configuration associated with a first TB and a second TB, where the first TB and the second TB are associated with a same scheduling grant. In some aspects, block 1220 includes the UE receiving an indication, via the DCI, of an entry or row of a TDRA table. The TDRA table may be received from the BS at block 1210, for example. The entry or row of the TDRA table may indicate various time-domain parameters associated with the multi-TB repetition communication. In some aspects, the time-domain indication may also indicate the first number of repetitions for the first TB, and the second number of repetitions for the second TB. In some aspects, the first number of repetitions may be a same value as the second number of repetitions, or a different value as the second number of repetitions. For example, in some aspects, both the first number of repetitions and the second number of repetitions may be 2. In another example, the first number of repetitions may be 3, and the second number of repetitions may be 1. The UE may utilize one or more components, such as the processor 902, the memory 904, the Multi-TB Repetition Module 908, the transceiver 912, and the one or more antennas 916, to execute the actions of block 1220.

At block 1230, the UE communicates, with the BS based on the multi-TB repetition configuration and the beam pattern, the first TB and the second TB. In some aspects, block 1230 includes the UE receiving the first number of repetitions of the first TB and the second number of repetitions of the second TB in one of more scheduled PDSCHs. In other aspects, block 1230 includes the UE transmitting the first number of repetitions of the first TB and the second number of repetitions of the second TB in one or more scheduled PUSCHs. In some aspects, block 1230 may include the UE communicating the first number of repetitions of the first TB and the second number of repetitions of the second TB in a CG resource, a semi-static resource, or a static resource.

In some aspects, communicating the first TB and the second TB includes mapping the beam pattern onto one or more repetitions of the first TB and/or the second TB. In some aspects, the beam pattern may be mapped to all repetitions of the first TB and second TB in the time domain, sequentially. For example, the beam pattern may be mapped to the repetitions in the time domain sequentially and without regard to the associated TB. For example, if two beam directions (1 and 2) are indicated, the beam pattern may include a [1, 1, 2, 2, 1, 1, 2, 2] sequence as shown in FIG. 3A ("Sequential mapping") and mapped onto all repetitions of the first TB and the second TB based on their temporal order. In another example, the beam pattern may be mapped to all repetitions of the first TB and second TB in the time domain, cyclically. For example, the beam pattern may include a [1, 2, 1, 2, 1, 2, 1, 2] sequence as shown in FIG. 3A ("Cyclical mapping") and mapped onto all repetitions of the first TB and the second TB based on their temporal order. In another example, the beam pattern may be mapped to all repetitions of the first TB and the second TB in the time domain, half/half. For example, the beam pattern may include a [1, 1, 1, 1, 2, 2, 2, 2] sequence as shown in FIG. 3A ("Half/half mapping") and mapped to all repetitions of the first TB and the second TB based on their temporal order. The UE may communicate the repetitions of the first TB and the second TB in a sequential fashion (e.g., as shown in FIG. 3A), or in an interlaced or cyclical fashion (e.g., as shown in FIG. 3B).

In another aspect, communicating the first TB and the second TB includes mapping one or more beam patterns to the first TB and the second TB based on the associated TB. For example, the UE may map a beam pattern to the repetitions of the first TB based on their temporal order, and may map the beam pattern to the repetitions of the second TB based on their temporal order. Thus, the mapping may be TB-dependent. The mapping of the beam pattern may be sequential, cyclical, or half/half, as explained above, but with respect to the TBs associated with each repetition. For example, the beam pattern may be mapped to the repetitions as illustrated in FIGS. 4A and 4B. The UE may communicate the repetitions of the first TB and the second TB in a sequential fashion (e.g., as shown in FIG. 4A), or in an interlaced or cyclical fashion (e.g., as shown in FIG. 4B).

In some aspects, a same beam sequence or pattern may be mapped onto all repetitions (e.g., FIGS. 3A, 3B), or onto the repetitions of each TB (e.g., FIGS. 4A, 4B). In another aspect, different beam sequences may be mapped onto the repetitions of each TB. For example, the UE may map a first beam pattern or sequence onto the repetitions of the first TB, and a different beam pattern or sequence onto the repetitions of the second TB. For example, the UE may map a first sequential pattern of [1, 1, 2, 2] to the repetitions of a first TB, and a second sequential pattern of [2, 2, 1, 1] to the repetitions of a second TB (see, e.g., FIG. 5 "Sequential mapping"). In another example, the UE may map a first cyclical pattern of [1, 2, 1, 2] to the repetitions of a first TB, and a second cyclical pattern of [2, 1, 2, 1] to the repetitions of a second TB (see, e.g., FIG. 5 "Cyclical mapping"). In another example, the UE may map a first half/half pattern of [1, 1, 2, 2] to the repetitions of a first TB, and a second half/half pattern of [2, 2, 1, 1] to the repetitions of a second TB (see, e.g., FIG. 5 "Half/half mapping"). In some aspects, the UE may be configured to apply a first type of pattern to the repetitions of the first TB (e.g., sequential), and a second type of pattern to the repetitions of the second TB (e.g., cyclical).

In another aspect, the UE may map the TB repetitions to the time domain based on a beam switch configuration. For example, the UE may switch beam directions between repetitions of a same TB, or between repetitions of different TBs. Switching beams or beam directions may involve a gap period between a first beam or beam direction and a second beam or beam direction. In some aspects, the UE may determine whether a gap period between a first TB repetition of the first number of repetitions associated with a first beam direction and a second TB repetition of the second number of repetitions is below a threshold. The UE may refrain, in response to determining that the gap period is below the threshold, from communicating the second TB repetition in a slot immediately following the first TB repetition. If the UE maps a cyclical beam pattern (e.g., [1, 2, 1, 2, . . . ]), the UE may determine whether a gap between each repetition and the preceding repetition is below the threshold, and may delay the transmission of any repetition that does not satisfy the gap threshold for one or more slots as shown in FIG. 6A, for example. In another aspect, if the UE maps a sequential or half/half beam pattern (e.g., [1, 1, 1, 1, 2, 2, 2, 2]) such that the repetitions are arranged in groups by beam direction, the UE may determine whether a gap between the first group of repetitions and the second group of repetitions is below the threshold, and may delay the transmission of the second group of repetitions for one or more slots if the gap threshold is not satisfied as shown in FIG. 6B, for example. The UE may utilize one or more components, such as the processor 902, the memory 904, the Multi-TB Repetition Module 908, the transceiver 912, and the one or more antennas 916, to execute the actions of block 1230.

In another aspect, the method 1200 may include the UE mapping one or more redundancy versions (RVs) to the one or more repetitions according to a HARQ communication scheme. In some aspects, the mapping of the RVs may be based on a RV configuration received from the BS, which may include a RV sequence. In an exemplary aspect, the RV sequence may be {0, 2, 3, 1}. The RV configuration may indicate other parameters, such as a RV offset to apply to one or more of the repetitions. For example, the RV configuration may indicate a first RV offset to apply to the repetitions of the first TB, and a second RV offset to apply to the repetitions of the second TB. In another aspect, the RV configuration may indicate a first RV offset to apply to repetitions associated with a first beam, and a second RV offset to apply to repetitions associated with a second beam, as shown in FIG. 7A, for example. In some aspects, the RV configuration may indicate a single RV offset to apply to repetitions of the first TB and/or the second TB. In some aspects, the RV configuration indicates a RV value for a first repetition of each TB. In another aspect, the UE may receive an indication of a RV value for a first repetition of each TB, and a RV offset for each TB. For example, the BS may map a first RV value to a first repetition of the first TB, and may adjust the RV sequence by the RV offset based on a change in beam direction for one or more remaining repetitions of the first TB, as shown in FIG. 7B, for example. The UE may receive an indication of a same RV offset for each TB (e.g., as shown in FIG. 7B), or different RV offsets for different TBs (e.g., as shown in FIG. 7C). The UE may receive an indication of the initial RV values and the RV offset or offsets to increase RV diversity and/or interference diversity for the repetitions, thereby increasing the chances of a successful decoding by the UE.

In another aspect, the UE may receive the repetitions of the first TB and the second TB based on a predefined rule, which may override a configured beam pattern or beam sequence. For example, the UE may map, to a multi-TB repetition sequence including the first number of repetitions and the second number of repetitions, a pre-configured beam pattern different from the beam pattern or configuration indicated at block 1220. For example, the UE may apply the pre-configured beam pattern based on a number of TBs and/or a number of repetitions of each TB in the multi-TB communication. For example, the UE may apply the pre-configured to apply a cyclical beam pattern {1, 2, 1, 2, . . . } if the number of TBs is 2 and the number of repetitions for each TB is also 2, and the repetitions are arranged sequentially (e.g., TB 1, TB 1, TB 2, TB2). Thus, the UE may override a RRC-configured sequential beam pattern (e.g., {1, 1, 2, 2, . . . }) and apply the cyclical pre-configured beam pattern or sequence to provide interference/beam diversity, for example. In another example, the BS may apply a pre-configured sequential beam pattern {1, 1, 2, 2, . . . } if the number of TBs is 2 and the number of repetitions for each TB is also 2, and the repetitions are arranged cyclically/interlaced (e.g., TB 1, TB 2, TB 1, TB2). Thus, the UE may override a RRC-configured cyclical beam pattern (e.g., {1, 2, 1, 2, . . . }) and apply the sequential pre-configured beam pattern or sequence to provide interference/beam diversity, for example. In another aspect, the UE may override a RRC-configured half/half beam pattern and apply a cyclic beam pattern if 2 beam directions are indicated in the beam pattern and the repetitions in the multi-TB communication are arranged cyclically/interlaced.

In another aspect, the UE may be configured to segment a repetition overlapping a slot boundary into two actual repetitions. For example, if the UE maps repetitions to the time domain based on type B repetition or type B mapping, the UE may be configured to segment the overlapping repetition into two actual repetitions. Further, the beam mapping may be applied based on the overlapping repetition (also referred to as a nominal repetition), or on the actual repetition. For example, the UE may be configured to apply a single beam direction to the overlapping repetition, or to apply different beam directions for the two actual repetitions. Further, the UE may be configured to apply a single RV to the overlapping repetition, or to apply different RVs for the two actual repetitions. In that regard, the schemes 300-700 described above may be performed based on the nominal repetition, or on the actual repetition. Whether the beam mapping and/or RV mapping is applied based on the nominal repetition or the actual repetition may be configured via RRC, MAC-CE, or hard-coded by the network.

Aspects of the present disclosure include the following:

1. A method of wireless communication performed by a user equipment (UE), the method comprising:
   receiving, from a base station (BS), a multi-transport block (TB) repetition configuration indicating a first number of repetitions and a second number of repetitions;
   receiving, from the BS, downlink control information (DCI) indicating a beam pattern including a plurality of beam directions;
   communicating, with the BS based on the multi-TB repetition configuration and the beam pattern, a first TB and a second TB associated with a same scheduling grant, wherein the communicating the first TB and the second TB includes:
      communicating the first number of repetitions for the first TB; and
      communicating the second number of repetitions for the second TB.
2. The method of clause 1, further comprising:
   determining a multi-TB repetition sequence including the first number of repetitions and the second number of repetitions; and
   mapping the beam pattern to the multi-TB repetition sequence, wherein the beam pattern indicates a pre-configured pattern of beam directions.
3. The method of clause 1, further comprising:
   determining a multi-TB repetition sequence including the first number of repetitions and the second number of repetitions;
   mapping the beam pattern to the first number of repetitions of the first TB in a multi-TB repetition sequence including the first number of repetitions and the second number of repetitions, wherein the beam pattern indicates a preconfigured pattern of beam directions; and
   mapping the beam pattern to the second number of repetitions of the second TB in the multi-TB repetition sequence.
4. The method of clause 1, wherein the beam pattern includes a first preconfigured beam sequence associated with the first TB and a second preconfigured beam sequence associated with the second TB, and
   further comprising:
      mapping the first preconfigured beam sequence to the first number of repetitions of the first TB in a multi-TB repetition sequence including the first number of repetitions and the second number of repetitions; and
      mapping the second preconfigured beam sequence to the second number of repetitions of the second TB in the multi-TB repetition sequence.
5. The method of any of clauses 1-4, further comprising:
   segmenting a TB repetition of the first number of repetitions overlapping a slot boundary into a first actual TB repetition and a second actual TB repetition;
   mapping a first beam direction of the beam pattern to the first actual TB repetition of the TB repetition; and
   mapping a second beam direction of the beam pattern to the second actual TB repetition of the TB repetition.
6. The method of any of clauses 1-5, further comprising:
   determining whether a gap period between a first TB repetition of the first number of repetitions associated with a first beam direction and a second TB repetition of the second number of repetitions associated with a second beam direction is below a threshold; and
   refraining, in response to determining that the gap period is below the threshold, from communicating the second TB repetition in a slot immediately following the first TB repetition.
7. The method of any of clauses 1-6, further comprising:
   mapping, to a multi-TB repetition sequence including the first number of repetitions and the second number of repetitions, one of the beam pattern or a pre-configured beam pattern different from the beam pattern based on the first number of repetitions of the first TB, the second number of repetitions of the second TB, and a number of scheduled TBs associated with the scheduling grant.
8. The method of any of clauses 1-7, further comprising:
   receiving, from the BS, a redundancy version (RV) configuration indicating a first RV value for the first repetition of the first TB and a second RV value for the first repetition of the second TB;
   mapping a first preconfigured RV sequence starting from the first RV value to the first number of repetitions; and mapping a second preconfigured RV sequence starting from the second RV value to the second number of repetitions independently of the first number of repetitions.

9. The method of clause 8, wherein:

the mapping the first preconfigured RV sequence starting from the first RV value to the first number of repetitions is based on a first beam direction associated with each TB repetition in the first number of repetitions, and the mapping the second preconfigured RV sequence starting from the second RV value to the second number of repetitions is based on a second beam direction associated with each TB repetition in the second number of repetitions.

10. The method of clause 9, wherein:

the RV configuration further indicates an RV offset, and the mapping the first preconfigured RV sequence to the first number of repetitions is further based on the RV offset; and the mapping the second preconfigured RV sequence to the second number of repetitions is further based on the RV offset.

11. The method of clause 9, wherein:

the RV configuration further indicates a first RV offset for the first TB and a second RV offset for the second TB, and the mapping a predefined RV sequence to the first number of repetitions is further based on the first RV offset.

the mapping a predefined RV sequence to the second number of repetitions is further based on the second RV offset.

12. The method of any of clauses 1-11, wherein the receiving the multi-TB repetition configuration comprises receiving a radio resource control (RRC) configuration indicating the multi-TB repetition configuration.

13. The method of any of clauses 1-11, wherein the receiving the multi-TB repetition configuration comprises the receiving the DCI indicating the multi-TB repetition configuration.

14. The method of any of clauses 1-13, wherein:

the communicating the first number of repetitions of the first TB comprises receiving a first number of downlink (DL) repetitions of the first TB; and the communicating the first number of repetitions of the first TB comprises receiving a second number of DL repetitions of the second TB.

15. The method of any of clauses 1-13, wherein:

the communicating the first number of repetitions of the first TB comprises transmitting a first number of uplink (UL) repetitions of the first TB; and the communicating the first number of repetitions of the first TB comprises transmitting a second number of UL repetitions of the second TB.

16. The method of any of clauses 1-15, wherein the DCI indicates the scheduling grant.

17. The method of any of clauses 1-15, wherein the scheduling grant is a semi-static grant.

18. A method of wireless communication performed by a base station (BS), the method comprising:

transmitting, to a user equipment (UE), a multi-transport block (TB) repetition configuration indicating a first number of repetitions and a second number of repetitions;

transmitting, to the UE, downlink control information (DCI) indicating a beam pattern including a plurality of beam directions;

communicating, with the UE based on the multi-TB repetition configuration and the beam pattern, a first TB and a second TB associated with a same scheduling grant, wherein the communicating the first TB and the second TB includes:

communicating the first number of repetitions for the first TB; and communicating the second number of repetitions for the second TB.

19. The method of clause 18, further comprising:

determining a multi-TB repetition sequence including the first number of repetitions and the second number of repetitions; and mapping the beam pattern to the multi-TB repetition sequence, wherein the beam pattern indicates a preconfigured pattern of beam directions.

20. The method of clause 18, further comprising:

determining a multi-TB repetition sequence including the first number of repetitions and the second number of repetitions;

mapping the beam pattern to the first number of repetitions of the first TB in a multi-TB repetition sequence including the first number of repetitions and the second number of repetitions, wherein the beam pattern indicates a preconfigured pattern of beam directions; and mapping the beam pattern to the second number of repetitions of the second TB in the multi-TB repetition sequence.

21. The method of clause 18, wherein the beam pattern includes a first preconfigured beam sequence associated with the first TB and a second preconfigured beam sequence associated with the second TB, and further comprising:

mapping the first preconfigured beam sequence to the first number of repetitions of the first TB in a multi-TB repetition sequence including the first number of repetitions and the second number of repetitions; and mapping the second preconfigured beam sequence to the second number of repetitions of the second TB in the multi-TB repetition sequence.

22. The method of any of clauses 18-21, further comprising:

segmenting a TB repetition of the first number of repetitions overlapping a slot boundary into a first actual TB repetition and a second actual TB repetition;

mapping a first beam direction of the beam pattern to the first actual TB repetition of the TB repetition; and mapping a second beam direction of the beam pattern to the second actual TB repetition of the TB repetition.

23. The method of any of clauses 18-22, further comprising:

determining whether a gap period between a first TB repetition of the first number of repetitions associated with a first beam direction and a second TB repetition of the second number of repetitions associated with a second beam direction is below a threshold; and refraining, in response to determining that the gap period is below the threshold, from communicating the second TB repetition in a slot immediately following the first TB repetition.

24. The method of any of clauses 18-23, further comprising:
mapping, to a multi-TB repetition sequence including the first number of repetitions and the second number of repetitions, one of the beam pattern or a preconfigured beam pattern different from the beam pattern based on the first number of repetitions of the first TB, the second number of repetitions of the second TB, and a number of scheduled TBs associated with the scheduling grant.

25. The method of any of clauses 18-24, further comprising:
transmitting, to the UE, a redundancy version (RV) configuration indicating a first RV value for the first repetition of the first TB and a second RV value for the first repetition of the second TB;
mapping a first preconfigured RV sequence starting from the first RV value to the first number of repetitions; and
mapping a second preconfigured RV sequence starting from the second RV value to the second number of repetitions independently of the first number of repetitions.

26. The method of clause 25, wherein:
the mapping the first preconfigured RV sequence starting from the first RV value to the first number of repetitions is based on a first beam direction associated with each TB repetition in the first number of repetitions, and
the mapping the second preconfigured RV sequence starting from the second RV value to the second number of repetitions is based on a second beam direction associated with each TB repetition in the second number of repetitions.

27. The method of clause 26, wherein:
the RV configuration further indicates an RV offset, and
the mapping the first preconfigured RV sequence to the first number of repetitions is further based on the RV offset; and
the mapping the second preconfigured RV sequence to the second number of repetitions is further based on the RV offset.

28. The method of clause 26, wherein:
the RV configuration further indicates a first RV offset for the first TB and a second RV offset for the second TB, and
the mapping a predefined RV sequence to the first number of repetitions is further based on the first RV offset.
the mapping a predefined RV sequence to the second number of repetitions is further based on the second RV offset.

29. The method of clause any of clauses 18-28, wherein the transmitting the multi-TB repetition configuration comprises transmitting a radio resource control (RRC) configuration indicating the multi-TB repetition configuration.

30. The method of any of clauses 18-28, wherein the transmitting the multi-TB repetition configuration comprises the transmitting the DCI indicating the multi-TB repetition configuration.

31. A user equipment (UE), comprising:
a transceiver; and
a processor in communication with the transceiver and configured to cause the transceiver to:
receive, from a base station (BS), a multi-transport block (TB) repetition configuration indicating a first number of repetitions and a second number of repetitions;
receive, from the BS, downlink control information (DCI) indicating a beam pattern including a plurality of beam directions;
communicate, with the BS based on the multi-TB repetition configuration and the beam pattern, a first TB and a second TB associated with a same scheduling grant, wherein the processor configured to cause the transceiver to communicate the first TB and the second TB includes the processor configured to cause the transceiver to:
communicate the first number of repetitions for the first TB; and
communicate the second number of repetitions for the second TB.

32. The UE of clause 31, wherein the processor is further configured to:
determine a multi-TB repetition sequence including the first number of repetitions and the second number of repetitions; and
map the beam pattern to the multi-TB repetition sequence, wherein the beam pattern indicates a preconfigured pattern of beam directions.

33. The UE of clause 31, wherein the processor is further configured to:
determine a multi-TB repetition sequence including the first number of repetitions and the second number of repetitions;
map the beam pattern to the first number of repetitions of the first TB in a multi-TB repetition sequence including the first number of repetitions and the second number of repetitions, wherein the beam pattern indicates a preconfigured pattern of beam directions; and
map the beam pattern to the second number of repetitions of the second TB in the multi-TB repetition sequence.

34. The UE of clause 31, wherein the beam pattern includes a first preconfigured beam sequence associated with the first TB and a second preconfigured beam sequence associated with the second TB, and
the processor is further configured to:
map the first preconfigured beam sequence to the first number of repetitions of the first TB in a multi-TB repetition sequence including the first number of repetitions and the second number of repetitions; and
map the second preconfigured beam sequence to the second number of repetitions of the second TB in the multi-TB repetition sequence.

35. The UE of clause 31, wherein the processor is further configured to:
segment a TB repetition of the first number of repetitions overlapping a slot boundary into a first actual TB repetition and a second actual TB repetition;
map a first beam direction of the beam pattern to the first actual TB repetition of the TB repetition; and
map a second beam direction of the beam pattern to the second actual TB repetition of the TB repetition.

36. The UE of clause 31, wherein the processor is further configured to:
determine whether a gap period between a first TB repetition of the first number of repetitions associated with a first beam direction and a second TB repetition of the second number of repetitions associated with a second beam direction is below a threshold; and refrain, in response to determining that the gap period is below the threshold, from communicating the second TB repetition in a slot immediately following the first TB repetition.

37. The UE of clause 31, wherein the processor is further configured to:

map, to a multi-TB repetition sequence including the first number of repetitions and the second number of repetitions, one of the beam pattern or a pre-configured beam pattern different from the beam pattern based on the first number of repetitions of the first TB, the second number of repetitions of the second TB, and a number of scheduled TBs associated with the scheduling grant.

38. The UE of clause 31, wherein the processor is further configured to:

cause the transceiver to receive, from the BS, a redundancy version (RV) configuration indicating a first RV value for the first repetition of the first TB and a second RV value for the first repetition of the second TB;

map a first preconfigured RV sequence starting from the first RV value to the first number of repetitions; and map a second preconfigured RV sequence starting from the second RV value to the second number of repetitions independently of the first number of repetitions.

39. The UE of clause 38, wherein:

the processor is configured to map the first preconfigured RV sequence starting from the first RV value to the first number of repetitions based on a first beam direction associated with each TB repetition in the first number of repetitions, and the processor is configured to map the second preconfigured RV sequence starting from the second RV value to the second number of repetitions based on a second beam direction associated with each TB repetition in the second number of repetitions.

40. The UE of clause 39, wherein:

the RV configuration further indicates an RV offset, and the processor is configured to map the first preconfigured RV sequence to the first number of repetitions further based on the RV offset; and the processor is configured to map the second preconfigured RV sequence to the second number of repetitions further based on the RV offset.

41. The UE of clause 39, wherein:

the RV configuration further indicates a first RV offset for the first TB and a second RV offset for the second TB, and the processor is configured to map a predefined RV sequence to the first number of repetitions further based on the first RV offset.

the processor is configured to map a predefined RV sequence to the second number of repetitions further based on the second RV offset.

42. The UE of clause 31, wherein the processor configured to cause the transceiver to receive the multi-TB repetition configuration comprises the processor configured to cause the transceiver to receive a radio resource control (RRC) configuration indicating the multi-TB repetition configuration.

43. The UE of clause 31, wherein the processor configured to cause the transceiver to receive the multi-TB repetition configuration comprises the processor configured to cause the transceiver to receive the DCI indicating the multi-TB repetition configuration.

44. The UE of clause 31, wherein:

the processor configured to cause the transceiver to communicate the first number of repetitions of the first TB comprises the processor configured to cause the transceiver to receive a first number of downlink (DL) repetitions of the first TB; and the processor configured to cause the transceiver to communicate the first number of repetitions of the first TB comprises the processor configured to cause the transceiver to receive a second number of DL repetitions of the second TB.

45. The UE of clause 31, wherein:

the processor configured to cause the transceiver to communicate the first number of repetitions of the first TB comprises the processor configured to cause the transceiver to transmit a first number of uplink (UL) repetitions of the first TB; and the processor configured to cause the transceiver to communicate the first number of repetitions of the first TB comprises the processor configured to cause the transceiver to transmit a second number of UL repetitions of the second TB.

46. The UE of clause 31, wherein the DCI indicates the scheduling grant.

47. The UE of clause 31, wherein the scheduling grant is a semi-static grant.

48. A base station (BS), comprising:

a transceiver; and a processor in communication with the transceiver and configured to cause the transceiver to:

transmit, to a user equipment (UE), a multi-transport block (TB) repetition configuration indicating a first number of repetitions and a second number of repetitions;

transmit, to the UE, downlink control information (DCI) indicating a beam pattern including a plurality of beam directions;

communicate, with the UE based on the multi-TB repetition configuration and the beam pattern, a first TB and a second TB associated with a same scheduling grant, wherein the processor configured to cause the transceiver to communicate the first TB and the second TB includes the processor configured to cause the transceiver to:

communicate the first number of repetitions for the first TB; and communicate the second number of repetitions for the second TB.

49. The BS of clause 48, wherein the processor is further configured to:

determine a multi-TB repetition sequence including the first number of repetitions and the second number of repetitions; and map the beam pattern to the multi-TB repetition sequence, wherein the beam pattern indicates a pre-configured pattern of beam directions.

50. The BS of clause 48, wherein the processor is further configured to:

determine a multi-TB repetition sequence including the first number of repetitions and the second number of repetitions;

map the beam pattern to the first number of repetitions of the first TB in a multi-TB repetition sequence including the first number of repetitions and the second number of repetitions, wherein the beam pattern indicates a preconfigured pattern of beam directions; and map the beam pattern to the second number of repetitions of the second TB in the multi-TB repetition sequence.

51. The BS of clause 48, wherein the beam pattern includes a first preconfigured beam sequence associated with the first TB and a second preconfigured beam sequence associated with the second TB, and wherein the processor is further configured to:

map the first preconfigured beam sequence to the first number of repetitions of the first TB in a multi-TB repetition sequence including the first number of repetitions and the second number of repetitions; and map the second preconfigured beam sequence to the second number of repetitions of the second TB in the multi-TB repetition sequence.

52. The BS of clause 48, wherein the processor is further configured to:

segment a TB repetition of the first number of repetitions overlapping a slot boundary into a first actual TB repetition and a second actual TB repetition;

map a first beam direction of the beam pattern to the first actual TB repetition of the TB repetition; and map a second beam direction of the beam pattern to the second actual TB repetition of the TB repetition.

53. The BS of clause 48, wherein the processor is further configured to:

determine whether a gap period between a first TB repetition of the first number of repetitions associated with a first beam direction and a second TB repetition of the second number of repetitions associated with a second beam direction is below a threshold; and refrain, in response to determine that the gap period is below the threshold, from communicating the second TB repetition in a slot immediately following the first TB repetition.

54. The BS of clause 48, wherein the processor is further configured to:

map, to a multi-TB repetition sequence including the first number of repetitions and the second number of repetitions, one of the beam pattern or a pre-configured beam pattern different from the beam pattern based on the first number of repetitions of the first TB, the second number of repetitions of the second TB, and a number of scheduled TBs associated with the scheduling grant.

55. The BS of clause 48, wherein the processor is further configured to:

cause the transceiver to transmit, to the UE, a redundancy version (RV) configuration indicating a first RV value for the first repetition of the first TB and a second RV value for the first repetition of the second TB;

map a first preconfigured RV sequence starting from the first RV value to the first number of repetitions; and map a second preconfigured RV sequence starting from the second RV value to the second number of repetitions independently of the first number of repetitions.

56. The BS of clause 55, wherein:

the processor is configured to map the first preconfigured RV sequence starting from the first RV value to the first number of repetitions based on a first beam direction associated with each TB repetition in the first number of repetitions, and the processor is configured to map the second preconfigured RV sequence starting from the second RV value to the second number of repetitions based on a second beam direction associated with each TB repetition in the second number of repetitions.

57. The BS of clause 56, wherein:

the RV configuration further indicates an RV offset, and the processor is configured to map the first preconfigured RV sequence to the first number of repetitions further based on the RV offset; and the processor is configured to map the second preconfigured RV sequence to the second number of repetitions further based on the RV offset.

58. The BS of clause 56, wherein:

the RV configuration further indicates a first RV offset for the first TB and a second RV offset for the second TB, and the processor is configured to map a predefined RV sequence to the first number of repetitions further based on the first RV offset.

the processor is configured to map a predefined RV sequence to the second number of repetitions further based on the second RV offset.

59. The BS of clause 48, wherein the processor configured to cause the transceiver to transmit the multi-TB repetition configuration comprises the processor configured to cause the transceiver to transmit a radio resource control (RRC) configuration indicating the multi-TB repetition configuration.

60. The BS of clause 48, wherein the processor configured to cause the transceiver to transmit the multi-TB repetition configuration comprises the processor configured to cause the transceiver to transmit the DCI indicating the multi-TB repetition configuration.

61. A non-transitory, computer-readable medium having program code recorded thereon, the program code comprising code for causing a user equipment (UE) to:

receive, from a base station (BS), a multi-transport block (TB) repetition configuration indicating a first number of repetitions and a second number of repetitions;

receive, from the BS, downlink control information (DCI) indicating a beam pattern including a plurality of beam directions;

communicate, with the BS based on the multi-TB repetition configuration and the beam pattern, a first TB and a second TB associated with a same scheduling grant, wherein the code for causing the UE to communicate the first TB and the second TB includes code for causing the UE to:

communicate the first number of repetitions for the first TB; and communicate the second number of repetitions for the second TB.

62. The non-transitory, computer-readable medium of clause 61, wherein the program code further comprises code for causing the UE to:

determine a multi-TB repetition sequence including the first number of repetitions and the second number of repetitions; and map the beam pattern to the multi-TB repetition sequence, wherein the beam pattern indicates a preconfigured pattern of beam directions.

63. The non-transitory, computer-readable medium of clause 61, wherein the program code further comprises code for causing the UE to:
determine a multi-TB repetition sequence including the first number of repetitions and the second number of repetitions;
map the beam pattern to the first number of repetitions of the first TB in a multi-TB repetition sequence including the first number of repetitions and the second number of repetitions, wherein the beam pattern indicates a preconfigured pattern of beam directions; and
map the beam pattern to the second number of repetitions of the second TB in the multi-TB repetition sequence.

64. The non-transitory, computer-readable medium of clause 61, wherein the beam pattern includes a first preconfigured beam sequence associated with the first TB and a second preconfigured beam sequence associated with the second TB, and
the program code further comprises code for causing the UE to:
map the first preconfigured beam sequence to the first number of repetitions of the first TB in a multi-TB repetition sequence including the first number of repetitions and the second number of repetitions; and
map the second preconfigured beam sequence to the second number of repetitions of the second TB in the multi-TB repetition sequence.

65. The non-transitory, computer-readable medium of clause 61, wherein the program code further comprises code for causing the UE to:
segment a TB repetition of the first number of repetitions overlapping a slot boundary into a first actual TB repetition and a second actual TB repetition;
map a first beam direction of the beam pattern to the first actual TB repetition of the TB repetition; and
map a second beam direction of the beam pattern to the second actual TB repetition of the TB repetition.

66. The non-transitory, computer-readable medium of clause 61, wherein the program code further comprises code for causing the UE to:
determine whether a gap period between a first TB repetition of the first number of repetitions associated with a first beam direction and a second TB repetition of the second number of repetitions associated with a second beam direction is below a threshold; and
refrain, in response to determining that the gap period is below the threshold, from communicating the second TB repetition in a slot immediately following the first TB repetition.

67. The non-transitory, computer-readable medium of clause 61, wherein the program code further comprises code for causing the UE to:
map, to a multi-TB repetition sequence including the first number of repetitions and the second number of repetitions, one of the beam pattern or a pre-configured beam pattern different from the beam pattern based on the first number of repetitions of the first TB, the second number of repetitions of the second TB, and a number of scheduled TBs associated with the scheduling grant.

68. The non-transitory, computer-readable medium of clause 61, wherein the program code further comprises code for causing the UE to:
receive, from the BS, a redundancy version (RV) configuration indicating a first RV value for the first repetition of the first TB and a second RV value for the first repetition of the second TB;
map a first preconfigured RV sequence starting from the first RV value to the first number of repetitions; and
map a second preconfigured RV sequence starting from the second RV value to the second number of repetitions independently of the first number of repetitions.

69. The non-transitory, computer-readable medium of clause 68, wherein:
the code for causing the UE to map the first preconfigured RV sequence starting from the first RV value to the first number of repetitions is based on a first beam direction associated with each TB repetition in the first number of repetitions, and
the processor is configured to map the second preconfigured RV sequence starting from the second RV value to the second number of repetitions is based on a second beam direction associated with each TB repetition in the second number of repetitions.

70. The non-transitory, computer-readable medium of clause 69, wherein:
the RV configuration further indicates an RV offset, and
the code for causing the UE to map the first preconfigured RV sequence to the first number of repetitions is further based on the RV offset; and
the code for causing the UE to map the second preconfigured RV sequence to the second number of repetitions is further based on the RV offset.

71. The non-transitory, computer-readable medium of clause 69, wherein:
the RV configuration further indicates a first RV offset for the first TB and a second RV offset for the second TB, and
the code for causing the UE to map a predefined RV sequence to the first number of repetitions is further based on the first RV offset.
the code for causing the UE to map a predefined RV sequence to the second number of repetitions is further based on the second RV offset.

72. The non-transitory, computer-readable medium of clause 61, wherein the code for causing the UE to receive the multi-TB repetition configuration comprises code for causing the UE to receive a radio resource control (RRC) configuration indicating the multi-TB repetition configuration.

73. The non-transitory, computer-readable medium of clause 61, wherein the code for causing the UE to receive the multi-TB repetition configuration comprises code for causing the UE to receive the DCI indicating the multi-TB repetition configuration.

74. The non-transitory, computer-readable medium of clause 61, wherein:
the code for causing the UE to communicate the first number of repetitions of the first TB comprises the code for causing the UE to receive a first number of downlink (DL) repetitions of the first TB; and
the code for causing the UE to communicate the first number of repetitions of the first TB comprises code for causing the UE to receive a second number of DL repetitions of the second TB.

75. The non-transitory, computer-readable medium of clause 61, wherein:
the code for causing the UE to communicate the first number of repetitions of the first TB comprises code for causing the UE to transmit a first number of uplink (UL) repetitions of the first TB; and the code for causing the UE to communicate the first number of repetitions of the first TB comprises code for causing the UE to transmit a second number of UL repetitions of the second TB.

76. The non-transitory, computer-readable medium of clause 61, wherein the DCI indicates the scheduling grant.

77. The non-transitory, computer-readable medium of clause 61, wherein the scheduling grant is a semi-static grant.

78. A non-transitory, computer readable medium having program code recorded thereon, the program code comprising code for causing a base station (BS) to:

transmit, to a user equipment (UE), a multi-transport block (TB) repetition configuration indicating a first number of repetitions and a second number of repetitions;

transmit, to the UE, downlink control information (DCI) indicating a beam pattern including a plurality of beam directions;

communicate, with the UE based on the multi-TB repetition configuration and the beam pattern, a first TB and a second TB associated with a same scheduling grant, wherein the code for causing the BS to communicate the first TB and the second TB includes code for causing the BS to:

communicate the first number of repetitions for the first TB; and communicate the second number of repetitions for the second TB.

79. The non-transitory, computer-readable medium of clause 78, wherein the program code further comprises code for causing the BS to:

determine a multi-TB repetition sequence including the first number of repetitions and the second number of repetitions; and map the beam pattern to the multi-TB repetition sequence, wherein the beam pattern indicates a preconfigured pattern of beam directions.

80. The non-transitory, computer-readable medium of clause 78, wherein the program code further comprises code for causing the BS to:

determine a multi-TB repetition sequence including the first number of repetitions and the second number of repetitions;

map the beam pattern to the first number of repetitions of the first TB in a multi-TB repetition sequence including the first number of repetitions and the second number of repetitions, wherein the beam pattern indicates a preconfigured pattern of beam directions; and map the beam pattern to the second number of repetitions of the second TB in the multi-TB repetition sequence.

81. The non-transitory, computer-readable medium of clause 78, wherein the beam pattern includes a first preconfigured beam sequence associated with the first TB and a second preconfigured beam sequence associated with the second TB, and wherein the program code further comprises code for causing the BS to:

map the first preconfigured beam sequence to the first number of repetitions of the first TB in a multi-TB repetition sequence including the first number of repetitions and the second number of repetitions; and map the second preconfigured beam sequence to the second number of repetitions of the second TB in the multi-TB repetition sequence.

82. The non-transitory, computer-readable medium of clause 78, wherein the program code further comprises code for causing the BS to:

segment a TB repetition of the first number of repetitions overlapping a slot boundary into a first actual TB repetition and a second actual TB repetition;

map a first beam direction of the beam pattern to the first actual TB repetition of the TB repetition; and map a second beam direction of the beam pattern to the second actual TB repetition of the TB repetition.

83. The non-transitory, computer-readable medium of clause 78, wherein the program code further comprises code for causing the BS to:

determine whether a gap period between a first TB repetition of the first number of repetitions associated with a first beam direction and a second TB repetition of the second number of repetitions associated with a second beam direction is below a threshold; and refrain, in response to determine that the gap period is below the threshold, from communicating the second TB repetition in a slot immediately following the first TB repetition.

84. The non-transitory, computer-readable medium of clause 78, wherein the program code further comprises code for causing the BS to:

map, to a multi-TB repetition sequence including the first number of repetitions and the second number of repetitions, one of the beam pattern or a pre-configured beam pattern different from the beam pattern based on the first number of repetitions of the first TB, the second number of repetitions of the second TB, and a number of scheduled TBs associated with the scheduling grant.

85. The non-transitory, computer-readable medium of clause 78, wherein the program code further comprises code for causing the BS to:

transmit, to the UE, a redundancy version (RV) configuration indicating a first RV value for the first repetition of the first TB and a second RV value for the first repetition of the second TB;

map a first preconfigured RV sequence starting from the first RV value to the first number of repetitions; and map a second preconfigured RV sequence starting from the second RV value to the second number of repetitions independently of the first number of repetitions.

86. The non-transitory, computer-readable medium of clause 85, wherein:

the code for causing the BS to map the first preconfigured RV sequence starting from the first RV value to the first number of repetitions is based on a first beam direction associated with each TB repetition in the first number of repetitions, and the code for causing the BS to map the second preconfigured RV sequence starting from the second RV value to the second number of repetitions is based on a second beam direction associated with each TB repetition in the second number of repetitions.

87. The non-transitory, computer-readable medium of clause 86, wherein:
the RV configuration further indicates an RV offset, and
the code for causing the BS to map the first preconfigured RV sequence to the first number of repetitions is further based on the RV offset; and
the code for causing the BS to map the second preconfigured RV sequence to the second number of repetitions is further based on the RV offset.
88. The non-transitory, computer-readable medium of clause 86, wherein:
the RV configuration further indicates a first RV offset for the first TB and a second RV offset for the second TB, and
the code for causing the BS to map a predefined RV sequence to the first number of repetitions is further based on the first RV offset.
the code for causing the BS to map a predefined RV sequence to the second number of repetitions is further based on the second RV offset.
89. The non-transitory, computer-readable medium of clause 78, wherein the code for causing the BS to transmit the multi-TB repetition configuration comprises code for causing the BS to transmit a radio resource control (RRC) configuration indicating the multi-TB repetition configuration.
90. The non-transitory, computer-readable medium of clause 78, wherein the code for causing the BS to transmit the multi-TB repetition configuration comprises code for causing the BS to transmit the DCI indicating the multi-TB repetition configuration.
91. A user equipment (UE), comprising:
means for receiving, from a base station (BS), a multi-transport block (TB) repetition configuration indicating a first number of repetitions and a second number of repetitions;
means for receiving, from the BS, downlink control information (DCI) indicating a beam pattern including a plurality of beam directions;
means for communicating, with the BS based on the multi-TB repetition configuration and the beam pattern, a first TB and a second TB associated with a same scheduling grant, wherein the means for communicating the first TB and the second TB includes:
means for communicating the first number of repetitions for the first TB; and
means for communicating the second number of repetitions for the second TB.
92. The UE of clause 91, further comprising:
means for determining a multi-TB repetition sequence including the first number of repetitions and the second number of repetitions; and
means for mapping the beam pattern to the multi-TB repetition sequence, wherein the beam pattern indicates a preconfigured pattern of beam directions.
93. The UE of clause 91, further comprising:
means for determining a multi-TB repetition sequence including the first number of repetitions and the second number of repetitions;
means for mapping the beam pattern to the first number of repetitions of the first TB in a multi-TB repetition sequence including the first number of repetitions and the second number of repetitions, wherein the beam pattern indicates a preconfigured pattern of beam directions; and
means for mapping the beam pattern to the second number of repetitions of the second TB in the multi-TB repetition sequence.
94. The UE of clause 91, wherein the beam pattern includes a first preconfigured beam sequence associated with the first TB and a second preconfigured beam sequence associated with the second TB, and
further comprising:
means for mapping the first preconfigured beam sequence to the first number of repetitions of the first TB in a multi-TB repetition sequence including the first number of repetitions and the second number of repetitions; and
means for mapping the second preconfigured beam sequence to the second number of repetitions of the second TB in the multi-TB repetition sequence.
95. The UE of any of clauses 91-94, further comprising:
means for segmenting a TB repetition of the first number of repetitions overlapping a slot boundary into a first actual TB repetition and a second actual TB repetition;
means for mapping a first beam direction of the beam pattern to the first actual TB repetition of the TB repetition; and
means for mapping a second beam direction of the beam pattern to the second actual TB repetition of the TB repetition.
96. The UE of any of clauses 91-95, further comprising:
means for determining whether a gap period between a first TB repetition of the first number of repetitions associated with a first beam direction and a second TB repetition of the second number of repetitions associated with a second beam direction is below a threshold; and
means for refraining, in response to means for determining that the gap period is below the threshold, from means for communicating the second TB repetition in a slot immediately following the first TB repetition.
97. The UE of any of clauses 91-96, further comprising:
means for mapping, to a multi-TB repetition sequence including the first number of repetitions and the second number of repetitions, one of the beam pattern or a pre-configured beam pattern different from the beam pattern based on the first number of repetitions of the first TB, the second number of repetitions of the second TB, and a number of scheduled TBs associated with the scheduling grant.
98. The UE of any of clauses 91-97, further comprising:
means for receiving, from the BS, a redundancy version (RV) configuration indicating a first RV value for the first repetition of the first TB and a second RV value for the first repetition of the second TB;
means for mapping a first preconfigured RV sequence starting from the first RV value to the first number of repetitions; and
means for mapping a second preconfigured RV sequence starting from the second RV value to the second number of repetitions independently of the first number of repetitions.
99. The UE of clause 98, wherein:
the means for mapping the first preconfigured RV sequence starting from the first RV value to the first number of repetitions is based on a first beam direction associated with each TB repetition in the first number of repetitions, and the means for mapping the second preconfigured RV sequence starting from the second RV value to the second number of repetitions is based on a second beam direction associated with each TB repetition in the second number of repetitions.

100. The UE of clause 99, wherein:

the RV configuration further indicates an RV offset, and the means for mapping the first preconfigured RV sequence to the first number of repetitions is further based on the RV offset; and the means for mapping the second preconfigured RV sequence to the second number of repetitions is further based on the RV offset.

101. The UE of clause 99, wherein:

the RV configuration further indicates a first RV offset for the first TB and a second RV offset for the second TB, and the means for mapping a predefined RV sequence to the first number of repetitions is further based on the first RV offset.

the means for mapping a predefined RV sequence to the second number of repetitions is further based on the second RV offset.

102. The UE of any of clauses 91-101, wherein the means for receiving the multi-TB repetition configuration comprises means for receiving a radio resource control (RRC) configuration indicating the multi-TB repetition configuration.

103. The UE of any of clauses 91-101, wherein the means for receiving the multi-TB repetition configuration comprises the means for receiving the DCI indicating the multi-TB repetition configuration.

104. The UE of any of clauses 91-103, wherein:

the means for communicating the first number of repetitions of the first TB comprises means for receiving a first number of downlink (DL) repetitions of the first TB; and the means for communicating the first number of repetitions of the first TB comprises means for receiving a second number of DL repetitions of the second TB.

105. The UE of any of clauses 91-103, wherein:

the means for communicating the first number of repetitions of the first TB comprises means for transmitting a first number of uplink (UL) repetitions of the first TB; and the means for communicating the first number of repetitions of the first TB comprises means for transmitting a second number of UL repetitions of the second TB.

106. The UE of any of clauses 91-105, wherein the DCI indicates the scheduling grant.

107. The UE of any of clauses 91-105, wherein the scheduling grant is a semi-static grant.

108. A base station (BS), comprising:

means for transmitting, to a user equipment (UE), a multi-transport block (TB) repetition configuration indicating a first number of repetitions and a second number of repetitions;

means for transmitting, to the UE, downlink control information (DCI) indicating a beam pattern including a plurality of beam directions;

means for communicating, with the UE based on the multi-TB repetition configuration and the beam pattern, a first TB and a second TB associated with a same scheduling grant, wherein the means for communicating the first TB and the second TB includes:

means for communicating the first number of repetitions for the first TB; and means for communicating the second number of repetitions for the second TB.

109. The BS of clause 108, further comprising:

means for determining a multi-TB repetition sequence including the first number of repetitions and the second number of repetitions; and means for mapping the beam pattern to the multi-TB repetition sequence, wherein the beam pattern indicates a preconfigured pattern of beam directions.

110. The BS of clause 108, further comprising:

means for determining a multi-TB repetition sequence including the first number of repetitions and the second number of repetitions;

means for mapping the beam pattern to the first number of repetitions of the first TB in a multi-TB repetition sequence including the first number of repetitions and the second number of repetitions, wherein the beam pattern indicates a preconfigured pattern of beam directions; and means for mapping the beam pattern to the second number of repetitions of the second TB in the multi-TB repetition sequence.

111. The BS of clause 108, wherein the beam pattern includes a first preconfigured beam sequence associated with the first TB and a second preconfigured beam sequence associated with the second TB, and further comprising:

means for mapping the first preconfigured beam sequence to the first number of repetitions of the first TB in a multi-TB repetition sequence including the first number of repetitions and the second number of repetitions; and means for mapping the second preconfigured beam sequence to the second number of repetitions of the second TB in the multi-TB repetition sequence.

112. The BS of any of clauses 108-111, further comprising:

means for segmenting a TB repetition of the first number of repetitions overlapping a slot boundary into a first actual TB repetition and a second actual TB repetition;

means for mapping a first beam direction of the beam pattern to the first actual TB repetition of the TB repetition; and means for mapping a second beam direction of the beam pattern to the second actual TB repetition of the TB repetition.

113. The BS of any of clauses 108-112, further comprising:

means for determining whether a gap period between a first TB repetition of the first number of repetitions associated with a first beam direction and a second TB repetition of the second number of repetitions associated with a second beam direction is below a threshold; and means for refraining, in response to means for determining that the gap period is below the threshold, from means for communicating the second TB repetition in a slot immediately following the first TB repetition.

114. The BS of any of clauses 108-113, further comprising:

means for mapping, to a multi-TB repetition sequence including the first number of repetitions and the second number of repetitions, one of the beam pattern or a pre-configured beam pattern different from the beam pattern based on the first number of repetitions of the first TB, the second number of repetitions of the second TB, and a number of scheduled TBs associated with the scheduling grant.

115. The BS of any of clauses 108-114, further comprising:
means for transmitting, to the UE, a redundancy version (RV) configuration indicating a first RV value for the first repetition of the first TB and a second RV value for the first repetition of the second TB;
means for mapping a first preconfigured RV sequence starting from the first RV value to the first number of repetitions; and
means for mapping a second preconfigured RV sequence starting from the second RV value to the second number of repetitions independently of the first number of repetitions.

116. The BS of clause 115, wherein:
the means for mapping the first preconfigured RV sequence starting from the first RV value to the first number of repetitions is based on a first beam direction associated with each TB repetition in the first number of repetitions, and
the means for mapping the second preconfigured RV sequence starting from the second RV value to the second number of repetitions is based on a second beam direction associated with each TB repetition in the second number of repetitions.

117. The BS of clause 116, wherein:
the RV configuration further indicates an RV offset, and
the means for mapping the first preconfigured RV sequence to the first number of repetitions is further based on the RV offset; and
the means for mapping the second preconfigured RV sequence to the second number of repetitions is further based on the RV offset.

118. The BS of clause 116, wherein:
the RV configuration further indicates a first RV offset for the first TB and a second RV offset for the second TB, and
the means for mapping a predefined RV sequence to the first number of repetitions is further based on the first RV offset.
the means for mapping a predefined RV sequence to the second number of repetitions is further based on the second RV offset.

119. The BS of clause any of clauses 18-28, wherein the means for transmitting the multi-TB repetition configuration comprises means for transmitting a radio resource control (RRC) configuration indicating the multi-TB repetition configuration.

120. The BS of any of clauses 108-118, wherein the means for transmitting the multi-TB repetition configuration comprises the means for transmitting the DCI indicating the multi-TB repetition configuration.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
receiving, from a base station (BS), a multi-transport block (TB) repetition configuration indicating a first number of repetitions and a second number of repetitions;
receiving, from the BS, downlink control information (DCI) indicating a beam pattern including a plurality of beam directions, wherein the beam pattern includes a first preconfigured beam sequence associated with a first TB and a second preconfigured beam sequence associated with a second TB;
mapping the first preconfigured beam sequence to the first number of repetitions of the first TB in a multi-TB repetition sequence including the first number of repetitions and the second number of repetitions;
mapping the second preconfigured beam sequence to the second number of repetitions of the second TB in the multi-TB repetition sequence; and
communicating, with the BS based on the multi-TB repetition configuration and the beam pattern, the first TB and the second TB associated with a same scheduling grant, wherein the communicating the first TB and the second TB includes:

communicating the first number of repetitions for the first TB; and communicating the second number of repetitions for the second TB.

2. The method of claim 1, further comprising:

determining a multi-TB repetition sequence including the first number of repetitions and the second number of repetitions; and mapping the beam pattern to the multi-TB repetition sequence, wherein the beam pattern indicates a preconfigured pattern of beam directions.

3. The method of claim 1, further comprising:

determining a multi-TB repetition sequence including the first number of repetitions and the second number of repetitions;

mapping the beam pattern to the first number of repetitions of the first TB in a multi-TB repetition sequence including the first number of repetitions and the second number of repetitions, wherein the beam pattern indicates a preconfigured pattern of beam directions; and mapping the beam pattern to the second number of repetitions of the second TB in the multi-TB repetition sequence.

4. The method of claim 1, further comprising:

mapping, to a multi-TB repetition sequence including the first number of repetitions and the second number of repetitions, one of the beam pattern or a pre-configured beam pattern different from the beam pattern based on the first number of repetitions of the first TB, the second number of repetitions of the second TB, and a number of scheduled TBs associated with the scheduling grant.

5. The method of claim 1, further comprising:

receiving, from the BS, a redundancy version (RV) configuration indicating a first RV value for the first repetition of the first TB and a second RV value for the first repetition of the second TB;

mapping a first preconfigured RV sequence starting from the first RV value to the first number of repetitions; and mapping a second preconfigured RV sequence starting from the second RV value to the second number of repetitions independently of the first number of repetitions.

6. The method of claim 1, wherein:

the communicating the first number of repetitions of the first TB comprises receiving a first number of downlink (DL) repetitions of the first TB; and the communicating the first number of repetitions of the first TB comprises receiving a second number of DL repetitions of the second TB.

7. The method of claim 1, wherein:

the communicating the first number of repetitions of the first TB comprises transmitting a first number of uplink (UL) repetitions of the first TB; and the communicating the first number of repetitions of the first TB comprises transmitting a second number of UL repetitions of the second TB.

8. The method of claim 1, wherein the DCI indicates the scheduling grant.

9. The method of claim 1, wherein the scheduling grant is a semi-static grant.

10. A method of wireless communication performed by a user equipment (UE), the method comprising:

receiving, from a base station (BS), a multi-transport block (TB) repetition configuration indicating a first number of repetitions and a second number of repetitions;

receiving, from the BS, downlink control information (DCI) indicating a beam pattern including a plurality of beam directions;

communicating, with the BS based on the multi-TB repetition configuration and the beam pattern, a first TB and a second TB associated with a same scheduling grant, wherein the communicating the first TB and the second TB includes:

communicating the first number of repetitions for the first TB; and communicating the second number of repetitions for the second TB;

the method further comprising:

segmenting a TB repetition of the first number of repetitions overlapping a slot boundary into a first actual TB repetition and a second actual TB repetition;

mapping a first beam direction of the beam pattern to the first actual TB repetition of the TB repetition; and mapping a second beam direction of the beam pattern to the second actual TB repetition of the TB repetition.

11. A method of wireless communication performed by a user equipment (UE), the method comprising:

receiving, from a base station (BS), a multi-transport block (TB) repetition configuration indicating a first number of repetitions and a second number of repetitions;

receiving, from the BS, downlink control information (DCI) indicating a beam pattern including a plurality of beam directions;

communicating, with the BS based on the multi-TB repetition configuration and the beam pattern, a first TB and a second TB associated with a same scheduling grant, wherein the communicating the first TB and the second TB includes:

communicating the first number of repetitions for the first TB; and communicating the second number of repetitions for the second TB;

the method further comprising:

determining whether a gap period between a first TB repetition of the first number of repetitions associated with a first beam direction and a second TB repetition of the second number of repetitions associated with a second beam direction is below a threshold; and refraining, in response to determining that the gap period is below the threshold, from communicating the second TB repetition in a slot immediately following the first TB repetition.

12. A method of wireless communication performed by a user equipment (UE), the method comprising:

receiving, from a base station (BS), a multi-transport block (TB) repetition configuration indicating a first number of repetitions and a second number of repetitions;

receiving, from the BS, downlink control information (DCI) indicating a beam pattern including a plurality of beam directions;

receiving, from the BS, a redundancy version (RV) configuration indicating a first RV value for a first repetition of a first TB and a second RV value for a first repetition of a second TB;

mapping a first preconfigured RV sequence starting from the first RV value to the first number of repetitions; and mapping a second preconfigured RV sequence starting from the second RV value to the second number of repetitions independently of the first number of repetitions;

communicating, with the BS based on the multi-TB repetition configuration and the beam pattern, the first TB and the second TB associated with a same scheduling grant, wherein the communicating the first TB and the second TB includes:

communicating the first number of repetitions for the first TB; and communicating the second number of repetitions for the second TB;

wherein:

the mapping the first preconfigured RV sequence starting from the first RV value to the first number of repetitions is based on a first beam direction associated with each TB repetition in the first number of repetitions, and the mapping the second preconfigured RV sequence starting from the second RV value to the second number of repetitions is based on a second beam direction associated with each TB repetition in the second number of repetitions.

13. A method of wireless communication performed by a user equipment (UE), the method comprising:

receiving, from a base station (BS), a multi-transport block (TB) repetition configuration indicating a first number of repetitions and a second number of repetitions;

receiving, from the BS, downlink control information (DCI) indicating a beam pattern including a plurality of beam directions;

receiving, from the BS, a redundancy version (RV) configuration indicating a first RV value for a first repetition of a first TB and a second RV value for a first repetition of a second TB;

mapping a first preconfigured RV sequence starting from the first RV value to the first number of repetitions; and mapping a second preconfigured RV sequence starting from the second RV value to the second number of repetitions independently of the first number of repetitions;

communicating, with the BS based on the multi-TB repetition configuration and the beam pattern, the first TB and the second TB associated with a same scheduling grant, wherein the communicating the first TB and the second TB includes:

communicating the first number of repetitions for the first TB; and communicating the second number of repetitions for the second TB;

wherein:

the RV configuration further indicates an RV offset, and the mapping the first preconfigured RV sequence to the first number of repetitions is further based on the RV offset; and the mapping the second preconfigured RV sequence to the second number of repetitions is further based on the RV offset.

14. A method of wireless communication performed by a user equipment (UE), the method comprising:

receiving, from a base station (BS), a multi-transport block (TB) repetition configuration indicating a first number of repetitions and a second number of repetitions;

receiving, from the BS, downlink control information (DCI) indicating a beam pattern including a plurality of beam directions;

receiving, from the BS, a redundancy version (RV) configuration indicating a first RV value for a first repetition of a first TB and a second RV value for a first repetition of a second TB;

mapping a first preconfigured RV sequence starting from the first RV value to the first number of repetitions; and mapping a second preconfigured RV sequence starting from the second RV value to the second number of repetitions independently of the first number of repetitions;

communicating, with the BS based on the multi-TB repetition configuration and the beam pattern, the first TB and the second TB associated with a same scheduling grant, wherein the communicating the first TB and the second TB includes:

communicating the first number of repetitions for the first TB; and communicating the second number of repetitions for the second TB;

wherein:

the RV configuration further indicates a first RV offset for the first TB and a second RV offset for the second TB, the mapping a predefined RV sequence to the first number of repetitions is further based on the first RV offset, and the mapping a predefined RV sequence to the second number of repetitions is further based on the second RV offset.

15. A method of wireless communication performed by a base station (BS), the method comprising:

transmitting, to a user equipment (UE), a multi-transport block (TB) repetition configuration indicating a first number of repetitions and a second number of repetitions;

transmitting, to the UE, downlink control information (DCI) indicating a beam pattern including a plurality of beam directions;

communicating, with the UE based on the multi-TB repetition configuration and the beam pattern, a first TB and a second TB associated with a same scheduling grant, wherein the communicating the first TB and the second TB includes:

communicating the first number of repetitions for the first TB; and communicating the second number of repetitions for the second TB;

wherein the beam pattern includes a first preconfigured beam sequence associated with the first TB and a second preconfigured beam sequence associated with the second TB, and further comprising:

mapping the first preconfigured beam sequence to the first number of repetitions of the first TB in a multi-TB repetition sequence including the first number of repetitions and the second number of repetitions; and mapping the second preconfigured beam sequence to the second number of repetitions of the second TB in the multi-TB repetition sequence.

16. The method of claim 15, further comprising:

determining a multi-TB repetition sequence including the first number of repetitions and the second number of repetitions; and mapping the beam pattern to the multi-TB repetition sequence, wherein the beam pattern indicates a preconfigured pattern of beam directions.

17. The method of claim 15, further comprising:

determining a multi-TB repetition sequence including the first number of repetitions and the second number of repetitions;

mapping the beam pattern to the first number of repetitions of the first TB in a multi-TB repetition sequence including the first number of repetitions and the second number of repetitions, wherein the beam pattern indicates a preconfigured pattern of beam directions; and mapping the beam pattern to the second number of repetitions of the second TB in the multi-TB repetition sequence.

18. The method of claim 15, further comprising:

segmenting a TB repetition of the first number of repetitions overlapping a slot boundary into a first actual TB repetition and a second actual TB repetition;

mapping a first beam direction of the beam pattern to the first actual TB repetition of the TB repetition; and mapping a second beam direction of the beam pattern to the second actual TB repetition of the TB repetition.

19. The method of claim 15, further comprising:

determining whether a gap period between a first TB repetition of the first number of repetitions associated with a first beam direction and a second TB repetition of the second number of repetitions associated with a second beam direction is below a threshold; and refraining, in response to determining that the gap period is below the threshold, from communicating the second TB repetition in a slot immediately following the first TB repetition.

20. The method of claim 15, further comprising:

mapping, to a multi-TB repetition sequence including the first number of repetitions and the second number of repetitions, one of the beam pattern or a pre-configured beam pattern different from the beam pattern based on the first number of repetitions of the first TB, the second number of repetitions of the second TB, and a number of scheduled TBs associated with the scheduling grant.

21. The method of claim 15, further comprising:

transmitting, to the UE, a redundancy version (RV) configuration indicating a first RV value for the first repetition of the first TB and a second RV value for the first repetition of the second TB;

mapping a first preconfigured RV sequence starting from the first RV value to the first number of repetitions; and mapping a second preconfigured RV sequence starting from the second RV value to the second number of repetitions independently of the first number of repetitions.

22. The method of claim 21, wherein:

the mapping the first preconfigured RV sequence starting from the first RV value to the first number of repetitions is based on a first beam direction associated with each TB repetition in the first number of repetitions, and the mapping the second preconfigured RV sequence starting from the second RV value to the second number of repetitions is based on a second beam direction associated with each TB repetition in the second number of repetitions.

23. The method of claim 22, wherein:

the RV configuration further indicates an RV offset, and the mapping the first preconfigured RV sequence to the first number of repetitions is further based on the RV offset; and the mapping the second preconfigured RV sequence to the second number of repetitions is further based on the RV offset.

24. The method of claim 22, wherein:

the RV configuration further indicates a first RV offset for the first TB and a second RV offset for the second TB, the mapping a predefined RV sequence to the first number of repetitions is further based on the first RV offset, and the mapping a predefined RV sequence to the second number of repetitions is further based on the second RV offset.

25. A user equipment (UE), comprising:

a transceiver; and a processor in communication with the transceiver and configured to cause the transceiver to:

receive, from a base station (BS), a multi-transport block (TB) repetition configuration indicating a first number of repetitions and a second number of repetitions;

receive, from the BS, downlink control information (DCI) indicating a beam pattern including a plurality of beam directions, wherein the beam pattern includes a first preconfigured beam sequence associated with a first TB and a second preconfigured beam sequence associated with a second TB;

map the first preconfigured beam sequence to the first number of repetitions of the first TB in a multi-TB repetition sequence including the first number of repetitions and the second number of repetitions; and map the second preconfigured beam sequence to the second number of repetitions of the second TB in the multi-TB repetition sequence; and communicate, with the BS based on the multi-TB repetition configuration and the beam pattern, the first TB and the second TB associated with a same scheduling grant, wherein the communicating the first TB and the second TB includes:

communicate the first number of repetitions for the first TB; and communicate the second number of repetitions for the second TB.

26. The UE of claim 25, wherein the processor is further configured to:

determine whether a gap period between a first TB repetition of the first number of repetitions associated with a first beam direction and a second TB repetition of the second number of repetitions associated with a second beam direction is below a threshold; and refrain, in response to determining that the gap period is below the threshold, from communicating the second TB repetition in a slot immediately following the first TB repetition.

27. The UE of claim 25, wherein the processor is further configured to:

cause the transceiver to receive, from the BS, a redundancy version (RV) configuration indicating a first RV value for the first repetition of the first TB and a second RV value for the first repetition of the second TB;

map a first preconfigured RV sequence starting from the first RV value to the first number of repetitions; and map a second preconfigured RV sequence starting from the second RV value to the second number of repetitions independently of the first number of repetitions.

* * * * *